(12) United States Patent
Jo et al.

(10) Patent No.: US 12,228,290 B2
(45) Date of Patent: Feb. 18, 2025

(54) PORTABLE AIR FLOW APPARATUS

(71) Applicant: LG ELECTRONICS INC., Seoul (KR)

(72) Inventors: Yu Na Jo, Seoul (KR); Deukwon Lee, Seoul (KR); Taeyun Lee, Seoul (KR); Hyunbyung Cha, Seoul (KR); Sang Yoon Lee, Seoul (KR); Min Kyu Oh, Seoul (KR); Byunghoon Park, Seoul (KR); Yeon A Jo, Seoul (KR); Chang On Lee, Seoul (KR); Jihye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/443,691

(22) Filed: Feb. 16, 2024

(65) Prior Publication Data
US 2024/0191882 A1 Jun. 13, 2024

Related U.S. Application Data

(62) Division of application No. 17/584,630, filed on Jan. 26, 2022, now Pat. No. 11,946,651.

(30) Foreign Application Priority Data

Mar. 8, 2021 (KR) .................. 10-2021-0030338
Apr. 27, 2021 (KR) .................. 10-2021-0054479

(51) Int. Cl.
*F24C 15/20* (2006.01)
*A47J 36/38* (2006.01)
(Continued)

(52) U.S. Cl.
CPC ........... *F24C 15/2092* (2013.01); *A47J 36/38* (2013.01); *B01D 46/0038* (2013.01);
(Continued)

(58) Field of Classification Search
CPC .............. F24C 15/2092; F24C 15/2035; F24C 15/2085; A47J 36/38; B01D 46/0038;
(Continued)

(56) References Cited

U.S. PATENT DOCUMENTS 2,253,127 A * 8/1941 Koch .................... F04D 25/105
416/100
3,430,551 A 3/1969 Hauville
(Continued)

FOREIGN PATENT DOCUMENTS

CN 202109563 1/2012
CN 108397808 8/2018
(Continued)

OTHER PUBLICATIONS

U.S. Office Action dated Sep. 18, 2024 issued in U.S. Appl. No. 17/677,035.
(Continued)

*Primary Examiner* — Phutthiwat Wongwian
*Assistant Examiner* — Susan E Scharpf
(74) *Attorney, Agent, or Firm* — KED & ASSOCIATES

(57) ABSTRACT

Proposed is a method of controlling a portable air-flow guiding apparatus including adjusting at least one of an angle in a horizontal direction of a head unit including a sucking unit by a horizontal angle adjustment unit of the portable air-flow guiding apparatus and a height of the head unit by a height adjustment unit of the portable air-flow guiding apparatus according to a position of a heating source and a height of a cooking utensil.

19 Claims, 45 Drawing Sheets

(51) Int. Cl.

| | | |
|---|---|---|
| *B01D 46/00* | (2022.01) | |
| *B01D 46/16* | (2006.01) | |
| *F04D 17/16* | (2006.01) | |
| *F04D 25/06* | (2006.01) | |
| *F04D 27/00* | (2006.01) | |
| *F04D 29/053* | (2006.01) | |
| *F04D 29/40* | (2006.01) | |
| *F04D 29/42* | (2006.01) | |
| *F04D 29/70* | (2006.01) | |
| *F24F 7/007* | (2006.01) | |

(52) U.S. Cl.
CPC ......... *B01D 46/16* (2013.01); *F04D 25/0606* (2013.01); *F04D 27/00* (2013.01); *F04D 29/053* (2013.01); *F04D 29/403* (2013.01); *F04D 29/4293* (2013.01); *F04D 29/70* (2013.01); *F04D 29/701* (2013.01); *F04D 29/703* (2013.01); *F24C 15/2035* (2013.01); *F24C 15/2085* (2013.01); *F24F 7/007* (2013.01); *B01D 2279/35* (2013.01); *F04D 17/16* (2013.01)

(58) Field of Classification Search
CPC . B01D 46/16; B01D 2279/35; F04D 25/0606; F04D 27/00; F04D 29/053; F04D 29/403; F04D 29/4293; F04D 29/70; F04D 29/701; F04D 29/703; F04D 17/16; F24F 7/007; F05D 2260/32
See application file for complete search history.

(56) References Cited

U.S. PATENT DOCUMENTS

| | | | | |
|---|---|---|---|---|
| 3,886,560 | A * | 5/1975 | Mortensen | H01Q 1/084 |
| | | | | 343/709 |
| 5,603,562 | A * | 2/1997 | Huang | F21S 6/007 |
| | | | | 362/183 |
| 6,497,738 | B2 * | 12/2002 | Lin | B01D 46/10 |
| | | | | 126/299 R |
| 7,380,759 | B1 * | 6/2008 | Whiteside | F16M 11/041 |
| | | | | 248/221.11 |
| 7,662,035 | B1 | 2/2010 | Parker | |
| 9,624,944 | B2 * | 4/2017 | Ojeda | F04D 17/04 |
| 2002/0088211 | A1 * | 7/2002 | Lin | B01D 46/10 |
| | | | | 55/385.1 |
| 2003/0033937 | A1 * | 2/2003 | Najm | B01D 46/446 |
| | | | | 96/429 |
| 2004/0129139 | A1 * | 7/2004 | Schumacher | B60H 3/06 |
| | | | | 55/354 |
| 2007/0204854 | A1 * | 9/2007 | Morton | F24C 15/2035 |
| | | | | 126/299 D |
| 2016/0281742 | A1 * | 9/2016 | Rivera | F04D 25/0673 |
| 2020/0398207 | A1 * | 12/2020 | Park | B01D 46/66 |
| 2021/0121816 | A1 * | 4/2021 | Kim | B01D 46/46 |
| 2022/0042714 | A1 | 2/2022 | Lee | |
| 2022/0282874 | A1 * | 9/2022 | Jo | F24C 15/2092 |
| 2022/0341598 | A1 * | 10/2022 | Lee | F24C 15/2092 |
| 2022/0373190 | A1 * | 11/2022 | Lee | F24C 15/2078 |

FOREIGN PATENT DOCUMENTS

| | | |
|---|---|---|
| CN | 110360631 | 10/2019 |
| CN | 112283774 | 1/2021 |
| CN | 112555922 | 3/2021 |
| DE | 3503236 | 8/1986 |
| DE | 10 2004 055947 | 7/2006 |
| DE | 10 2005 055 029 | 5/2007 |
| DE | 20 2015 106 627 | 1/2016 |
| DE | 20 2016 002873 | 7/2016 |
| EP | 3 502 572 | 6/2019 |
| FR | 2 761 620 | 10/1998 |
| JP | 48-97490 | 11/1973 |
| JP | 62-17737 | 2/1987 |
| JP | 2002-286268 | 10/2002 |
| KR | 20-0321802 | 7/2003 |
| KR | 20-0394656 | 9/2005 |
| KR | 10-0819482 | 4/2008 |
| KR | 10-2016-0104514 | 9/2016 |
| KR | 10-2017-0105333 | 9/2017 |
| KR | 10-2017-0137335 | 12/2017 |
| KR | 10-2018-0058047 | 5/2018 |
| KR | 10-2018-0099392 | 9/2018 |
| KR | 10-2018-0099393 | 9/2018 |
| KR | 20-0487625 | 12/2018 |
| KR | 10-1961013 | 3/2019 |
| KR | 10-1962730 | 3/2019 |
| KR | 10-2019-0087809 | 7/2019 |
| KR | 10-2051551 | 12/2019 |
| KR | 10-2021-0022253 | 3/2021 |
| KR | 10-2022-0018280 | 2/2022 |

OTHER PUBLICATIONS

U.S. Office Action dated Mar. 18, 2024 issued in U.S. Appl. No. 17/580,751.
U.S. Office Action dated Jul. 30, 2024 issued in U.S. Appl. No. 17/580,751.
U.S. Appl. No. 17/580,751, filed Jan. 21, 2022.
U.S. Appl. No. 17/677,035, filed Feb. 22, 2022.
U.S. Appl. No. 18/443,691, filed Feb. 16, 2024.
International Search Report issued in Application No. PCT/KR2021/019328 dated Mar. 24, 2022.
International Search Report issued in Application No. PCT/KR2022/000188 dated Apr. 18, 2022.
International Search Report issued in Application No. PCT/KR2022/000995 dated Apr. 22, 2022.
Partial European Search Report issued in Application No. 22152272.5 dated Jun. 20, 2022.
European Search Report issued in Application No. 22153079.3 dated Jun. 28, 2022.
European Search report issued in Application No. 22158438.6 dated Jul. 22, 2022.
European Search Report dated Nov. 3, 2022 issued in EP Application No. 22152272.5.
European Office Action issued in Application No. 22152272.5 dated Jun. 14, 2023.
European Search Report issued in Application No. 22 153 079.3 dated Feb. 12, 2024.
United States Office Action dated Mar. 17, 2023 issued in co-pending related U.S. Appl. No. 17/584,630.
U.S. Notice of Allowance dated Nov. 17, 2023 issued in U.S. Appl. No. 17/584,630.

* cited by examiner

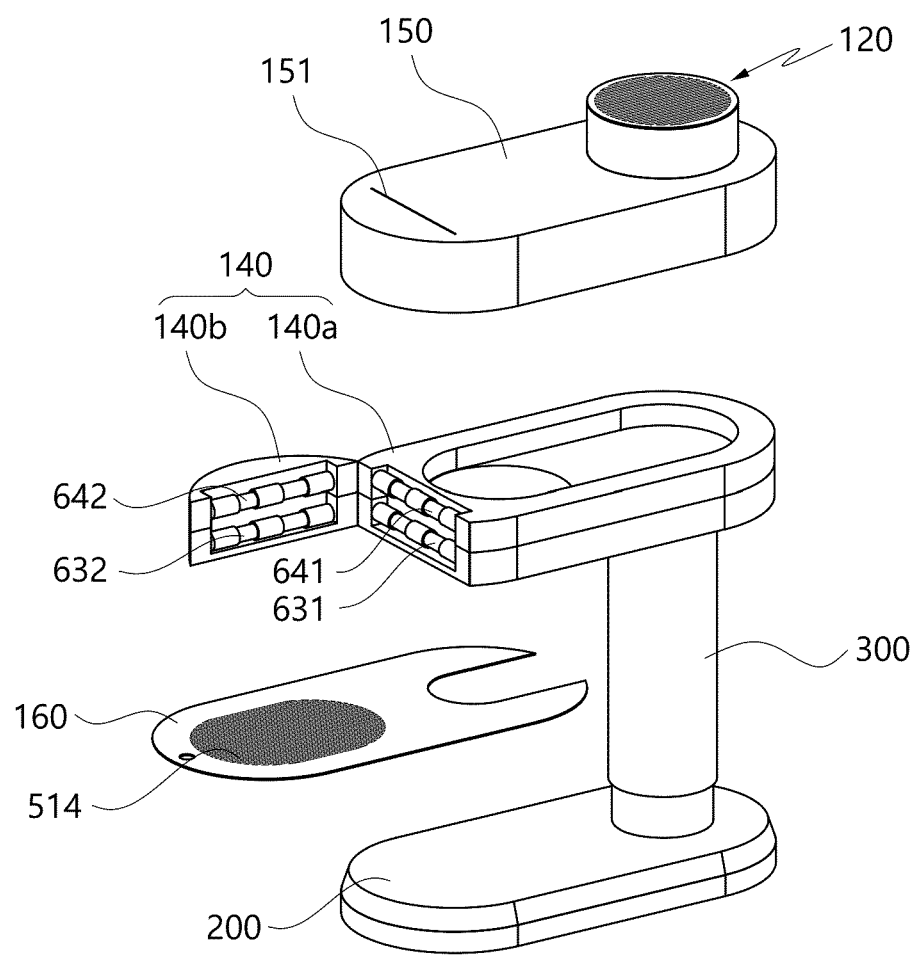

10

150
140
160

PORTABLE AIR FLOW APPARATUS

CROSS REFERENCE TO RELATED APPLICATION

This application is a Divisional of U.S. application Ser. No. 17/584,630, filed Jan. 26, 2022, which claims priority to Korean Patent Applications Nos. 10-2021-0054479, filed in Korea on Apr. 27, 2021, and 10-2021-0030338, filed in Korea on Mar. 8, 2021, the entire contents of which are hereby incorporated by reference.

BACKGROUND OF THE INVENTION

Field of the Invention

The present disclosure relates to a portable air-flow guiding apparatus and a method of controlling the portable air-flow guiding apparatus and, more particularly, to a portable air-flow guiding apparatus capable of being used to cause oil mist and the like to flow or to purify air during food cooking and a method of controlling the portable air-flow guiding apparatus.

Description of the Related Art

Apparatuses that force air and the like to flow are used indoors or outdoors. Typical examples of an air-flow guiding apparatus used indoors include a hood used during food cooking and an air purifier.

The hood is mounted over cooking heating equipment such as a gas range or an induction stove. The hood sucks odors, water vapor, oil mist, and fine dust (hereinafter referred to as "oil mist and the like") that occur when food is being cooked using the cooking heating equipment and discharges the oil mist and the like to the outside. A position where the cooking heating equipment, such as the gas range or the induction stove, is installed is fixed. Usually, a position where the hood is to be installed over the cooking heating equipment is also fixed.

Usually, due to a kitchen structure or for convenience during food cooking, a fixed-type hood that is to be installed over the cooking heating equipment is installed at a somewhat great height from the cooking heating equipment. Therefore, in some cases, all oil mist and the like that occur during food cooking are not removed because of a long distance between a position where cooking occurs and a sucking unit of the fixed-type hood.

The oil mist and the like that are not removed by the hood flow indoors, and thus cause an odor or are absorbed onto a room wall, furniture, and the like. Thus, the room wall and the furniture are stained with a greasy spot.

In addition, the existing fixed-type food may be used for the fixed-type cooking heating equipment, such as the gas range or the induction stove, but cannot be used when meat is grilled over a portable burner or when food is cooked outdoors, such as at a camping site.

The foregoing is intended merely to aid in the understanding of the background of the present disclosure, and is not intended to mean that the present disclosure falls within the purview of the related art that is already known to those skilled in the art.

SUMMARY OF THE INVENTION

An objective of the present disclosure is to provide a portable air-flow guiding apparatus that is not limited in installation position.

Another objective of the present disclosure is to provide a portable air-flow guiding apparatus capable of sucking oil mist and the like that occurs from a cooking utensil, such as a pot, during food cooking, when finding application as a portable hood. The portable air-flow guiding apparatus is positioned vertically adjacent to the cooking utensil and increases the efficiency of sucking the oil mist and the like.

Still another objective of the present disclosure is to provide a portable air-flow guiding apparatus capable of adjusting a position of a sucking unit thereof according to a height or position of a cooking utensil in such a manner that the sucking unit is positioned above the cooking utensil, when finding application as a portable hood.

Still another objective of the present disclosure is to provide a portable air-flow guiding apparatus capable of being stably seated without the risk of falling down during food cooking.

Still another objective of the present disclosure is to provide a portable air-flow guiding apparatus capable of preventing a bypass phenomenon where air, oil mist, and the like bypass a sucking unit thereof without being introduced into the sucking unit.

Still another objective of the present disclosure is to provide a portable air-flow guiding apparatus capable of sucking oil mist and the like through a sucking unit thereof, discharging the oil mist and the like upward, and thus being sucked into a fixed-type hood installed in a kitchen, when finding application as a portable hood. The portable air-flow guiding apparatus effectively removes the oil mist and the like in cooperation with the fixed-type hood.

Still another objective of the present disclosure is to provide a portable air-flow guiding apparatus capable of being disassembled into primary components for cleaning, replacement, or the like.

Still another objective of the present disclosure is to provide a portable air-flow guiding apparatus capable of also functioning as an air purifier in addition to removing oil mist and the like during food cooking.

Still another objective of the present disclosure is to provide a method of controlling a portable air-flow guiding apparatus capable of automatically adjusting a position of a head unit having a sucking unit and thus improving the efficiency of sucking of oil mist and the like.

Still another objective of the present disclosure is to provide a method of controlling a portable air-flow guiding apparatus capable of automatically adjusting a position in a horizontal direction of a head unit according to a position of a heating source, when finding application as a hood with directivity.

Still another objective of the present disclosure is to provide a method of controlling a portable air-flow guiding apparatus capable of automatically adjusting a height of a head unit according to a height of a cooking utensil such as a pot, when finding application as a hood with directivity.

Still another objective of the present disclosure is to provide a method of controlling a portable air-flow guiding apparatus capable of automatically adjusting a position in a vertical direction of a head unit according to a usage condition, when finding application as a hood with directivity.

Still another objective of the present disclosure is to provide a method of controlling a portable air-flow guiding apparatus capable of preventing a collision with a cooking utensil while automatically adjusting a position of a head unit, when finding application as a hood with directivity.

Still another objective of the present disclosure is to provide a method of controlling a portable air-flow guiding apparatus capable of automatically a position of a head unit through operation in conjunction with cooking heating equipment or a fixed-type hood, when finding application as a hood with directivity.

Still another objective of the present disclosure is to provide a method of controlling a portable air-flow guiding apparatus capable of minimizing interference with a user's movement involved in cooking food, among movements, when finding application as a hood with directivity.

According to an aspect of the present disclosure, there is provided a portable air-flow guiding apparatus including a base unit, a head unit, and a columnar unit.

In the portable air-flow guiding apparatus, the base unit may be seated on a bottom.

In the portable air-flow guiding apparatus, the head unit may be configured to include a sucking unit through which air is sucked and a discharging unit through which the air sucked through the sucking unit is discharged.

In the portable air-flow guiding apparatus, the sucking unit and the discharging unit may be horizontally spaced apart from each other at a right angle with respect to a vertical direction.

In the portable air-flow guiding apparatus, a columnar unit may connect the head unit and the base unit in such a manner that the head unit is vertically spaced from the base unit.

In the portable air-flow guiding apparatus, the columnar unit may be combined with the head unit in a manner that is spaced away from the sucking unit toward a direction of the discharging unit. In the portable air-flow guiding apparatus, the columnar unit may be rotatably combined with the base unit in such a manner that the sucking unit side of the head unit is rotated in a leftward-rightward direction.

In the portable air-flow guiding apparatus, the sucking unit may be open at the bottom, and through the sucking unit, the air may be sucked from below. In the portable air-flow guiding apparatus, the discharging unit may be open at the top, and through the discharging, the air may be discharged upward.

In the portable air-flow guiding apparatus, the sucking unit and the discharging unit may be formed in the head unit in such a manner that edge portions facing each other of the sucking unit and the discharging unit do not overlap in the vertical direction.

In the portable air-flow guiding apparatus, the portable air-flow guiding apparatus may further include a discharging fan and a fan motor.

In the portable air-flow guiding apparatus, the discharging fan may be mounted inside the discharging unit and may generate a suction force for sucking the air through the sucking unit and discharging the sucked air through the discharging unit. In the portable air-flow guiding apparatus, a fan motor may be mounted underneath the discharging fan and may rotate the discharging fan.

In the portable air-flow guiding apparatus, the discharging fan may include a mixed flow fan.

In the portable air-flow guiding apparatus, the head unit may include a head main body and a flow-path unit.

In the portable air-flow guiding apparatus, in the head unit, the sucking unit and the discharging unit may be horizontally spaced apart from each other. In the portable air-flow guiding apparatus, the flow-path unit, along which the air sucked through the sucking unit may flow toward the discharging unit, may be provided inside the head main body.

In the portable air-flow guiding apparatus, the discharging unit may be formed in such a manner as to have a greater cross-sectional area than the flow-path unit.

In the portable air-flow guiding apparatus, the discharging fan may be mounted over the flow-path unit, and the fan motor may be mounted underneath the flow-path unit.

In the portable air-flow guiding apparatus, the flow-path unit may include a sucking inlet, a discharging outlet, and an inner flow path.

In the portable air-flow guiding apparatus, the sucking inlet may be open at the bottom in a manner that faces toward the sucking unit, and the discharging outlet may be open at the top in a manner that faces toward the discharging unit. In the portable air-flow guiding apparatus, through the inner flow path, the sucking inlet and the sucking outlet horizontally may communicate with each other.

In the portable air-flow guiding apparatus, the discharging fan and the fan motor may be mounted in the head main body in such a manner as to be positioned over and underneath, respectively, the discharging outlet.

In the portable air-flow guiding apparatus, the discharging fan and the fan motor may be positioned over the columnar unit, and thus the center of gravity of the portable air-flow guiding apparatus may be positioned in the columnar unit.

In the portable air-flow guiding apparatus, the flow-path unit may be formed by machining the inside of the head main body. In the portable air-flow guiding apparatus, the flow-path unit may be formed by mounting a cylindrical member, in which the sucking inlet, the discharging outlet, and the inner flow path are formed, inside the head main body.

In the portable air-flow guiding apparatus, an edge portion of an inner wall surface of the inner flow path, at which a direction of flow of the air is changed, may have a rounded shape, at the edge portion.

In the portable air-flow guiding apparatus, the discharging unit may include a fan housing and a discharging grill.

In the portable air-flow guiding apparatus, the fan housing, inside which the discharging fan is accommodated, may protrude upward from an upper plate-like surface of the head main body and may be open at the top and bottom. In the portable air-flow guiding apparatus, the discharging grill may be detachably combined with an upper opening in the fan housing and may cover the upper opening in the fan housing.

In the portable air-flow guiding apparatus, the fan housing may be detachably combined with the head main body.

In the portable air-flow guiding apparatus, the fan motor may include a fan shaft extending toward the discharging fan and transferring a rotational force of the fan motor to the discharging fan. In the portable air-flow guiding apparatus, a screw thread may be formed on an outer circumferential surface of an end portion of the fan shaft.

In the portable air-flow guiding apparatus, the discharging fan may include a shaft through-hole and a fan nut.

In the portable air-flow guiding apparatus, the shaft through-hole may pass therethrough from top to bottom in such a manner that the end portion of the fan shaft passing through the shaft through-hole is exposed to the outside in a manner that is positioned over the discharging fan. In the portable air-flow guiding apparatus, the end portion of the fan shaft, passing through the shaft through-hole, may be inserted into the fan nut for being fastened thereto, and thus the discharging fan may be fixed to the fan shaft.

In the portable air-flow guiding apparatus, the discharging fan may further include a fan blocking portion formed in a lower surface thereof. In the portable air-flow guiding apparatus, the fan shaft may include a shaft blocking protrusion radially protruding outward from an outer circumferential surface of the fan shaft. In the portable air-flow guiding apparatus, movement of the shaft blocking protrusion may be blocked by the fan blocking portion when the fan shaft passes through the shaft through-hole, and thus the shaft blocking protrusion may rotate the discharging fan by rotation of the fan shaft.

In the portable air-flow guiding apparatus, the portable air-flow guiding apparatus may further include a filter unit. In the portable air-flow guiding apparatus, the filter unit may be mounted in the sucking unit and may purify air sucked through the sucking unit.

In the portable air-flow guiding apparatus, a purification filer may include at least one of a deodorizing filter and an oil mist filter.

In the portable air-flow guiding apparatus, the head main body may include a casing main body, an upper casing, and a lower casing.

In the portable air-flow guiding apparatus, a flow path space in which the sucking unit and the flow-path unit are seated may be formed in the casing main body. In the portable air-flow guiding apparatus, the upper casing may be combined with the casing main body in a direction of moving downward from over the casing main body. In the portable air-flow guiding apparatus, the discharging unit may be formed in the upper casing.

In the portable air-flow guiding apparatus, a through-hole may be formed, at a position corresponding to the sucking unit, in the lower casing in a manner that passes therethrough from top to bottom. In the portable air-flow guiding apparatus, the lower casing may be combined with the casing main body in a direction of moving up from under the casing main body.

In the portable air-flow guiding apparatus, the purification filter may further include a free filter mounted in the through-hole in the lower casing.

In the portable air-flow guiding apparatus, the upper casing may be combined with the casing main body in such a manner as to surround a lateral surface of the casing main body.

In the portable air-flow guiding apparatus, the portable air-flow guiding apparatus may further a filter roll and a filter transportation unit.

In the portable air-flow guiding apparatus, the filter roller may be rotatably mounted in the casing main body, with the oil mist filer being wound thereon.

In the portable air-flow guiding apparatus, the filter transportation unit may be mounted in the casing main body in such a manner as to be positioned in front of the filter roll with the sucking unit in between. In the portable air-flow guiding apparatus, the filter transportation unit may discharge the oil mist filter horizontally extending from the filter roll and passing the sucking unit, to the outside of the casing main body.

In the portable air-flow guiding apparatus, a filter discharging hole through which the mist oil filter transported by the filter transportation unit passes may be formed in the upper casing in a manner that passes therethrough from top to bottom. In the portable air-flow guiding apparatus, the oil mist filter that passes the sucking unit and is connected to the filter transportation unit in a state of being inclined upward may be transported upward by the filter transportation unit.

The portable air-flow guiding apparatus may further include a rotation unit connecting the columnar unit and the base unit in such a manner that the columnar unit is rotated with respect to the base unit.

In the portable air-flow guiding apparatus, the rotation unit may include a first rotation member and a second rotation member.

In the portable air-flow guiding apparatus, the first rotation member may be mounted underneath the columnar unit. In the portable air-flow guiding apparatus, the second rotation member may be mounted in the base unit and may rotatably support the first rotation member in such a manner that the columnar unit is rotated.

In the portable air-flow guiding apparatus, the first rotation member may have the shape of a circular plate, and the second rotation member may have the shape of a circular ring in such a manner as to be rotatably supported along an inner circumferential surface of the first rotation member.

In the portable air-flow guiding apparatus, a blocking protrusion may be provided on an outer circumferential surface of the first rotation member in a manner that is radially protruding outward therefrom. In the portable air-flow guiding apparatus, a plurality of blocking grooves may be formed in an inner circumferential surface of the second rotation member in such a manner as to be spaced apart by a preset angle, and the blocking protrusion may be inserted into the blocking groove and movement of the blocking protrusion is thus blocked by the blocking groove.

In the portable air-flow guiding apparatus, three blocking grooves may be formed in such a manner as to be spaced apart by an angle of 90°. In the portable air-flow guiding apparatus, the base unit and the head unit may be positioned in such a manner as to be aligned with each other and so that the head unit is rotated by an angle of 90° to the left or to the right with respect to the base unit.

In the portable air-flow guiding apparatus, the rotation unit may include a rotation control unit. In the portable air-flow guiding apparatus, the rotation control unit may control rotation of the first rotation member in such a manner that the head unit is rotated by up to a preset angle to the left or the right from a position where the head unit is aligned with the base unit.

In the portable air-flow guiding apparatus, the columnar unit may include a first columnar member, a second columnar member, and a height adjustment unit.

In the portable air-flow guiding apparatus, the first columnar member may have the shape of a cylinder, and a first side thereof may be combined with the head unit. In the portable air-flow guiding apparatus, the second columnar member may have the shape of a cylinder and a first side thereof may be combined with the base unit. In the portable air-flow guiding apparatus, a second side of the second columnar member may be inserted into a second side of the first columnar member.

In the portable air-flow guiding apparatus, the height adjustment unit may enable the first columnar member to ascend or descend with respect to the second columnar member in such a manner that a height of the head unit is adjusted.

In the portable air-flow guiding apparatus, the height adjustment unit may include a rack member, a pinion member, and a damper.

In the portable air-flow guiding apparatus, the rack member may be mounted on one of the first columnar member and the second columnar member and may be formed along an upward-downward direction. In the portable air-flow guiding apparatus, the pinion member may be rotated by being engaged with the rack member.

In the portable air-flow guiding apparatus, the damper may be mounted on the other one of the first columnar member and the second columnar. In the portable air-flow guiding apparatus, the damper may be connected to a rotation shaft of the pinion member, and thus the damper may enable the first columnar member to ascend when the pinion member is rotated by being engaged with the rack member. In the portable air-flow guiding apparatus, the damper may exert a load in such a manner that a position to which the first columnar member ascends is maintained.

In the portable air-flow guiding apparatus, the fan motor may be mounted inside the discharging fan. In the portable air-flow guiding apparatus, the discharging fan accommodated inside the fan motor may be mounted inside the fan housing.

In the portable air-flow guiding apparatus, the discharging unit may further include a shaft connection member connecting a rotation shaft of the discharging fan and the discharging grill in such a manner that the discharging fan is rotatable inside the fan housing, In the portable air-flow guiding apparatus, when the discharging grill is removed from the fan housing, the discharging fan and the fan motor may be removed together by the shaft connection member.

The portable air-flow guiding apparatus may further include a first connector and a second connector.

In the portable air-flow guiding apparatus, the first connector may be mounted on the discharging grill and may be electrically connected to the fan motor. In the portable air-flow guiding apparatus, the second connector may be mounted, at a postilion corresponding to the first connection, in the fan housing. In the portable air-flow guiding apparatus, the first connector and the second connector may be connected to each other when the discharging grill is mounted in the fan housing, thereby supplying electric power to the fan motor.

In the portable air-flow guiding apparatus, the discharging unit may further include a blocking jaw, a blocking lever, and an elastic member.

In the portable air-flow guiding apparatus, the blocking jaw may be mounted on the discharging grill and may be inserted into the fan housing when the discharging grill is mounted in the fan housing. In the portable air-flow guiding apparatus, the blocking lever may be mounted in the fan housing in such a manner that movement of the blocking lever is possibly blocked by and released from the blocking jaw. In the portable air-flow guiding apparatus, the elastic member may press the blocking lever in a direction in which the movement of the blocking lever is blocked by the blocking jaw and thus may maintain a state where the movement of the blocking lever is blocked by the blocking jaw.

In the portable air-flow guiding apparatus, the head unit may be combined with the columnar unit in such a manner that an angle at which the head unit is inclined in an upward-downward direction with respect to the columnar unit is adjustable.

In the portable air-flow guiding apparatus, the discharging unit may be formed in such a manner as to have a greater cross-sectional area than the flow-path unit.

In the portable air-flow guiding apparatus, the purification filter may include a HEPA filter and a deodorizing filter and thus may be capable of performing an air purification function.

According to another aspect of the present disclosure, there is provided a method of controlling a portable air-flow guiding apparatus. The method includes measuring a position of a heating source. The method includes measuring a height of a cooking utensil.

The method includes adjusting at least one of an angle in a horizontal direction of a head unit including a sucking unit and a height of the head unit according to the position of the heating source and the height of the cooking utensil.

In the method, the adjusting of the at least one of the angle in the horizontal direction of the head unit and the height of the head unit may include adjusting an angle in a vertical direction of the head unit according to the height of the cooking utensil.

The method may further include inputting a start command for the portable air-flow guiding apparatus; and adjusting positioning of the head unit to initial positioning according to the start command.

In the method, the measuring of the position of the heating source, the measuring of the height of the cooking utensil, and the adjusting of the at least one of the angle in the horizontal direction of the head unit and the height of the head unit may be performed subsequently to the adjusting of the positioning of the head unit.

In the method, in the inputting of the start command, the start command may be input by operating an operation button of the portable air-flow guiding apparatus.

In the method, in the inputting of the start command, the start command may be input from outside the portable air-flow guiding apparatus.

In the method, in the adjusting of the positioning of the head unit, the height of the head unit may be adjusted to a maximum height.

In the method, the measuring of the position of the heating source may include at least one of the following: measuring temperature of cooking heating equipment and thus measuring the position of the heating source; and measuring the position of the heating source through operation in conjunction with the cooking heating equipment.

In the method, in the measuring of the temperature of the cooling heating equipment, the angle in the horizontal direction of the head unit may be adjusted in a leftward-rightward direction, and thus the temperature of the cooling heating equipment may be measured.

In the method, in the measuring of the position of the heating source through the operation in conjunction with the cooking heating equipment, a relative position of the portable air-flow guiding apparatus with respect to the cooking heating equipment may be measured.

In the method, in the measuring of the position of the heating source through the operation in conjunction with the cooking heating equipment, the head unit may be rotated to the left or to the right in the horizontal direction on the basis of the relative position of the portable air-flow guiding apparatus.

In the method, in the measuring of the position of the heating source through the operation in conjunction with the cooking heating equipment, the temperature of the cooking heating equipment in conjunction may be measured while the head unit is rotated to the left or to the right and thus the position of the heating source may be measured.

In the method, in the measuring of the position of the heating source through the operation in conjunction with the cooking heating equipment, in-operation cooktop information on a cooktop that is turned on may be received from the cooking heating equipment with which the portable air-flow guiding apparatus operates in conjunction.

In the method, in the measuring of the position of the heating source through the operation in conjunction with the cooking heating equipment, the heating source may be detected on the basis of the in-operation cooktop information.

In the method, the adjusting of the at least one of the angle in the horizontal direction of the head unit and the height of the head unit may include at least one of the following: adjusting the angle in the horizontal direction on the basis of the position of the heating source; adjusting the height of the head unit on the basis of the height of the cooking utensil; and adjusting the angle in the vertical angle of the head unit in a case where a preset condition for vertical-angle adjustment is satisfied, on the basis of the height of the cooking utensil.

In the method, the adjusting of the angle in the horizontal direction may be performed earlier than the adjusting of the height of the head unit and the adjusting of the angle in the vertical angle.

In the method, in the adjusting of the height of the head unit, the height of the head unit may be adjusted on the basis of the height of the cooking utensil in such a manner that the head unit is vertically spaced by a preset optimal distance away from the cooking utensil.

In the method, the adjusting of the height of the head unit may include adjusting the height of the head unit to a maximum height in a case where the height of the cooking utensil is greater than the maximum height minus the preset optimal distance.

In the method, the adjusting of the height of the head unit may include adjusting the height of the head unit to a minimum height in a case where the height of the cooking utensil is equal to or smaller than the maximum height minus the optimal distance.

In the method, the preset condition for vertical-angle adjustment may include a condition that a distance between the head unit and the cooling utensil is smaller at the maximum height of the head unit than the optimal distance.

The method may include detecting a movement in a direction of the cooking utensil among movements of the portable air-flow guiding apparatus. The method may include adjusting the positioning of the head unit in a preset interference prevention mode in a case where the movement is detected.

In the method, the adjusting of the positioning of the head unit in the preset interference prevention mode may include at least one of the following: adjusting the height of the head unit to a preset interference prevention height; and rotating the head unit in the vertical direction and thus adjusting an angle of the head unit to a preset angle.

In the method, in the adjusting of the positioning of the head unit in the preset interference prevention mode, at least one of the height of the head unit and the angle in the vertical direction of the head unit may be adjusted in such a manner that a distance between the head unit and the cooking utensil is secured in a manner that is the same as a preset interference prevention distance.

The method may further include adjusting the positioning of the head unit to previous positioning thereof that is established before the interference prevention mode is executed, in a case where the movement is not detected for a preset reference time after the interference prevention mode is executed.

The method may further include detecting temperature of the cooking utensil side after the start command is input.

In the method, the measuring of the position of the heating source, the measuring of the height of the cooking utensil, and the adjusting of the at least one of the angle in the horizontal direction of the head unit and the height of the head unit may be performed subsequently to the adjusting of the positioning of the head unit, in a case where the temperature of the cooking utensil side exceeds a preset start temperature.

The portable air-flow guiding apparatus according to the present disclosure provides the following effects.

First, the first unit and the second unit are formed in such a manner as to be horizontally spaced apart from each other. Accordingly, a phenomenon that occurs when the sucking unit and the discharging unit are coaxially positioned in the vertical direction can be prevented. Thus, the effect of improving the efficiency of sucking and discharging air can be achieved.

Second, the first unit and the second unit are formed in such a manner as to be horizontally spaced apart from each other. Accordingly, a flow of air sucked toward the sucking unit and a flow of air discharged toward the discharging unit do not interfere with each other. Thus, the effect of improving the efficiency of sucking and discharging air can be achieved.

Third, the head unit is provided in such a manner as to be rotatable to the left and the right with respect to the base unit. When the portable air-flow guiding apparatus is used as a portable hood, a height of the head unit can be adjusted in such a manner that the sucking unit is positioned vertically adjacent to a cooking utensil according to a cooking environment, such as a position of a cooktop in use. Accordingly, oil mist and the like can be sucked at a position that is vertically adjacent to the cooking utensil. Thus, the effect of effectively improving the efficiency of sucking and discharging air can be achieved.

Fourth, the discharging unit has a structure in which oil mist and the like are discharged upward. Accordingly, when the portable air-flow guiding apparatus is used as a portable hood, the oil mist and the like are discharged toward a fixed-type hood. Thus, the effect of effectively removing the oil mist and the like occurring during food cooking in cooperation with the fixed-type hood can be achieved.

Fifth, the discharging fan and the fan motor are mounted over the columnar unit. Accordingly, the center of gravity of the portable air-flow guiding apparatus is positioned in the columnar unit side of the head unit in which the discharging unit is formed. Although the sucking unit of the head unit is rotated to the left or to the right, the effect of preventing the portable air-flow guiding apparatus from falling down can be achieved because the center of gravity is positioned in the columnar unit side.

Sixth, the fan motor rotating the discharging fan are positioned below a flow path along which oil mist and the like flow. Thus, the effect of preventing contamination of the fan motor with air or oil mist and the like can be achieved. In addition, when disassembling the portable air-flow guiding apparatus for cleaning the fan motor for preventing contamination, there is no need to disassemble the fan motor. Thus, the effect of simplifying the job of disassembling and cleaning can be achieved.

Seventh, the head main body is separated into the casing main body and the upper casing, and the flow-path unit through which the sucking unit and the discharging unit communicate with each other is separated from the casing main body. Thus, the effect in which the flow-path unit along which air or oil mist and the like flow is separable for cleaning can be achieved.

Eighth, the fan housing accommodating the discharging fan protrudes from the head unit. Thus, the effect in which the head main body accommodating the discharging fan and the fan motor is formed slimly in the upward-downward direction so that the entire thickness thereof is small can be achieved.

Ninth, the head unit is easily disassembled. Thus, the effect in which the discharging fan, the flow-path unit, the purification filter, such as the deodorizing filter, that are mounted in the head unit can be easily cleaned or replaced can be achieved.

Tenth, the first casing main body and the second casing main body are by a hinge mechanism with each other. Thus, the effect of easily replacing the oil mist filter in the shape of a roll filter after separating the lower casing from the casing main body can be achieved.

Eleventh, the configuration is employed in which, when the portable air-flow guiding apparatus is used as a portable hood, the end portion of the oil mist filter to be discharged to over the head unit is discharged in a direction of the discharging unit that is opposite to a direction of the cooktop. The effect of preventing a fire accident that may occur when the end portion of the oil mist filter is discharged toward the cooktop can be achieved.

Twelfth, the head unit is provided in such a manner that a height thereof is adjustable. The effect in which, when the portable air-flow guiding apparatus is used as a portable hood, oil mist and the like that occur from cooking utensils of various heights are effectively sucked and discharged without influencing cooking can be achieved.

Thirteenth, components, such a weight plate and a battery module, are arranged in the base unit or the columnar unit side, and thus the center of gravity is positioned in the columnar unit side or the base unit side, thereby ensuring the upright position of the portable air-flow guiding apparatus. Thus, the effect of preventing the portable air-flow guiding apparatus from falling down can be achieved.

Fourteenth, the structure in which the purification filter constituting the filter unit can be replaced is employed. Accordingly, instead of the purification filter dedicated for food cooking, a purification filter for air cleaning can be used. Thus, the effect of using the portable air-flow guiding apparatus as an air purifier can be achieved.

Fifteenth, when the portable air-flow guiding apparatus finds application as a hood with directivity, a position of the sucking unit formed in the head unit is automatically adjusted, and thus the sucking unit is positioned over the cooking utensil. Thus, the effect of improving the efficiency of sucking the oil mist and the like can be achieved.

Sixteenth, when the portable air-flow guiding apparatus finds application as the hood with directivity, a position of a heating source is detected, and thus a position in a horizontal direction of the head unit is automatically adjusted, and thus, the sucking unit is positioned over the heating source. Thus, the effect of improving the efficiency of sucking the oil mist and the like can be achieved.

Seventeenth, when the portable air-flow guiding apparatus finds application as the hood with directivity, a distance to the cooking utensil is measured, and thus the height of the head unit is automatically adjusted to an optimal height according to the distance to the cooking utensil. Thus, the effect of improving the efficiency of sucking the oil mist and the like can be achieved.

Eighteenth, when the portable air-flow guiding apparatus finds application as the hood with directivity, in a case where a height of the cooking utensil is relatively great, an angle in the vertical direction of the head unit is also automatically adjusted. Thus, the effect of adjusting a position of the sucking unit to an optimal position can be achieved.

Nineteenth, when the portable air-flow guiding apparatus finds application as the hood with directivity, although the portable air-flow guiding apparatus is not separately operated, the portable air-flow guiding apparatus is automatically operated through operation in conjunction with the fixed-type hood. Thus, the effect of improving user convenience can be achieved.

Twentieth, when the portable air-flow guiding apparatus finds application as the hood with directivity, while the portable air-flow guiding apparatus is in operation, a user's movement is also detected, and thus positioning of the head unit is adjusted. Thus, the effect of minimizing interference with a user's movement involved in cooking food can be achieved.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 10 to 16 are views each illustrating an implementation example of a configuration of a roll filter unit according to the first embodiment of the present disclosure;

DETAILED DESCRIPTION OF THE INVENTION

Figure 1:
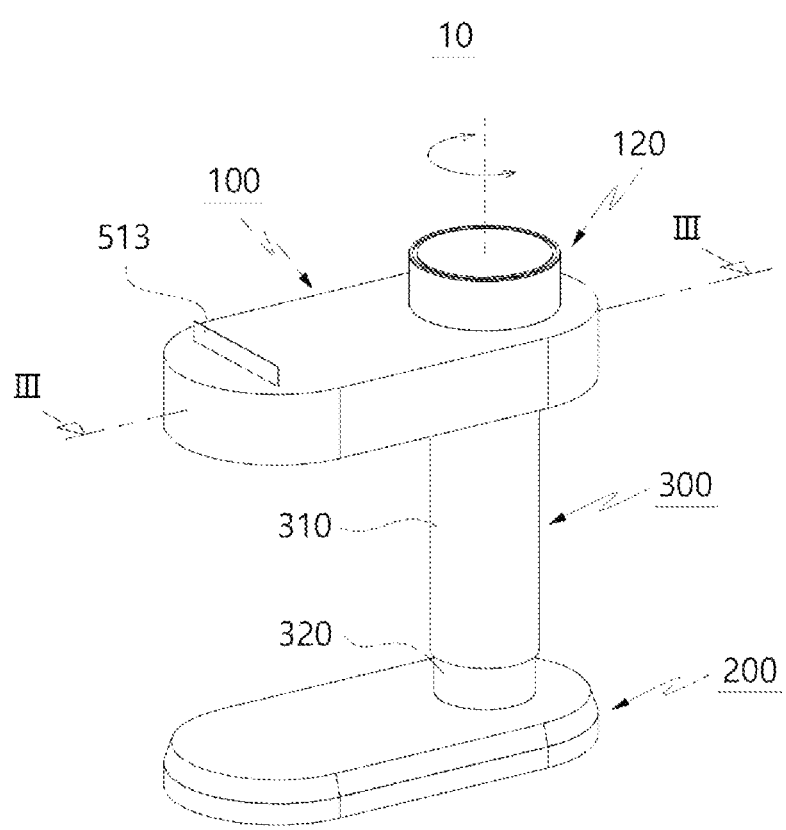
FIG. 1 is a perspective view illustrating a portable air-flow guiding apparatus according to a first embodiment of the present disclosure.

Advantages and features of the present disclosure, and methods of achieving the advantages and the features will be apparent from embodiments that will be described in detail below with reference to the accompanying drawings. However, the present disclosure is not limited to the embodiments that will be disclosed below, and will be practiced in various different forms. The embodiments are only provided to meet the disclosure requirement and to make the scope of the disclosure fully noticeable to a person of ordinary skill in the art to which the present disclosure pertains. The present disclosure should be only defined by the claims. The same reference character throughout the specification refers to the same constituent element.

A portable air-flow guiding apparatus 10 according to a first embodiment of the present disclosure may be used as a portable hood in use during food cooking and may be used as an air purifier for purifying indoor or outdoor air. The portable air-flow guiding apparatus according to the first embodiment of the present disclosure that finds application as the portable hood, followed by the portable air-flow guiding apparatus according to the first embodiment of the present disclosure that finds application as the air purifier, will be described below.

A portable air-flow guiding apparatus 10 according to the first embodiment of the present disclosure, as illustrated in FIG. 1, may include a head unit 100, a base unit 200, and a columnar unit 300.

The base unit 200 according to the first embodiment of the present disclosure may support the head unit 100, and the base unit 200 and may be seated on a bottom. According to the first embodiment of the present disclosure, a plate-like surface of the base unit 200 has, for example, the shape of a racetrack, but the technical idea of the present disclosure is, of course, not limited to this shape.

The head unit 100 according to the first embodiment of the present disclosure may suck air and may discharge the sucked air back. According to the present disclosure, as an implementation example, the head unit 100 is configured to include a sucking unit 110 and a discharging unit 120.

Air may be sucked through the sucking unit 110 according to the first embodiment of the present disclosure. The air sucked into the head 100 through the sucking unit 110 may be discharged through the discharging unit 120.

According to the first embodiment of the present disclosure, as an implementation example, as illustrated in FIG. 1, the sucking unit 110 and the discharging unit 120 are formed in such a manner as to be spaced apart from each other at a right angle with respect to the vertical direction. That is, according to the first embodiment of the present disclosure, a configuration may be employed in which air is sucked into one side in the horizontal direction of the center of the head unit 100, and is discharged through the discharging unit 120 horizontally spaced away from the sucking unit 110.

With this configuration, a bypass phenomenon that occurs when the sucking unit 110 and the discharging unit 120 are coaxially positioned in the vertical direction is prevented, and thus the air sucking efficiency can be improved. In the bypass phenomenon, due to a flow of air discharged through the discharging unit 120 or due to heat generated during food cooking, a portion of air flows along the periphery of the head unit 100 toward the direction of the discharging unit 120 without being introduced into the sucking unit 110.

According to the first embodiment of the present disclosure, as an implementation example, the head unit 100 has the shape of a racetrack in a manner that corresponds to the shape of the base unit 200. As an implementation example, the sucking unit 110 is formed in one side in the horizontal direction of the head unit 100 having the shape of a racetrack, and the discharging unit 120 is formed in the other side thereof.

The columnar unit 300 according to the first embodiment of the present disclosure connects the head unit 100 and the base unit 200 to each other in such a manner that the head unit 100 is vertically spaced away from the base unit 200. According to the first embodiment of the present disclosure, as an implementation example, the columnar unit 300 is combined with the head unit 100 in a manner that is spaced away from the sucking unit 110 toward the direction of the discharging unit 120. In addition, as an implementation example, the columnar unit 300 is rotatably combined with the base unit 200 in such a manner that the sucking unit 110 side of the head unit 100 is rotated in the leftward-rightward direction.

With the above-described configuration, the head unit 100 is enabled to rotate about the columnar unit 300 combined with the discharging unit 120 side of the head unit 100, and the sucking unit 110 side of the head unit 100 that is horizontally spaced away from the discharging unit 120 is rotatable in the leftward-rightward direction. Thus, a position of the sucking unit 110 is adjustable.

Figure 2A:
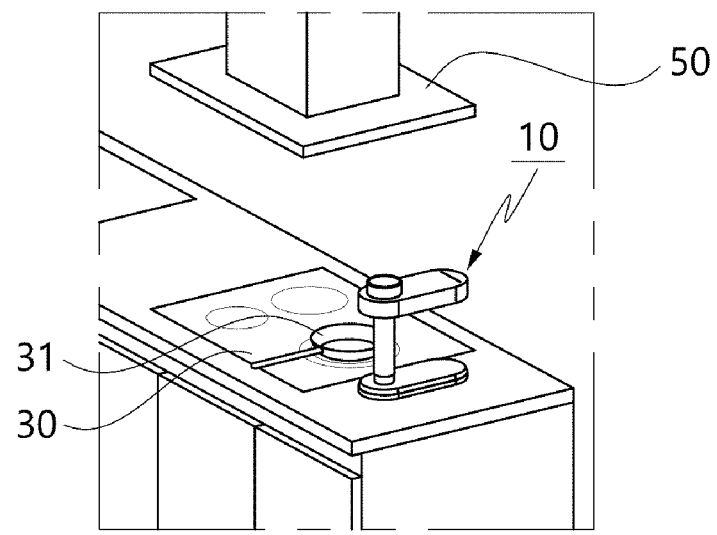
FIGS. 2A to 2C are views each illustrating an example of a state where the portable air-flow guiding apparatus according to the first embodiment of the present disclosure is used.
Figure 2B:
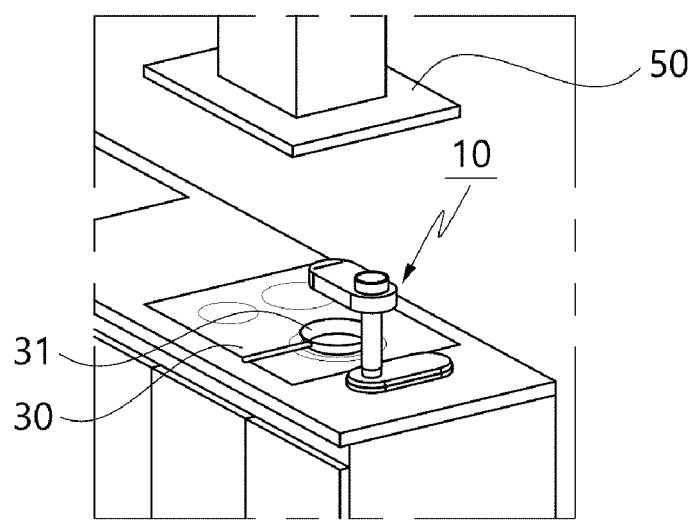
Figure 2C:
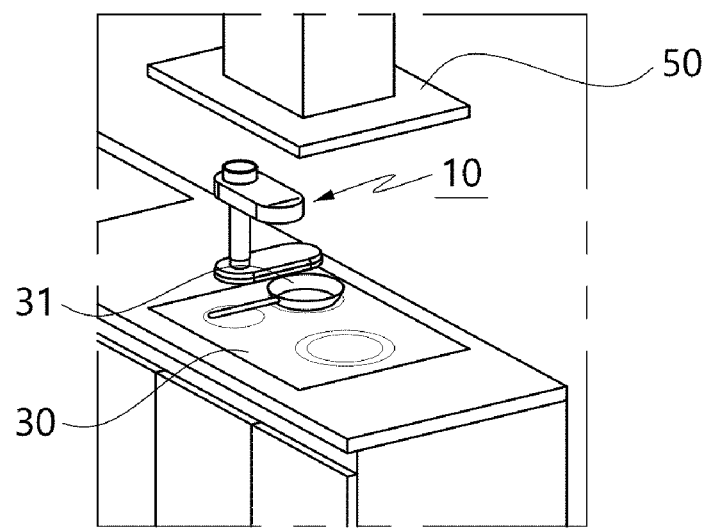

FIGS. 2A, 2B, and 2C are views each illustrating an example of a state of the portable air-flow guiding apparatus 10 according to the first embodiment of the present disclosure is used. FIGS. 2A, 2B, and 2C illustrate an example of a state where the portable air-flow guiding apparatus 10 is used, for example, in a kitchen in a normal house where a stationary hood 50, such as an induction stove, is installed.

The use of the portable air-flow guiding apparatus 10 according to the first embodiment of the present disclosure is described with reference to FIGS. 2A, 2B, and 2C. When the portable air-flow guiding apparatus 10 is not in use, as illustrated in FIG. 2A, the head unit 100 is rotated so that the head unit 100 and the base unit 200 are positioned in such a manner as to face each other. Thus, a space that is occupied by the base unit 200 and the head unit 100 can be minimized.

The portable air-flow guiding apparatus 10 according to the first embodiment of the present disclosure, as illustrated in FIGS. 2B, and 2C, is seated to the left or right of cooking heating equipment 30 according to a position of an in-operation cooktop, among cooktops of the cooking heating equipment 30, such as an induction stove. In this state, the head unit 100 may be rotated in the leftward or rightward direction, and thus a position of the sucking unit 110 of the head unit 100 may be adjusted in such a manner that the sucking unit 110 is positioned above a cooking utensil 31, such as a pot.

In the manner, according to a cooking environment, such as the position of the cooktop, the position of the sucking unit 110 is adjusted in such a manner that the sucking unit 110 is positioned vertically adjacent to the cooking utensil 31. Thus, the sucking unit 110, while positioned vertically adjacent to the cooking utensil 31, may suck oil mist and the like. The sucking efficiency can be effectively increased.

Figure 3:
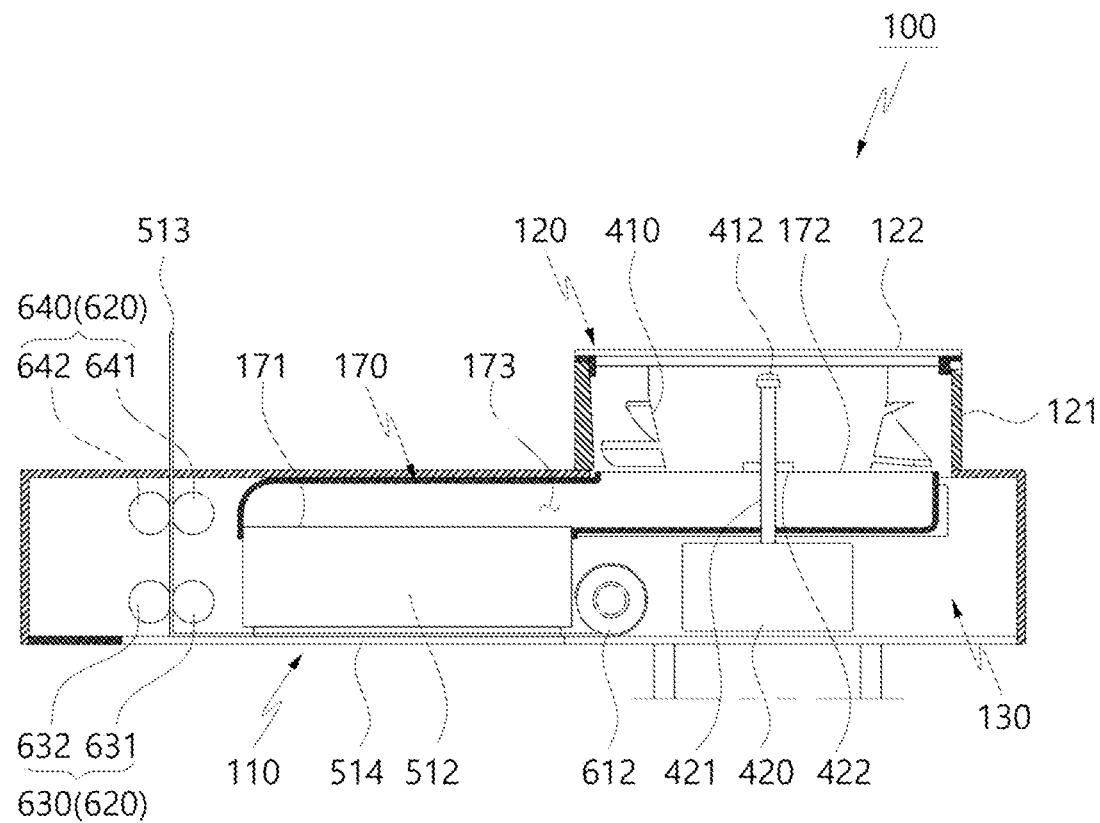
FIG. 3 is a cross-sectional view, taken along line A-A on a head unit in FIG. 1 according to the first embodiment of the present disclosure.

FIG. 3 is a cross-sectional view illustrating the head unit 100 according to the first embodiment of the present disclosure. FIG. 3 illustrates a vertical cross section of the head unit 100 in the direction from the sucking unit 110 to the discharging unit 120.

In the case, as an implementation example, the sucking unit 110 according to the first embodiment of the present disclosure is open at the bottom, and thus air is sucked from below. As an implementation example, the discharging unit 120 is open at the top, and thus the air sucked through the sucking unit 110 is discharged upward.

With this configuration, as illustrated in FIGS. 2A, 2B, and 2C, the sucking unit 110, while positioned vertically adjacent to the cooking utensil 31, sucks oil mist and the like from below. Thus, the sucking efficiency can be improved. In addition, the sucked oil mist and the like are discharged upward through the discharging unit 120 horizontally spaced away from the sucking unit 110. Thus, as described above, the bypass phenomenon that occurs due to the discharged air or the heat generated by the cooking utensil 31 during food cooking can be prevented.

In addition, the discharging unit 120 has a structure that discharges the oil mist and the like upward. As illustrated in FIGS. 2A, 2B, and 2C, the oil mist and the like are discharged toward the direction of the stationary hood 50. Thus, the stationary hood 50 can participate in effectively removing the oil mist and the like occurring during food cooking.

In this case, according to the first embodiment of the present disclosure, as an implementation example, the sucking unit 110 and the discharging unit 120 are formed in the head unit 100 in such a manner as to be spaced apart from each other in order not to vertically overlap each other. That is, as an implementation example, the sucking unit 110 and the discharging unit 120 are formed in the head unit 100 in such a manner that respective edge portions in a facing direction thereof do not overlap in the vertical direction. Accordingly, air sucked toward the sucking unit 110 side of the head unit 100 and air discharged from the discharging unit 120 side of the head unit 100 do not interfere with each other. Thus, the sucking and discharging efficiency can be improved.

The portable air-flow guiding apparatus 10 according to the first embodiment of the present disclosure, as illustrated in FIG. 3, may further include a discharging fan 410.

The discharging fan 410 according to the first embodiment of the present disclosure may be mounted inside the discharging unit 120. The discharging fan 410 generates a suction force for introducing air through the sucking unit 110 and discharging the introduced air through the discharging unit 120.

According to the first embodiment of the present disclosure, the discharging fan 410 may be mounted in the discharging unit 120 side of the head unit 100 and thus the center of gravity of the portable air-flow guiding apparatus 10 according to the first embodiment of the present disclosure may be positioned in the columnar unit 300 side of the portable air-flow guiding apparatus 10 in which the discharging unit 120 is formed. Accordingly, as illustrated in FIGS. 2A, 2B, and 2C, although the sucking unit 110 side of the head unit 100 is rotated in the leftward-rightward direction, the center of gravity is positioned in the columnar unit 300 side of the portable air-flow guiding apparatus 10. Thus, when the head unit 100 is rotated in the leftward-rightward direction, the portable air-flow guiding apparatus 10 according to the first embodiment of the present disclosure can be prevented from falling down.

In addition, according to the first embodiment of the present disclosure, the portable air-flow guiding apparatus 10 may further include a fan motor 420. According to the first embodiment of the present disclosure, as an implementation example, the fan motor 420 is mounted below the discharging fan 410 and rotates the discharging fan 410.

That is, the discharging fan 410 and the fan motor 420, as illustrated in FIG. 3, are mounted in the head unit 100 in such a manner as to be positioned in the columnar unit 300 side of the portable air-flow guiding apparatus 10, preferably, over the columnar unit 300. Accordingly, as described above, the center of gravity of the entire portable air-flow guiding apparatus 10 is positioned in the columnar unit 300 side of the portable air-flow guiding apparatus 10. Thus, the portable air-flow guiding apparatus 10 can be prevented from falling down.

Figure 4:
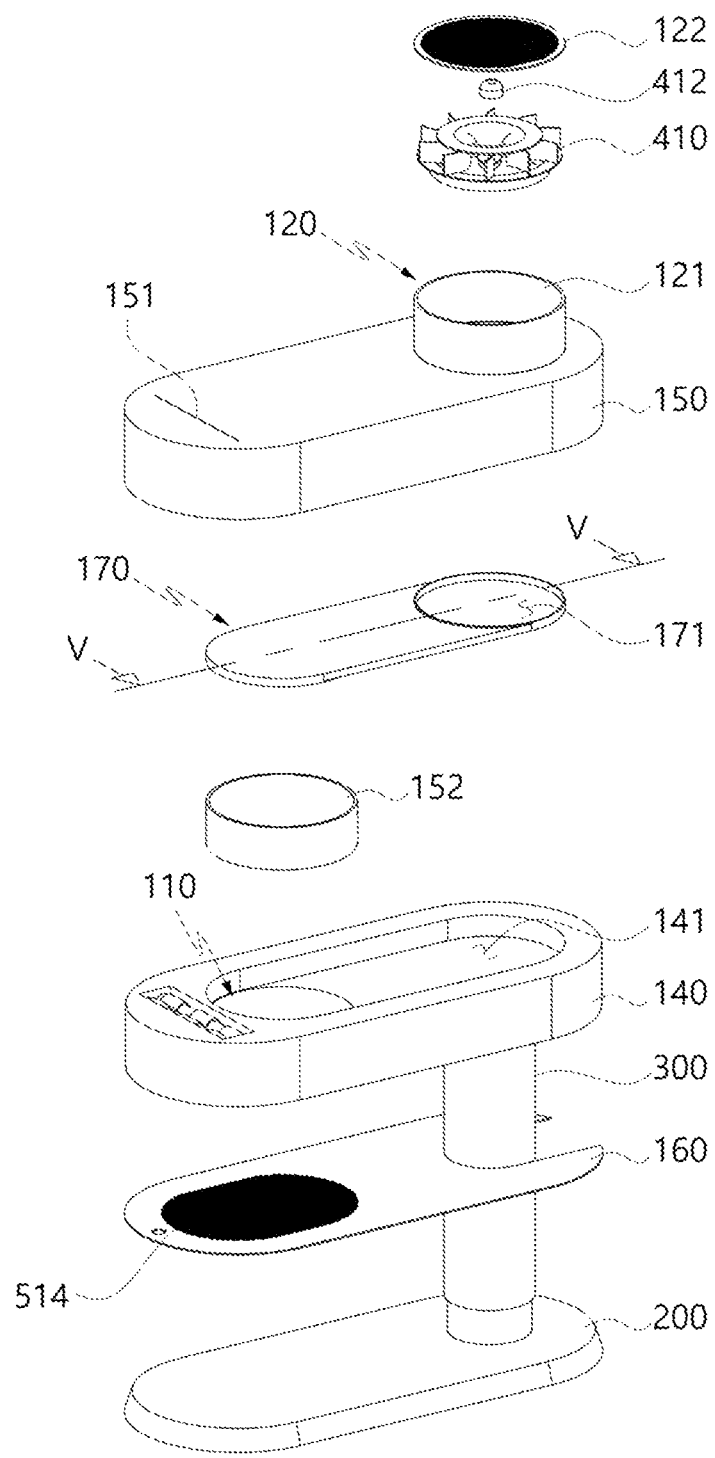
FIG. 4 is a partially exploded perspective view illustrating the portable air-flow guiding apparatus according to the first embodiment of the present disclosure.

FIG. 4 is a partially exploded perspective view illustrating the portable air-flow guiding apparatus 10 according to the first embodiment of the present disclosure. FIG. 4 illustrates a state where one portion of the head unit 100 of the portable air-flow guiding apparatus 10 is exploded. With reference to FIG. 4, the head unit 100 according to the first embodiment of the present disclosure may include a head main body 130 and a flow-path portion 170.

The head main body 130 according to the first embodiment of the present disclosure may be formed in such a manner that the sucking unit 110 and the discharging unit 120, which are described above, are horizontally spaced apart from each other.

The flow-path portion 170 according to the first embodiment of the present disclosure is provided inside the head main body 130 and forms a flow path along which the air sucked through the head unit 110 flows toward the discharging unit 120.

Figure 5:
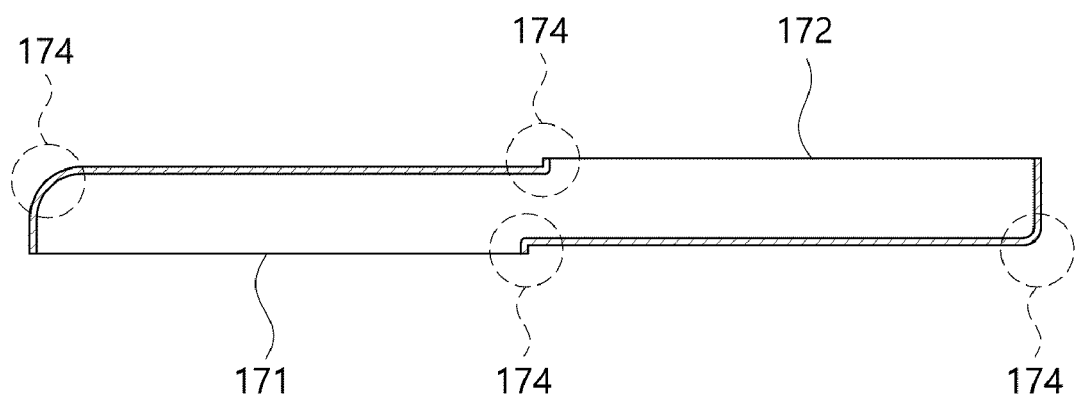
FIG. 5 is a cross-sectional view taken along line B-B on a flow-path portion in FIG. 4 according to the first embodiment of the present disclosure.

FIG. 5 is a cross-sectional view taken along line B-B on the flow-path portion 170 in FIG. 4 according to the first embodiment of the present disclosure.

With reference to FIGS. 3 and 5, as an implementation example, the flow-path portion 170 according to the first embodiment of the present disclosure includes a sucking inlet 171, a discharging outlet 172, and an inner flow path 173.

In this case, the sucking inlet 171 is open at the bottom in a manner that faces toward the sucking unit 110 of the head main body 130. The discharging outlet 172 is open at the top in a manner that faces toward the discharging unit 120 of the head main body 130. The sucking inlet 171 and the discharging outlet 172 horizontally communicate with each other through an inner flow path 173.

According to the first embodiment of the present disclosure, as an implementation example, as illustrated in FIGS. 4 and 5, a cylindrical member in which the sucking inlet 171, the discharging outlet 172, and the inner flow path 173 are formed is mounted inside the head main body 130, and this formation results in forming the flow-path portion 170. To this end, as an implementation example, as illustrated in FIG. 4, a flow path space 141 is formed in the head main body 130. The flow-path portion 170 is seated in the flow path space 141.

In the first embodiment illustrated in FIGS. 4 and 5, as an implementation example, the flow-path portion 170 is provided as a separate member, and is mounted in the flow path space 141 inside the head main body 130. However, the flow-path portion 170 having the sucking inlet 171, the discharging outlet 172, and the inner flow path 173 may, of course, be formed by machining the inside of the head main body 130.

In this case, as illustrated in FIG. 5, an air flow direction is changed in an edge portion 174 of an inner wall surface of the inner flow path 173 and, for this reason, is machined in a rounded manner. Thus, flow loss, occurring due to collision of air flowing through the flow-path portion 170 with the edge portion 174, can be minimized.

According to the first embodiment of the present disclosure, as an implementation example, the discharging unit 120 is formed in such a manner as to have a larger cross-sectional area than the flow-path portion 170, particularly, the inner flow path 173. Usually, flow-path loss may occur due to expansion or reduction of the flow path. When the flow path is expanded or reduced, in a case where a discharging unit 120 side cross-section area of the head unit 100 is larger than a flow-path portion 170 side cross-sectional area of the head unit 100, the flow-path loss can be minimized.

According to the first embodiment of the present disclosure, as an implementation example, the discharging fan 410 and the fan motor 420 are mounted in the head main body 130 in such a manner as to be positioned over and underneath, respectively, the discharging outlet 172 in the flow-path portion 170. More specifically, as illustrated in FIG. 3, the discharging fan 410 may be mounted in the head main body 130 in such a manner as to be positioned over the discharging outlet 172 in the flow-path portion 170. The fan motor 420 may be mounted in the head main body 130 in such a manner as to be positioned under the discharging outlet 172 in the flow-path portion 170.

With this configuration, the oil mist and the like sucked through the sucking unit 110 flow along the flow-path portion 170 and then are discharged through the discharging unit 120 to the outside without passing through the fan motor 420 mounted under the flow-path portion 170. Thus, the fan motor 420 can be prevented from being contaminated with the oil mist and the like. Accordingly, when the portable air-flow guiding apparatus 10 according to the first embodiment of the present disclosure is disassembled for cleaning, the fan motor 420 does not need to be disassembled. Thus, the effect of simplifying the job of disassembling and cleaning the portable air-flow guiding apparatus 10 can be achieved.

The head main body 130 according to the present disclosure, as illustrated in FIG. 3, may include a casing main body 140, an upper casing 150, and a lower casing 160.

The sucking unit 110 may be formed in the casing main body 140 according to the first embodiment of the present disclosure. As an implementation example, the separate flow-path portion 170 is described above as being mounted. Accordingly, as illustrated in FIG. 3, the flow path space 141 in which the flow-path portion 170 is seated may be formed in the casing main body 140.

The discharging unit 120 may be formed in the upper casing 150 according to the first embodiment of the present disclosure. According to the first embodiment of the present disclosure, the flow path space 141 formed in the casing main body 140 is open at the top. The upper casing 150 is combined with the casing main body 140, in a direction of moving down from over the casing main body 140, and thus closes the flow path space 141.

Accordingly, a user may separate the upper casing 150 from the casing main body 140 and then may separate the flow-path portion 170 seated in the flow path space 141. Thus, it is possible to clean the separated flow-path portion 170.

According to the first embodiment of the present disclosure, as an implementation example, the upper casing 150 is combined with the casing main body 140 in such a manner as to surround a lateral surface of the casing main body 140. That is, the upper casing 150 forms the outside lateral surface of the head main body 130.

The lower casing 160 according to the first embodiment of the present disclosure may be combined with the casing main body 140, in a direction of moving up from under the casing main body 140. As an implementation example, the lower casing 160 according to the first embodiment of the present disclosure has the shape of a plate.

In this case, a through-hole (not illustrated) may be formed, at a position corresponding to the sucking unit 110, in the lower casing 160 in a manner that passes therethrough from top to bottom. A free filter 514 may be mounted in the through-hole formed in the lower casing 160. According to the first embodiment of the present disclosure, the free filter 514 may filter out relatively large-sized dust or foreign material to prevent introduction thereof into the sucking unit 110 side of the head unit 100.

The discharging unit 120 according to the first embodiment of the present disclosure, as illustrated in FIGS. 3 and 4, may further include a fan housing 121.

The fan housing 121 according to the first embodiment of the present disclosure may protrude upward from an upper plate-like surface of the head main body 130. According to the first embodiment of the present disclosure, the upper casing 150 forms the upper plate-like surface of the head main body 130. Accordingly, as an implementation example, the fan housing 121 is formed in an upper plate-like surface of the upper casing 150 in a manner that protrudes upward therefrom.

In this case, according to the first embodiment of the present disclosure, as an implementation example, the fan housing 121 has the shape of a cylinder that is open at the top and bottom, and the discharging fan 410 is accommodated inside the fan housing 121. More specifically, the fan housing 121 is formed in the upper casing 150 of the head main body 130 in a manner that protrudes upward therefrom and is configured in such a manner as accommodate the discharging fan 410 therein. Thus, as illustrated in FIG. 3, although the discharging fan 410 and the fan motor 420 are arranged, in the upward-downward direction, in the head main body 130, the head main body 130 may be slimly formed so that the entire thickness thereof is small.

A discharging grill 122 may be detachably combined with an upper end of the fan housing 121 according to the first embodiment of the present disclosure, and thus may cover an upper opening in the fan housing 121. Accordingly, when the discharging fan 410 rotates, an accident, such as a collision with the discharging fan 410, can be prevented, and it is possible to discharge the oil mist and the like to over the discharging fan 410.

Figure 6:
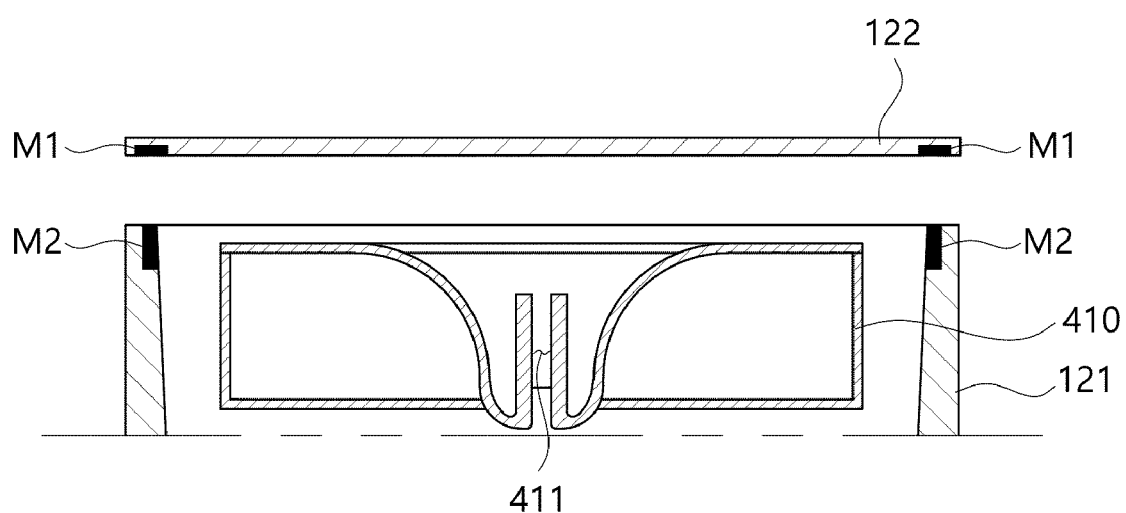
FIG. 6 is a cross-sectional view illustrating an implement ion example of a discharging unit according to the first embodiment of the present disclosure.

According to the first embodiment of the present disclosure, as an implementation example, the discharging fan 410 is detachably combined with the fan housing 121 using a magnetic force. With reference to FIG. 6, at least one first magnetic member M is mounted on an edge portion of the discharging grill 122, and a second magnetic member corresponding to the first magnetic member M is mounted on an upper edge portion of the fan housing 121. Thus, the discharging grill 122 may be detachably combined with the upper end of the fan housing 121. At this point, both the first magnetic member M and the second magnetic member M may have a magnetic force. Of course, only one thereof may have a magnetic force.

As another implementation example, the discharging grill 122 may be combined with the fan housing 121 in a manner that is forced into the fan housing 121. Of course, the discharging grill 122 may be detachably combined with the fan housing 121 in various ways, such as hooking the discharging grill 122 and the fan housing 121 by rotating the discharging grill 122.

Figure 7:
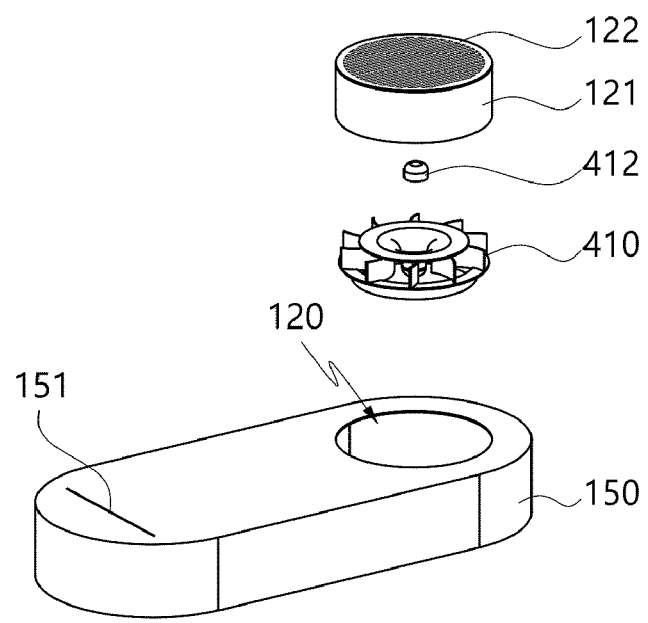
FIG. 7 is a partially exploded perspective view illustrating another implementation example of the discharging unit according to the first embodiment of the present disclosure.

In the first embodiment illustrated in FIG. 4, as an implementation example, a structure where the fan housing 121 is integrally formed with the upper casing 150 of the head main body 130 or is not separated from the upper casing 150 of the head main body 130 is employed. As another implementation example, as illustrated in FIG. 7, the fan housing 121 may be detachably combined with the upper casing 150 of the head main body 130.

Figure 8:
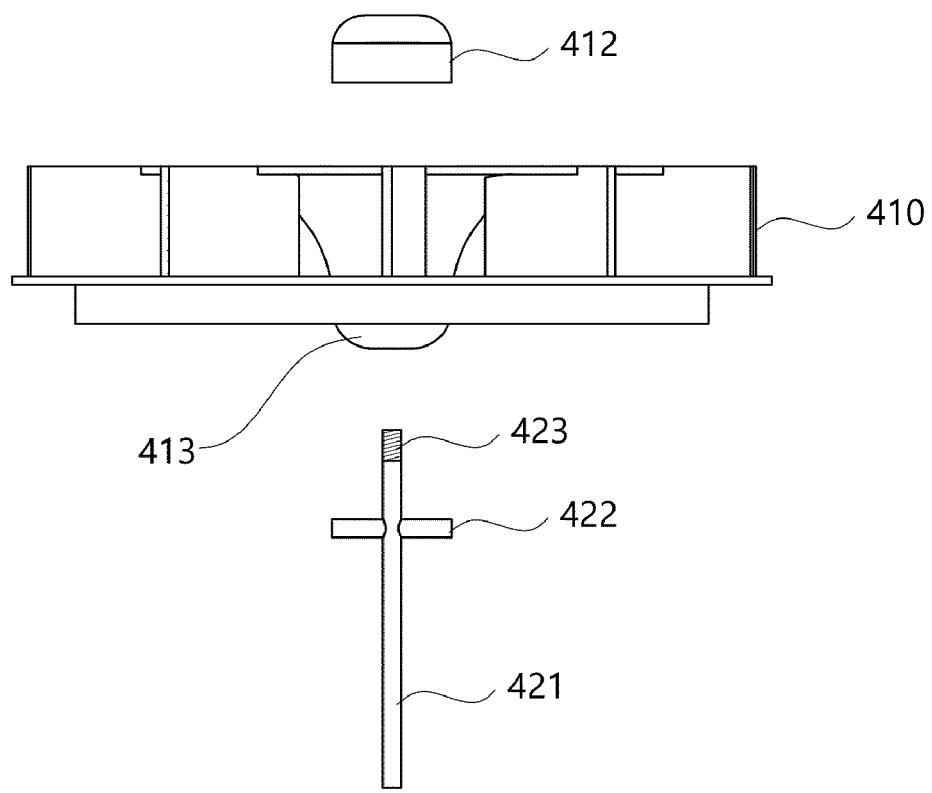
FIGS. 8 and 9 are views each illustrating a structure where a discharging fan and a fan motor according to the first embodiment of the present disclosure are combined with each other.
Figure 9:
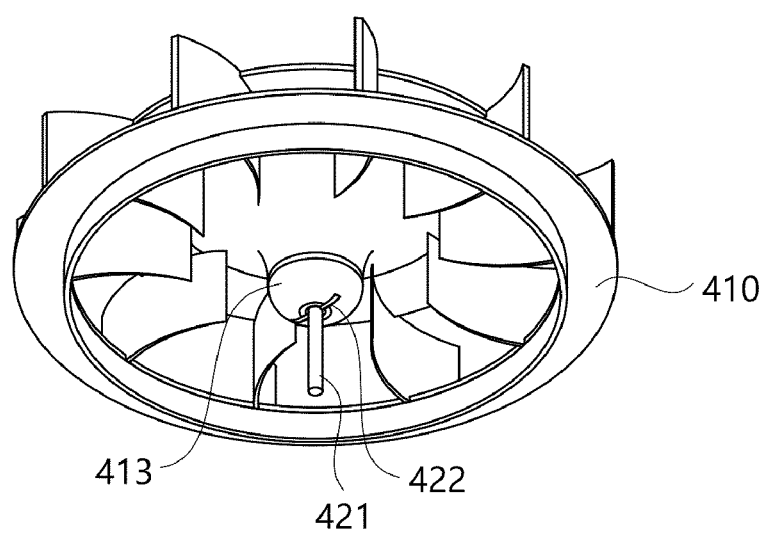

FIGS. 8 and 9 are views each illustrating a structure where the discharging fan 410 and the fan motor 420 according to the first embodiment of the present disclosure are combined with each other.

With reference to FIGS. 3, 8, and 9, the fan motor 420 according to the first embodiment of the present disclosure may be configured to include a fan shaft 421. The fan shaft 421 extends from the fan motor 420 toward the discharging fan 410 and transfers a rotational force of the fan motor 420 to the discharging fan 410. In this case, a screw thread 423, as illustrated in FIG. 8, may be formed on an outer surface of an end portion of the discharging fan 410.

A shaft through-hole 411 (refer to FIG. 6) may be formed in the discharging fan 410 according to the first embodiment of the present disclosure in a manner that passes therethrough from top to bottom. In this case, when the discharging fan 410 is connected to the fan motor 420, an end portion of the fan shaft 421 passes through the shaft through-hole 411, and thus the discharging fan 410 is combined with the fan shaft 421. In this case, the end portion of the fan shaft 421 on which the screw thread 423 is formed may be exposed to the outside in a manner that is positioned over the discharging fan 410.

The discharging fan 410 according to the first embodiment of the present disclosure may further include a fan nut 412. The end portion of the fan shaft 421 that has the screw thread 423 thereon passes through the shaft through-hole 411 and then is inserted into the fan nut 412. Thus, the discharging fan 410 is fixed to the fan shaft 421.

With the above-described configuration, after the discharging grill 122 is separated or the fan housing 121 is separated, the fan nut 412 is loosened from the fan shaft 421. Thus, the discharging fan 410 may be separated from the fan shaft 421.

In this case, according to the first embodiment of the present disclosure, as an implementation example, a fan blocking portion 413 is formed in a bottom of the discharging fan 410. As an implementation example, the fan shaft 421 may further include a shaft blocking protrusion 422 that sticks in the fan blocking protrusion 413.

The shaft blocking protrusion 422 according to the first embodiment of the present disclosure radially protrudes outward from an outer circumferential surface of the fan shaft 421. Thus, when passing through the shaft through-hole 411, the fan shaft 421 sticks in the fan blocking portion 413. As illustrated in FIGS. 8 and 9, according to the first embodiment of the present disclosure, as an implementation example, the shaft blocking protrusion 422 is formed in the shape of a bar on the outer circumferential surface of the fan shaft 421 in a manner that radially protrudes outward therefrom. The fan blocking portion 413 is formed in the shape of a groove in such a manner that the shaft blocking protrusion 422 in the shape of a bar is inserted into the fan blocking portion 413.

Accordingly, when rotation of the fan motor 420 rotates the fan shaft 421, the shaft blocking protrusion 422 of which movement is blocked by the fan blocking portion 413 rotates the discharging fan 410.

The portable air-flow guiding apparatus 10 according to the first embodiment of the present disclosure, as illustrated in FIG. 3, may further include a filter unit 500.

The filter unit 500 according to the first embodiment of the present disclosure may be mounted in the sucking unit 110. According to the first embodiment of the present disclosure, as an implementation example, the filter unit 500 includes at least one purification filter 512, 513, or 514 that purifies air sucked through the sucking unit 110. As one implementation example, the purification filter 512, 513, or 514 includes at least one of a deodorizing filter 512 and an oil mist filter 513. According to the present disclosure, as an implementation example, the deodorizing filter 512 and the oil mist filter 513 are mounted. In this case, as described above, the free filter 514 mounted in the through-hole in the lower casing 160 may be among the purification filters 512, 513, and 514.

According to the first embodiment of the present disclosure, as an implementation example, a fiber filter, such as a non-woven fabric filter, is used as the oil mist filter 513. As an implementation example, an aluminum mesh filter is used as the free filter 514, and a filter formed of a corrugated activated carbon material is used as the deodorizing filter 512. The deodorizing filter 512, the oil mist filter 513, and the free filter 514 are described above as being exemplary according to the first embodiment of the present disclosure, and therefore filters formed of other materials may be used.

According to the first embodiment of the present disclosure, as an implementation example, as illustrated in FIG. 4, the upper casing 150 is separated from the casing main body 140, and the deodorizing filter 512 is mounted in the sucking unit 110, in a direction of moving downward from over the sucking unit 110 of the casing main body 140. Accordingly, the upper casing 150 is separated from the casing main body 140. Then, it is possible to replace the deodorizing filter 512.

As an implementation example, the oil mist filter 513 according to the first embodiment of the present disclosure is formed in the shape of a roll filter. To this end, the portable air-flow guiding apparatus 10 according to the first embodiment of the present disclosure may include a roll filter unit 600 capable of discharging the oil mist filter 513 to the outside of the head unit 100 by way of the sucking unit 110 side of the head unit 100.

FIGS. 10 to 16 are views each illustrating an implementation example of a configuration of the roll filter unit 600 according to the first embodiment of the present disclosure.

With reference to FIGS. 10 to 16, the roll filter unit 600 according to the first embodiment of the present disclosure may include a filter roll 610 and a filter transportation unit 620.

Figure 10:
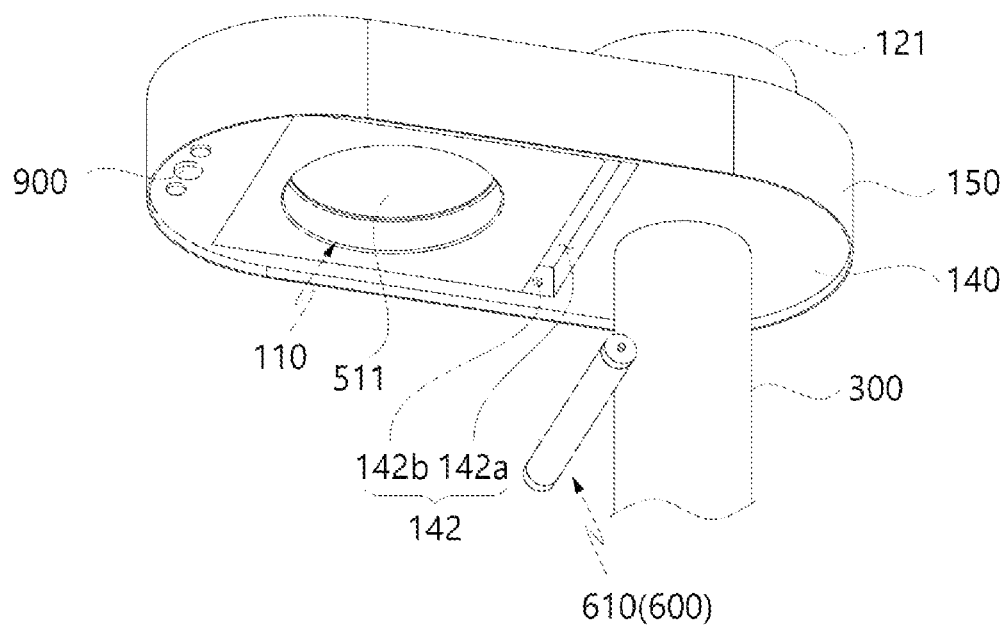

The oil mist filter 513 may be wound on the filter roll 610. In this case, the filter roll 610, on which the oil mist filter 513 is wound, may be rotatably mounted on the head unit 100. According to the present disclosure, as an implementation example, as illustrated in FIG. 10, the roll filter 610 is detachably mounted on a roll mounting portion 142 formed in a lower portion of the casing main body 140 of the head main body 130.

The roll mounting portion 142 according to the first embodiment of the present disclosure may include a roll accommodation portion 142a and a shaft combination portion 142b.

The roll accommodation portion 142a is formed in a lower surface of the casing main body 140 in a manner that is recessed therefrom, and the filter roll 610 may be inserted into the roll accommodation portion 142a from below. The shaft combination portion 142b may be formed on each of the opposite inner lateral surfaces of the roll accommodation portion 142a, and may be combined with a roll combination kit 612 described below of the filter roll 610.

Figure 11:
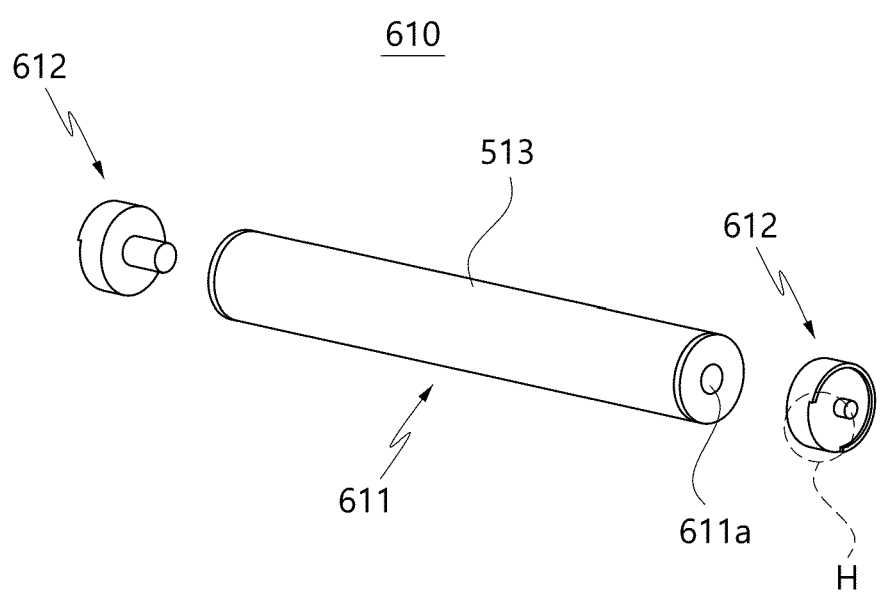
Figure 12A:
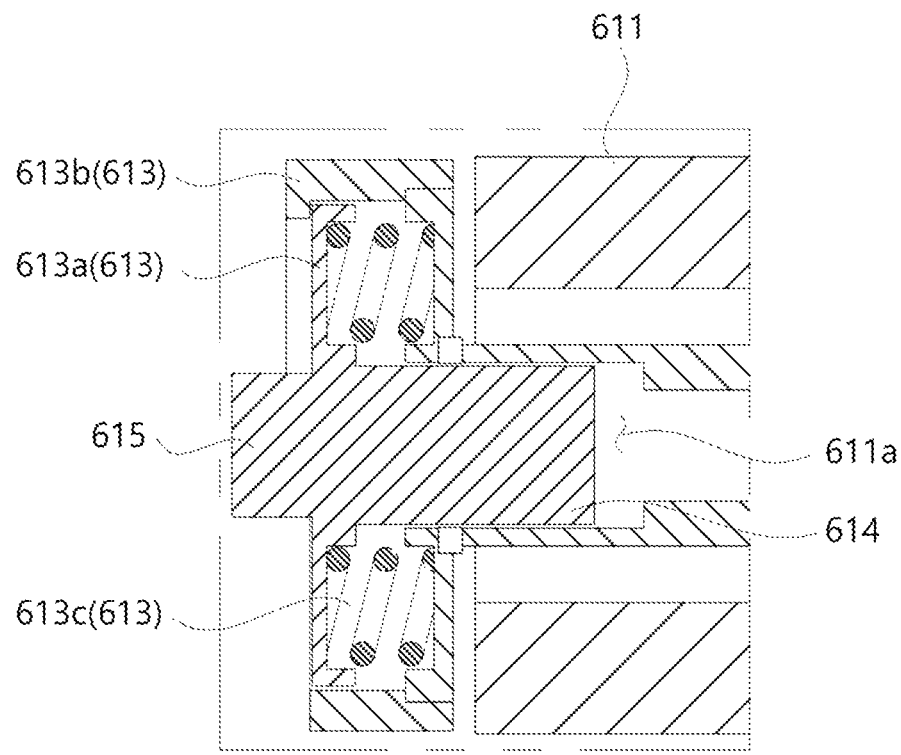
Figure 12B:
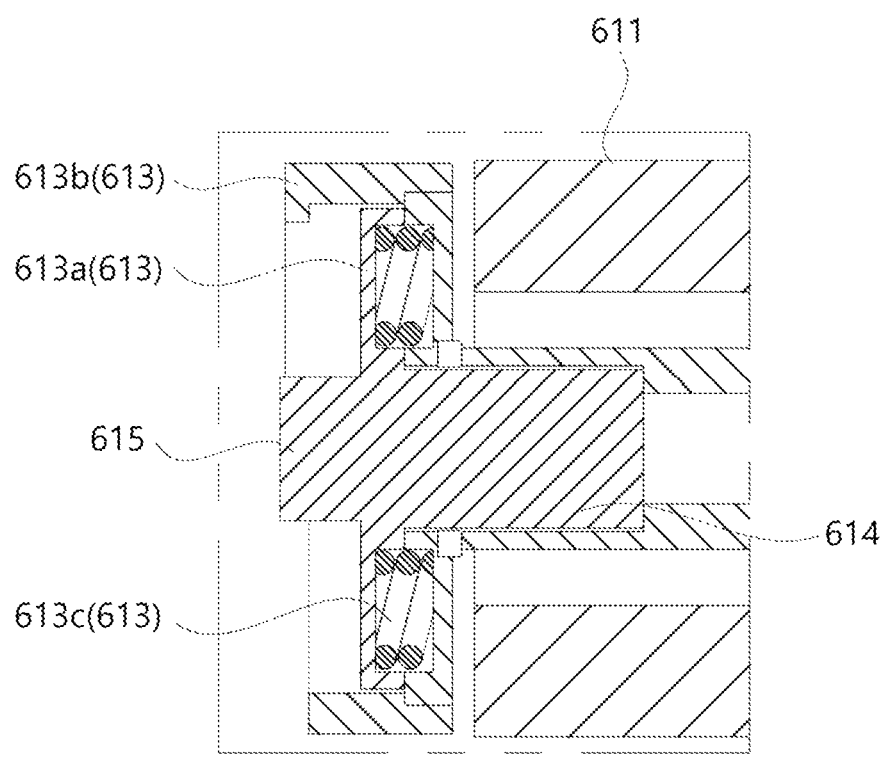

The filter roll 610 according to the first embodiment of the present disclosure, as illustrated in FIGS. 11, 12A, and 12B, may include a filter drum 611 and a pair of the roll combination kits 612.

The filter drum 611 is formed in the shape of a cylinder, and the oil mist filter 513 is wound on an outer circumferential surface thereof.

The combination kits 612 that constitute a pair may be mounted on opposite sides, respectively, of the filter drum 611. In this case, the roll combination kits 612, which constitute a pair, rotatably support the filter drum 611. When the filter roll 610 is mounted on the roll mounting portion 142, the roll combination kits 612 may be detachably combined with the shaft combination portions 142b, respectively.

According to the first embodiment of the present disclosure, as an implementation example, the roll combination kit 612, as illustrated in FIGS. 12A and 12B, includes a kit main body 613, a first shaft protrusion 614, and a second shaft protrusion 615.

The first shaft protrusion 614 according to the first embodiment of the present disclosure may protrude from a first side surface of the kit main body 613 and may be rotatably combined with a lateral surface of the filter drum 611, In this case, a protrusion insertion groove 611a into which the first shaft protrusion 614 is rotatably inserted may be formed in a lateral surface of the filter drum 611.

The second shaft protrusion 615 according to the first embodiment of the present disclosure may protrude from a second side surface of the kit main body 613 and may be inserted into the shaft combination portion 142b of the roll mounting portion 142. In this case, according to the first embodiment of the present disclosure, as an implementation example, when combined with the shaft combination portion 142b, the second shaft protrusion 615 is pressed in a direction in which the second shaft protrusion 615 is inserted into the shaft combination portion 142b.

As one implementation example, the kit main body 613 according to the first embodiment of the present disclosure, as illustrated in FIGS. 12A and 12B, may include a first kit member 613a, a second kit member 613b, and a pressing member 613c.

The second shaft protrusion 615 may be formed on the first kit member 613a according to the first embodiment of the present disclosure. The second shaft protrusion 615 may be combined with the first kit member 613a in a manner that is movable in a rotation direction of the filter drum 611. According to the first embodiment of the present disclosure, as an implementation example, the first shaft protrusion 614 and the second shaft protrusion 615 are formed on opposite sides plate-like surfaces, respectively, of the second kit member 613b in such a manner as to be integrally combined with each other.

The pressing member 613c according to the first embodiment of the present disclosure may be mounted between the first kit member 613a and the second kit member 613b. The pressing member 613c may press the second kit member 613b in a direction in which the second shaft protrusion 615 is inserted into the shaft combination portion 142b. According to the first embodiment of the present disclosure, as an implementation example, the pressing member 613c is formed in the shape of a compression spring.

With the above-described configuration, when mounting the filter roll 610 on the roll mounting portion 142, in a state where the filter roll 610 is inserted into the roll accommodation portion 142a, the user may insert the second shaft protrusion 615 into the shaft combination portion 142b by pressing the second kit member 613b on a second side toward the direction of the first kit member 613a, with the second shaft protrusion 615 on a first side being inserted into the shaft combination portion 142b.

In this case, with an elastic force of the pressing member 613c, the combination of the second shaft protrusion 615 and the shaft combination portion 142b, and the combination of the first shaft protrusion 614 and the protrusion insertion groove 611a may be maintained with a predetermined force. Accordingly, when the filter transportation unit 620 transports the oil mist filter 513 wound on the filter roll 610, the oil mist filter 513 may be held under tension. Thus, the oil mist filter 513 can be prevented from being easily unwound.

In this case, according to the first embodiment of the present disclosure, a cut portion H may be formed in an edge portion in the shaft combination portion 142b direction of the first kit member 613a by cutting off a portion of the edge portion. Thus, a space into which the user's finger or something similar is inserted can be provided when the user pushes the second kit member 613b.

The filter transportation unit 620, as illustrated in FIG. 3, may be mounted in the head unit 100 in such a manner as to be positioned in a direction opposite to a direction of the filter roll 610 with the sucking unit 110 in between. According to the first embodiment of the present disclosure, as an implementation example, the filter roll 610 is mounted inside the casing main body 140 of the head main body 130.

According to the first embodiment of the present disclosure, the filter roll 610 and the filter transportation unit 620 are mounted in opposite directions, respectively, in which the sucking unit 110 and the discharging unit 120 are spaced apart, with the sucking unit 110 in between. In this case, as an implementation example, the filter roll 610 is mounted on the discharging unit 120 side, with the sucking unit 110 in between, in such a manner as to be positioned in a direction opposite to a direction of the filter transportation unit 620.

The filter transportation unit 620 according to the first embodiment of the present disclosure may discharge the oil mist filter 513 that extends from the filter roll 610 and passes the sucking unit 110, to the outside of the head unit 100. As one implementation example, the filter transportation unit 620 discharges the oil mist filter 513 to over the head unit 100.

Figure 13:
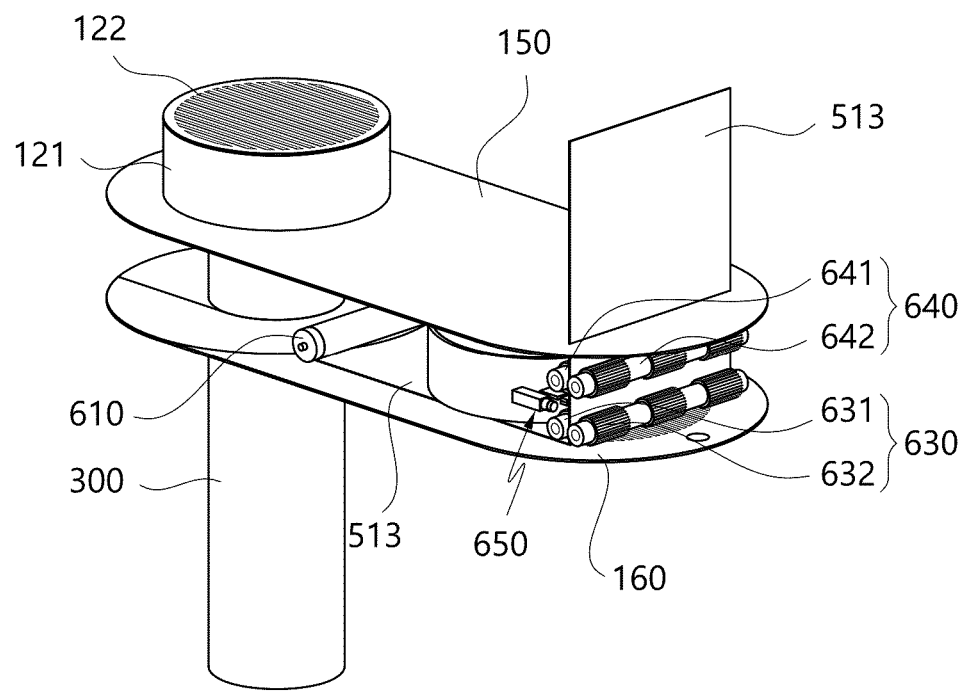
Figure 14:
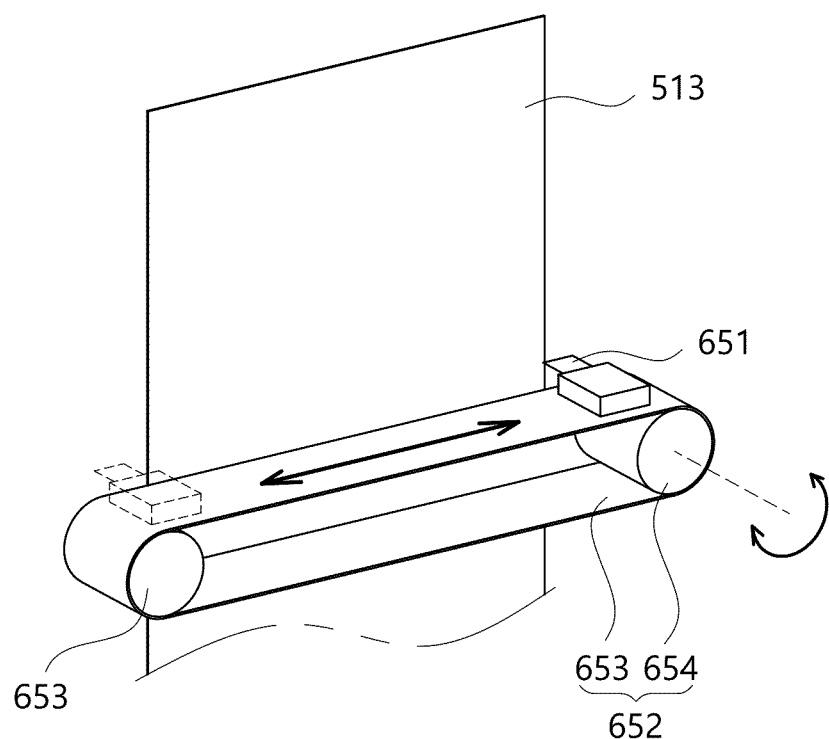

With reference to FIGS. 3, 13, and 14, more particularly, the filter transportation unit 620 according to the first embodiment of the present disclosure may include a first roller unit 630 and a second roller unit 640.

The first roller unit 630 and the second roller unit 640 may be mounted inside the casing main body 140 in such a manner as to be vertically spaced apart, and thus may discharge the oil mist filter 513 to over the head unit 100.

As an implementation example, the first roller unit 630 and the second roller unit 640 according to the first embodiment of the present disclosure each include a first transportation roller 631 or 641 and a second transportation roller 632 or 642. The first transportation roller 631 or 641 and a second transportation roller 632 or 642 may be horizontally rotated in such a manner as to face each other with the oil mist filter 513 in between and thus may transport the oil mist filter 513 upward.

According to the first embodiment of the present disclosure, as an implementation example, a concave-convex portion in the shape of gear teeth is formed on outer circumferential surfaces of the first transportation roller 631 or 641 and the second transportation roller 632 or 642, and thus the transportation of the oil mist filter 513 is facilitated.

According to the first embodiment of the present disclosure, as an implementation example, the filter transportation unit 620 further includes a cutting unit 650. As one implementation example, the cutting unit 650 may cut the purification filter 512, 513, or 514 in the traverse direction between the first roller unit 630 and the second roller unit 640.

Accordingly, after the portable air-flow guiding apparatus 10 according to the first embodiment of the present disclosure is used for a predetermined period of time, when the filter transportation unit 620 transports the oil mist filter 513, a new portion of the oil mist filter 513 wound on the filter roll 610 is moved toward the sucking unit 110, and at the same time, a previously used portion thereof is moved along the filter transportation unit 620 toward the outside of the head unit 100.

In this case, when the cutting unit 650 cuts the oil mist filter 513 in the traverse direction between the first roller unit 630 and the second roller unit 640, the user can remove the cut-off portion by pulling an exposed portion of the oil mist filter 513 to over the head unit 100. Thereafter, when the filter transportation unit 620 further transports the oil mist filter 513, as illustrated in FIG. 1, an end portion of the oil mist filter 513 is kept exposed to the outside in a manner that is positioned over the head unit 100. In this case, when using the oil mist filter 513, as illustrated in FIG. 1, as an implementation example, the end portion of the oil mist filter 513 is kept exposed to the outside in a manner that is positioned over the head unit 100. Of course, control may be performed in such a manner that, only when cutting the oil mist filter 513, the end portion thereof is kept exposed to the outside.

FIG. 14 is a view illustrating an implementation example of a configuration of the cutting unit 650 according to the first embodiment of the present disclosure. The cutting unit 650 according to the first embodiment of the present disclosure may include a cutter 651 that cuts the oil mist filter 513. In addition, the cutting unit 650 according to the first embodiment of the present disclosure may include cutter moving unit 652 that reciprocates the cutter 651 in the traverse direction and enables the cutter 651 to cut the oil mist filter 513 in the traverse direction.

As one implementation example, the cutter moving unit 652 may be configured to include a belt 653 and a pair of pulleys 654. In this case, in a state where the cutter 651 is mounted on the belt 653, when one of the pair of pulleys 654 rotates forward or backward, the cutter 651 mounted on the belt 654 may cut the oil mist filter 513 in the traverse direction while reciprocating along the belt 654.

As an implementation example, the filter roll 610 according to the first embodiment of the present disclosure, as illustrated in FIG. 10, is mounted on the roll mounting portion 142 in such a manner as to be unwound in a direction of surrounding a lower portion of the head main body 130 in the lower portion of the head main body 130 and then to extend to under the sucking unit 110. As an implementation example, the oil mist filter 513 passes the sucking unit 110 and then is transmitted by the filter transportation unit 620 toward the filter transportation unit 620 in a state of being inclined upward. With this configuration, the filter roll 610 unwound from the oil mist filter 513 is transported in a state of being inclined only in one direction. Thus, it is possible for the filter transportation unit 620 to smoothly transport the oil mist filter 513.

In addition, a filter discharging hole 151 may be formed in the upper casing 150 according to the first embodiment of the present disclosure in a manner that passes therethrough from top to bottom. Accordingly, the end portion of the oil mist filter 513 transported by the filter transportation unit 620 passes through the filter discharging hole 151 formed in the upper casing 150 and is transported to over the head unit 100. Thus, it is possible to discharge the end portion thereof to the outside of the head unit 100.

Figure 15:
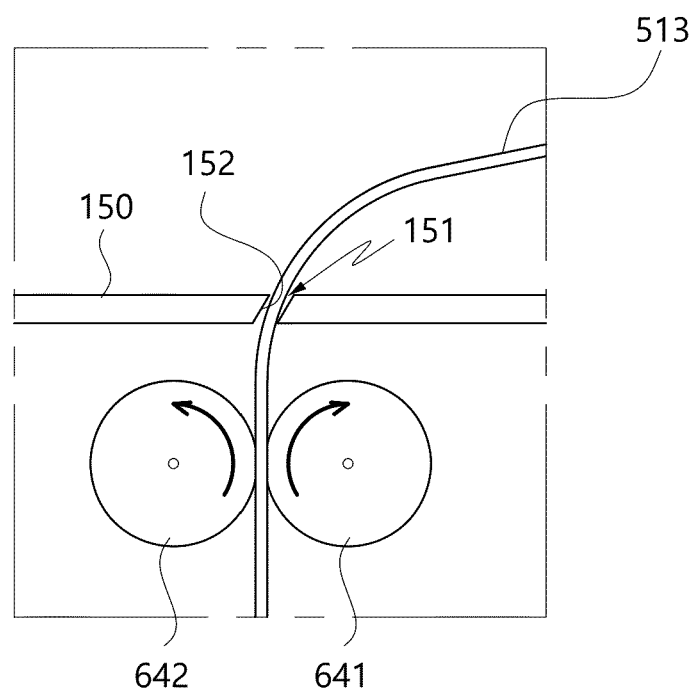

In this case, the filter discharging hole 151 according to the first embodiment of the present disclosure, as illustrated in FIG. 15, may include an inclined surface 152. The inclined surface 152 may be formed on an inner lateral surface of the filter discharging hole 151 in a manner that is inclined toward the direction of the discharging unit 120 in order for the oil mist filter 513 to be discharged through the filter discharging hole 151 toward the direction of the discharging unit 120.

With this configuration, the oil mist filter 513 unwound from the filter roll 610 is transported in state of being inclined only in one direction. Thus, it is possible to smoothly transport the oil mist filter 513. In addition, the cut-off portion of the oil mist filter 513 is discharged to over the head unit 100 toward the discharging unit 120 that is opposite to the direction of the cooktop. Thus, a fire accident due to the discharging of the cut-off portion toward the direction of the cooktop can be prevented.

As an implementation example, the casing main body 140 according to the first embodiment of the present disclosure, as illustrated in FIG. 16, includes a first casing main body 140*a* and a second casing main body 140*b*.

The first casing main body 140*a* according to the first embodiment of the present disclosure forms most portions of the casing main body 140 according to the first embodiment of the present disclosure. As one implementation example, the sucking unit 110 and the roll mounting portion 142 may be formed in the first casing main body 140*a*. In addition, the flow path space 141 in which the flow-path portion 170 is seated may be formed in the first casing main body 140*a*. The first casing main body 140*a* may be combined with the columnar unit 300.

The second casing main body 140*b* according to the first embodiment of the present disclosure may be combined with the first casing main body 140*a* by a hinge mechanism having a vertical axis. Accordingly, the second casing main body 140*b*, as illustrated in FIG. 16, may horizontally open and close the first casing main body 140*a*.

In this case, when the second casing main body 140*b* opens the first casing main body 140*a*, the filter transportation unit 620 mounted inside the casing main body 140, as illustrated in FIG. 16, may be exposed to the outside. Accordingly, after the second casing main body 140*b* is opened, the first roller unit 630 and the second roller unit 640 may be separated from each other. Thus, it is possible to clean the first roller unit 630 and the second roller unit 640 that are used for a predetermined period of time.

According to the first embodiment of the present disclosure, as an implementation example, the first transportation roller 631 or 641 of each of the first roller unit 630 and the second roller unit 640 is mounted in the first casing main body 140*a*. As an implementation example, the second transportation roller 632 or 642 of each of the first roller unit 630 and the second roller unit 640 is mounted in the second casing main body 140*b*.

Accordingly, when the second casing main body 140*b* closes the first casing main body 140*a*, the oil mist filter 513 is interposed between the first transportation roller 631 or 641 and the second transportation roller 632 or 642. Thus, the job of replacing the filter roll 610 can be facilitated.

FIGS. 17A to 17D and 18A to 18C are views illustrating the job of mounting a new filter roll 610 in the portable air-flow guiding apparatus 10 according to the first embodiment of the present disclosure. Only reference characters necessary to identify components that are described are drawn in FIGS. 17A to 17D and 18A to 18C.

Figure 17A:
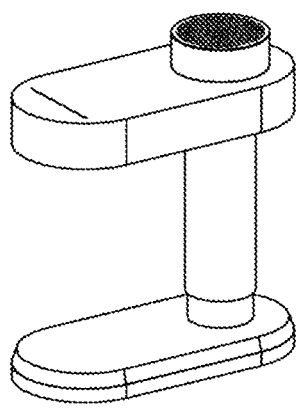
FIGS. 17A to 17D and 18A to 18C are views each illustrating the job of mounting a new filter roll in the portable air-flow guiding apparatus according to the first embodiment of the present disclosure.
Figure 17B:
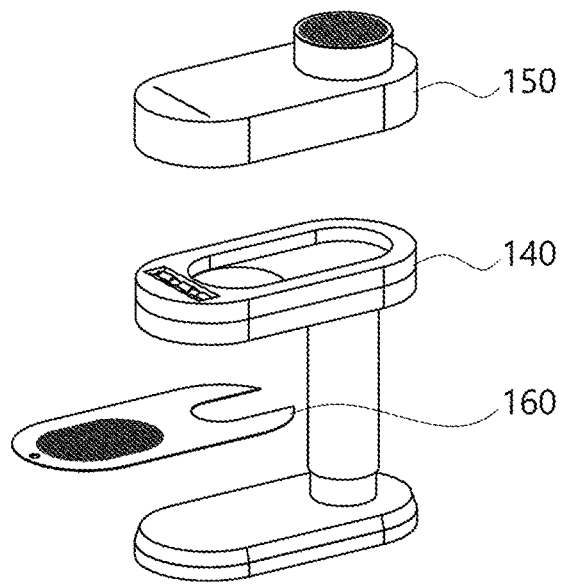

The job of mounting the new filter roll 610 is described with reference to FIGS. 17A to 17D and 18A to 18C. First, in a state where the portable air-flow guiding apparatus 10 according to the first embodiment of the present disclosure is assembled as illustrated in FIG. 17A, the upper casing 150 and the lower casing 160 are separated from the casing main body 140 as illustrated in FIG. 7B.

Figure 17C:
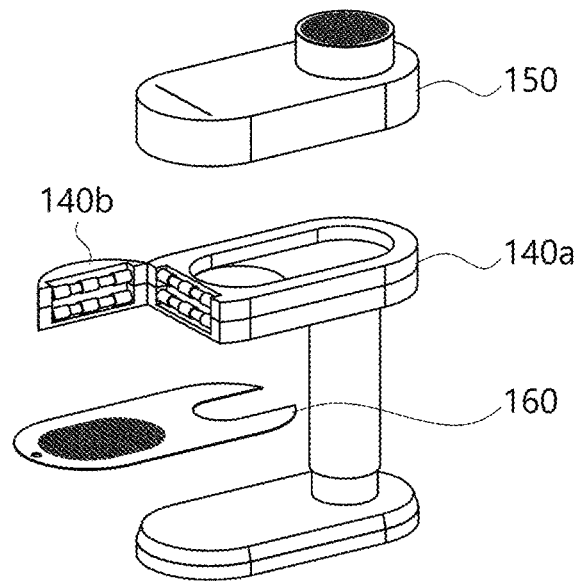

Thereafter, as illustrated in FIG. 17C, the second casing main body 140*b* is rotated with respect to the first casing main body 140*a*, and thus the first casing main body 140*a* is opened in the forward direction. In this case, as described above, the first transportation roller 631 or 641 is in a state of being mounted in the first casing main body 140*a*, and the second transportation roller 632 or 642 is in a state of being mounted in the first casing main body 140*a*.

Figure 17D:
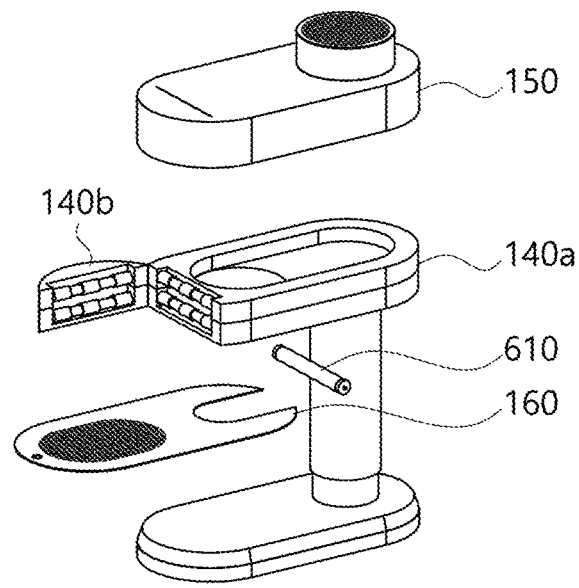
Figure 18A:
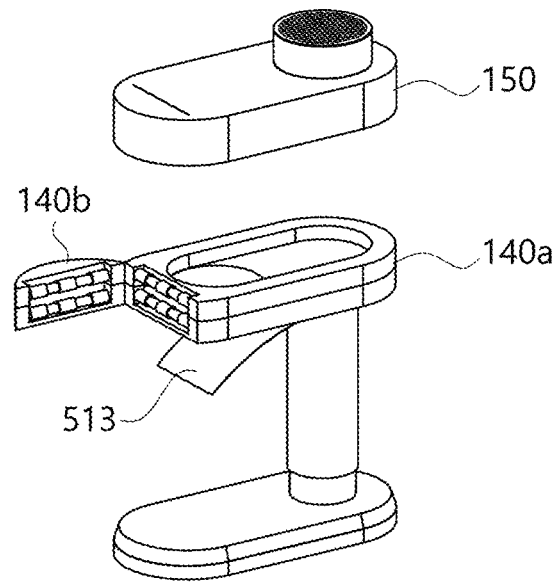
Figure 18B:
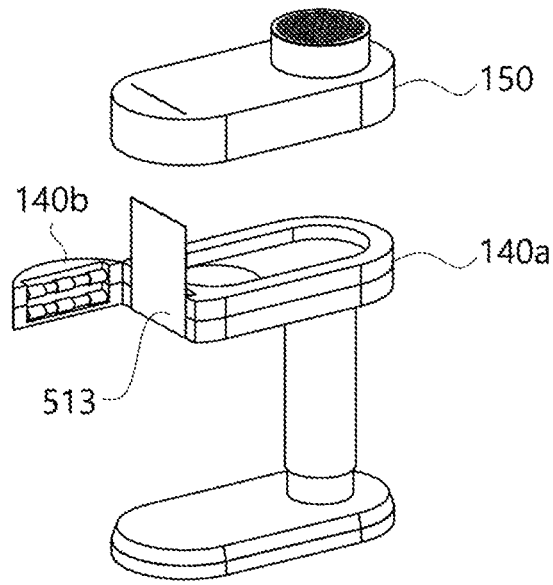

Thereafter, as illustrated in FIG. 17D, the filter roll 610 is mounted in the roll mounting portion 142 provided on a lower surface of the first casing main body 140*a* according to the above-described method. Thereafter, as illustrated in FIG. 18A, the end portion of the oil mist filter 513 is pulled from the filter roll 610 mounted on the roll mounting portion 142, and thus is unwound and extends at a predetermined angle from a front end portion of the first casing main body 140*a*. As illustrated in FIG. 18B, the oil mist filter 513 is directed upward. In this case, a one side plate-surface of the oil mist filter 513 is brought into close contact with the front surface of the first transportation roller 631 or 641 mounted in the first casing main body 140*a*.

Figure 18C:
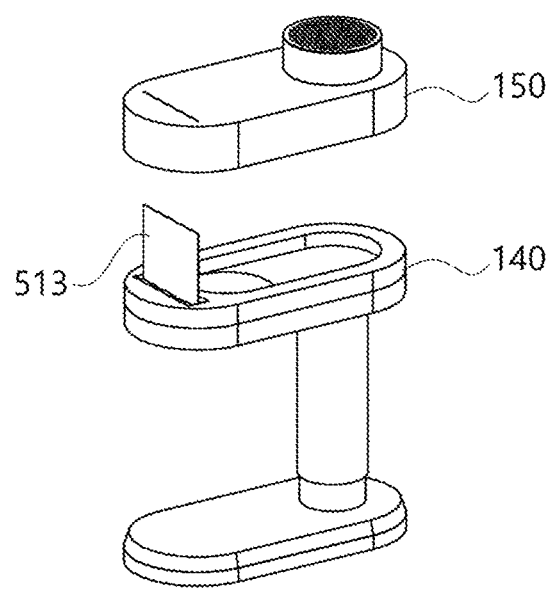

Thereafter, the second casing main body 140*b* is rotated, and thus, the front of the first casing main body 140*a* is covered, as illustrated in FIG. 18C. Then, the oil mist filter 513 is positioned between the first transportation roller 631 or 641 and the second transportation roller 632 or 642, and the oil mist filter 513 is fixed in a state where the end portion thereof is exposed to the outside in a manner that extends upward from the casing main body 140.

Then, the upper casing 150 and the lower casing 160 are combined with the casing main body 140, as illustrated in FIG. 1, the oil mist filter 513 is completely mounted in a state where the end portion thereof is exposed to the outside in a manner that extends upward from the head unit 100. In this case, it is desirable that the upper casing 150 is combined with the casing main body 140 after the end portion of the oil mist filter 513 passes through the filter discharging hole 151.

As another implementation example, when the lower casing 160 is combined with the casing main body 140, in a state as illustrated in FIG. 18B, the lower casing 160 may be first fixed to the first casing main body 140*a*, and then the second casing main body 140*b* may be rotated.

Figure 19:
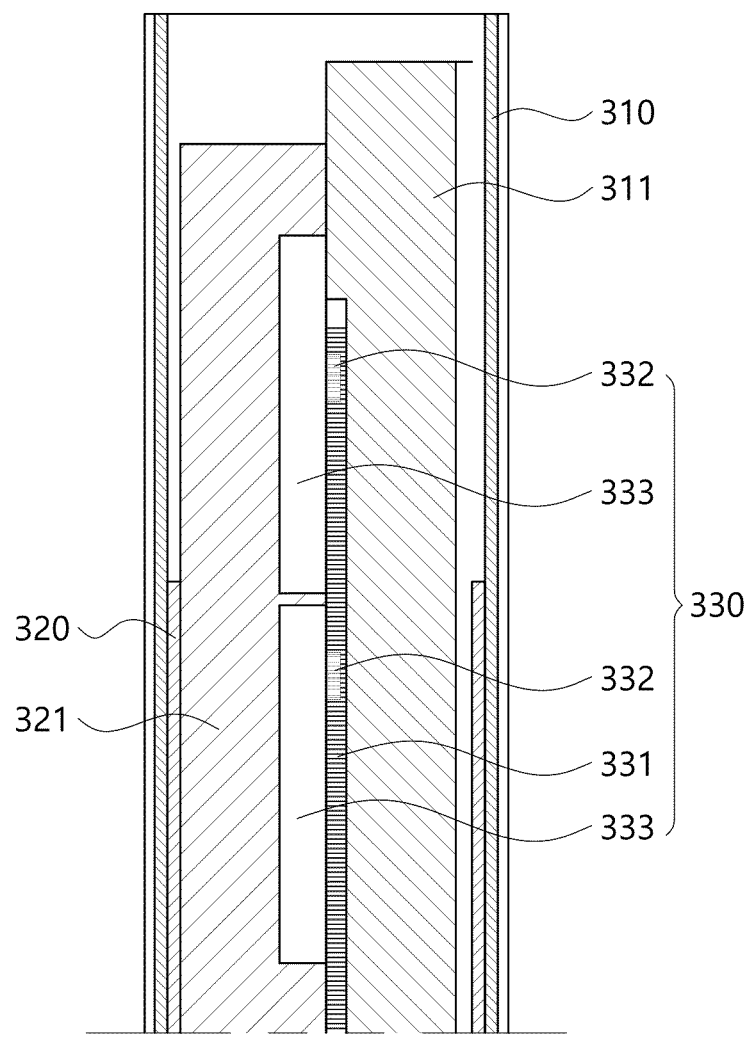
FIGS. 19, 20A, and 20B are views each illustrating an implementation example of a height adjustment structure of a columnar unit according to the first embodiment of the present disclosure.
Figure 20A:
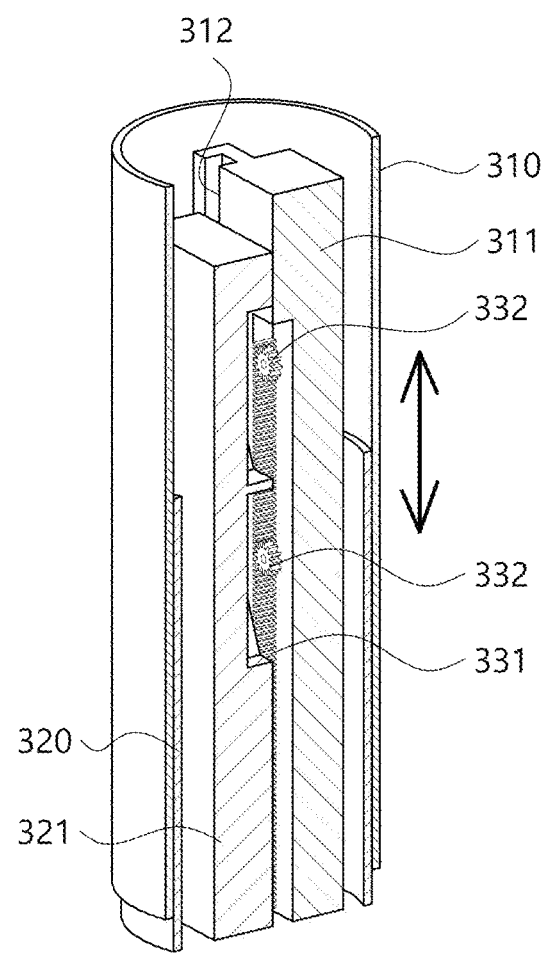
Figure 20B:
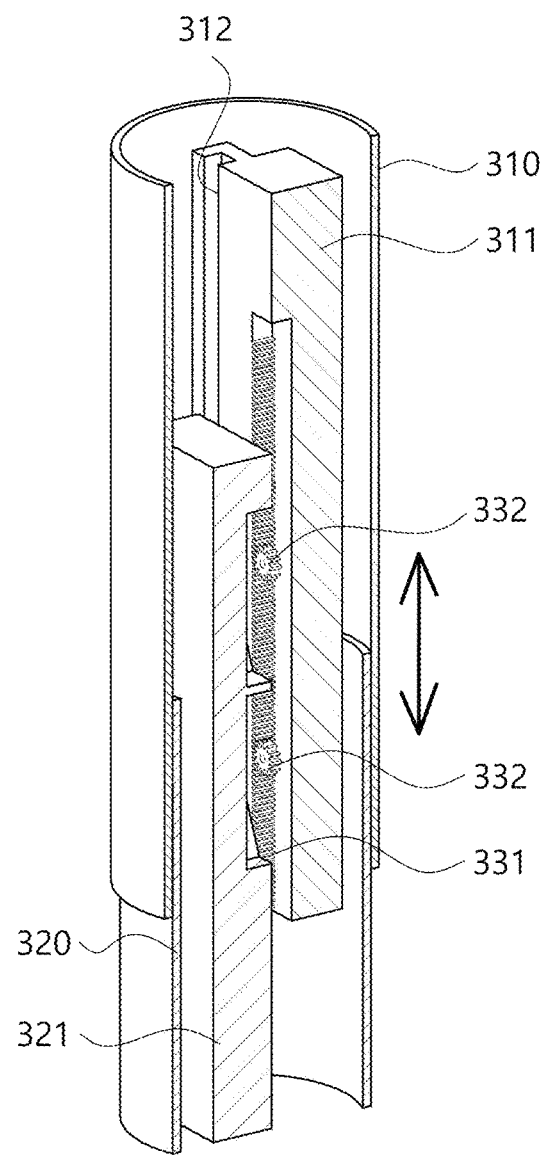

The columnar unit 300 according to the first embodiment of the present disclosure may be provided in such a manner that a distance between the head unit 100 and the base unit 200, that is, a height of the head unit 100 is adjustable. FIGS. 19, 20A, and 20B are views each illustrating an implementation example of a height adjustment structure of the columnar unit 300 according to the first embodiment of the present disclosure.

With reference to FIGS. 1, 19, 20A, and 20B, the columnar unit 300 according to the first embodiment of the present disclosure may include a first columnar member 310, a second columnar member 320, and a height adjustment unit 330.

A first side of the first columnar member 310 according to the first embodiment of the present disclosure may be combined with the head unit 100. In this case, as an implementation example, the first columnar member 310 has the shape of a cylinder. However, the first columnar member 310 may, of course, have the shape of a polyprism, such as one having a rectangular cross section.

A first side of the second columnar member 320 according to the first embodiment of the present disclosure may be combined with the base unit 200. In this case, a shape of the second columnar member 320 corresponds to a shape of the first columnar member 310. According to the first embodiment of the present disclosure, as an implementation example, the second columnar member 320 has the shape of a cylinder. The second columnar member 320 may have a shape that correspondingly varies with the shape of the first columnar member 310.

A second side of the second columnar member 320, that is, an upper portion of the second columnar member 320 may be inserted from under a second side of the first columnar member 310, that is, from under a lower portion of the first columnar member 310. Accordingly, the height of the head unit 100 is adjustable according to a length of a portion of the second columnar member 320 that is inserted from under the lower portion of the first columnar member 310.

The height adjustment unit 330 according to the first embodiment of the present disclosure may enable the first columnar member 310 to ascend or descend with respect to the second columnar member 320 in such a manner that the height of the head unit 100 is adjusted.

According to the first embodiment of the present disclosure, as an implementation example, the height adjustment unit 330, as illustrated in FIGS. 19, 20A, and 20B, includes a rack member 331, a pinion member 332, and a damper 333.

The rack member 331 according to the first embodiment of the present disclosure may be mounted on one of the first columnar member 310 and the second columnar member 320. As one implementation example, as illustrated in FIGS. 18A to 18C, 20A, and 20B, the rack member 331 is mounted on the first columnar member 310.

According to the first embodiment of the present disclosure, as an implementation example, the rack member 331 is formed along the upward-downward direction on a first guide member 311 combined with an inner circumferential surface of the first columnar member 310.

The pinion member 332 according to the first embodiment of the present disclosure may be rotated by being engaged with the rack member 331. In this case, the pinion member 332 may be combined with the second columnar member 320 (or the first columnar member 310 (hereinafter omitted in this case)) with the damper 333 in between, and thus may be moved in the upward-downward direction along with the second columnar member 320.

The damper 333 according to the first embodiment of the present disclosure may be mounted on the other one of the first columnar member 310 and the second columnar member 320. That is, in a case where the rack member 331 is mounted in the first columnar member 310, the damper 333 may be mounted in the second columnar member 320. In a case where the rack member 331 is mounted in the second columnar member 320, the damper 333 may be mounted in the first columnar member 310. According to the first embodiment of the present disclosure, as an implementation example, the damper 333 is mounted in the second columnar member 320. According to the first embodiment of the present disclosure, as an implementation example, the damper 333 is mounted on second guide member 321 combined with an inner circumferential surface of the second columnar member 320.

The damper 333 according to the first embodiment of the present disclosure is connected to a rotation shaft of the pinion member 332. When the pinion member 332 is rotated by being engaged with the rack member 331, the damper 333 enables the first columnar member 310 to ascend or descend. In this case, the damper 333 exerts a load in such a manner that a position to which the first columnar member 310 ascends is maintained, and thus, the height of the head unit 100 is adjusted to a predetermined height.

Accordingly, when adjusting the height of the head unit 100, the user moves the head unit 100 in the upward-downward direction. Then, the rack member 331 and the pinion member 332 operate by being engaged with each other, and thus it is possible that the head unit 100 ascends or descends. When the user enables the head unit 100 to stop ascending or descending at a desired height, the head unit 100 stops ascending or descending at the desired height according to the load provided by the damper 333. Thus, the head unit 100 may be adjusted to the desired height.

As one implementation example, as illustrated in FIGS. 20A and 20B, a guide groove 312 may be formed in the upward-downward direction in the first guide member 311. A guide rib (not illustrated) may be formed on the second guide member 321. Movement in the upward-downward direction of the guide rib is guided in a state where the guide rib is inserted into the guide groove 312. Accordingly, relative movement in the upward-downward direction between the first guide member 311 and the second guide member 321 may be stably guided, and thus, the first columnar member 310 may be moved stably in the upward-downward direction.

As an implementation example, in the portable air-flow guiding apparatus 10 according to the first embodiment of the present disclosure, as described above, the head unit 100 is enabled to rotate in the leftward-rightward direction about the columnar unit 300. The portable air-flow guiding apparatus 10 according to the first embodiment of the present disclosure may be configured to include a rotation unit 700 that combines the columnar unit 300 and the base unit 200 with each other in such a manner that the columnar unit 300 is rotated with respect to the base unit 200.

Figure 21:
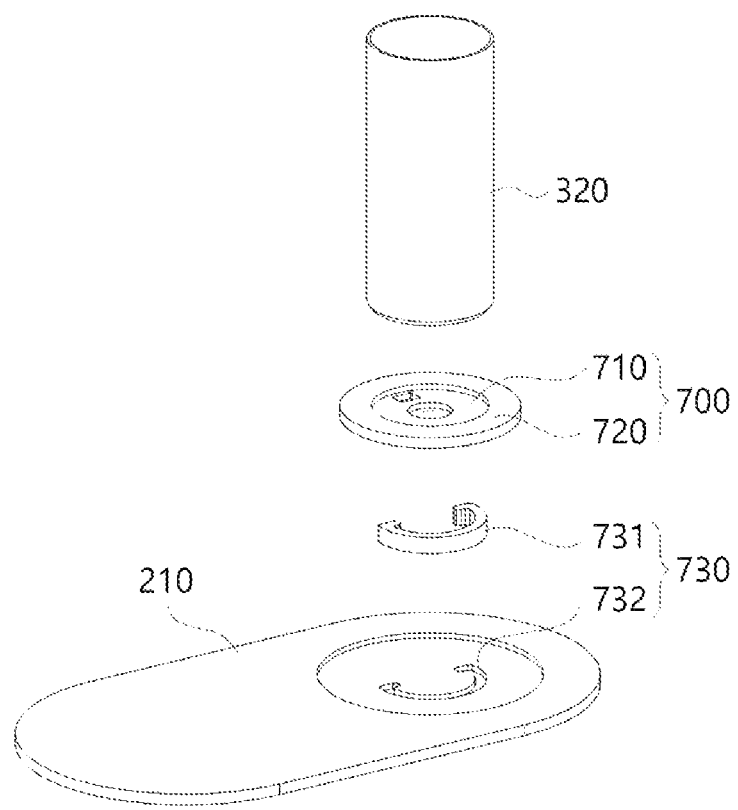
FIGS. 21 and 22 are views each illustrating an implementation example of a configuration of a rotation unit according to the first embodiment of the present disclosure.
Figure 22:
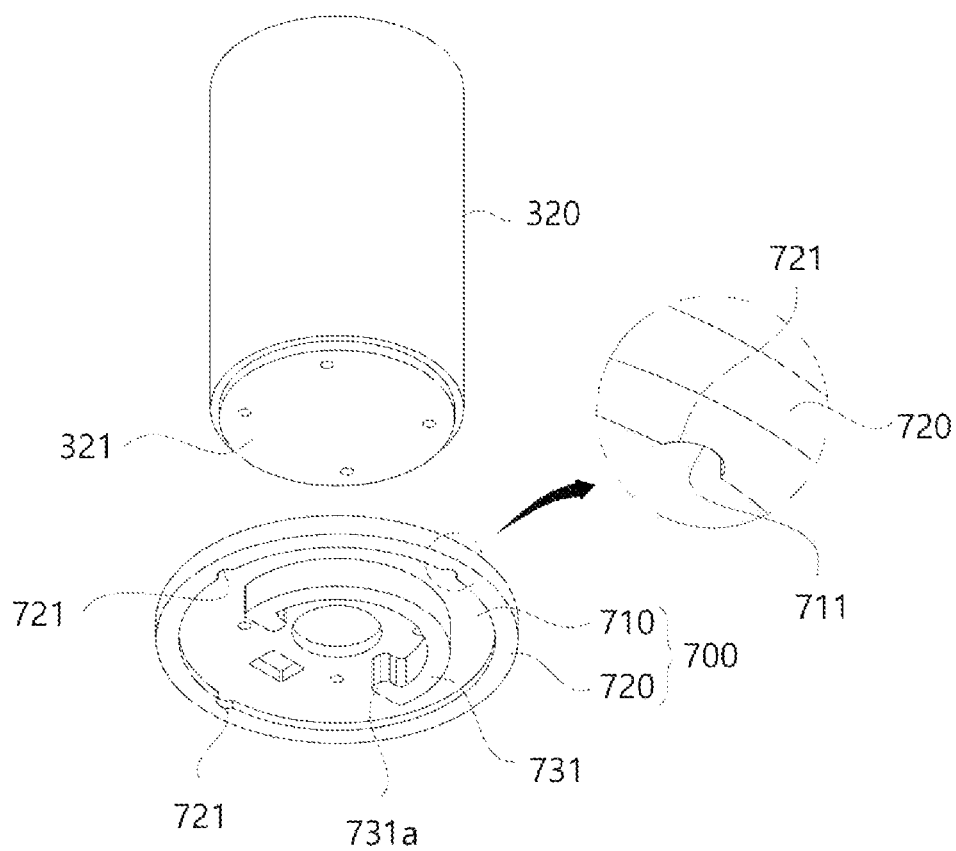

FIGS. 21 and 22 are views each illustrating an implementation example of a configuration of the rotation unit 700 according to the first embodiment of the present disclosure.

With reference to FIGS. 21 and 22, the rotation unit 700 according to the first embodiment of the present disclosure may be configured to include a first rotation member 710 and a second rotation member 720.

The first rotation member 710 is mounted underneath the columnar unit 300. In this case, according to the first embodiment of the present disclosure, as an implementation example, the columnar unit 300 is configured to include the first columnar member 310 and the second columnar member 320. Accordingly, as an implementation example, the first rotation member 710 is mounted underneath the second columnar member 320.

The second rotation member 720 may be mounted in the base unit 200. In this case, the second rotation member 720 may rotatably support the first rotation member 710 in such a manner that the columnar unit 300 is rotatable.

According to the first embodiment of the present disclosure, as an implementation example, the first rotation member 710 has the shape of a circular plate. As an implementation example, the second rotation member 720 has the shape of a circular ring in such a manner as to be rotatably supported along an inner circumferential surface of the first rotation member 710. Accordingly, the first rotation member 710 is stably rotatable inside the second rotation member 720 in the shape of a circular ring.

As one implementation example, a blocking protrusion 711 may be provided on an outer circumferential surface of the first rotation member 710 in a manner that radially protrudes outward therefrom. A plurality of blocking grooves 721 may be formed in an inner circumferential surface of the second rotation member 720 in such a manner as to be spaced apart by a preset angle. In the case, when the first rotation member 710 is rotated, the blocking protrusion 711 is inserted into the blocking groove 721 formed at a specific angle, thereby blocking movement of the first rotation member 710. Thus, the user can recognize a rotation at a predetermined angle. The predetermined angle may be maintained as long as an external force is not applied.

According to the present disclosure, as an implementation example, three blocking grooves 721 are formed in such a manner as to be spaced apart by an angle of 90°. In this case, as an implementation example, when the three blocking grooves 721 are formed in such a manner as to be spaced apart by an angle of 90°, the base unit 200 and the head unit 100 may be positioned in such a manner as to be aligned with each other, as illustrated in FIG. 2A, and the head unit 100 may be rotated by an angle of 90° to the left or to the right with respect to the base unit 200 as illustrated in FIGS. 2B and 2C. Accordingly, the blocking grooves 721 are formed in such a manner as to be spaced apart by an angle at which the head unit 100 is rotated relatively frequently, among rotation angles of the head unit 100. Thus, the convenience of using the portable air-flow guiding apparatus 10 according to the present disclosure can be increased.

The rotation unit 700 according to the first embodiment of the present disclosure may be configured to further include a rotation control unit 730. As one implementation example, the rotation control unit 730 can control rotation of the first rotation member 710 in such a manner that the first rotation member 710 is rotated by up to a preset angle to the left or to the right from a position where the head unit 100 is aligned with the base unit 200. According to the first embodiment of the present disclosure, as an implementation example, as illustrated in FIGS. 2A to 2C, the rotation control unit 730 controls the rotation of the first rotation member 710 in such a manner that the first rotation member 710 is rotatable by up to an angle of 180° in the leftward-rightward direction, that is, by up to 90° to the left and by up to 90° to the right.

According to the first embodiment of the present disclosure, as an implementation example, the rotation control unit 730 includes a control member 731 and a control groove 732. The control member 731 is combined with the first rotation member 710. The control groove 732 is formed in the base unit 200. In this case, the control groove 732 is formed in the plate-like surface of the base unit 200 in such a manner as to have the shape of a semicircle having an internal angle of 180°. A control protrusion 731a formed on the control member 731 is rotated in a state of being inserted in the control groove 732, but within an angle range of 180°. The control protrusion 731a cannot be rotated out of the angle range of 180° because movement thereof out of the angle range of 180° is blocked by the control groove 732.

With the above-described configuration, the head unit 100 is formed in such a manner as to be rotatable up to 90° to the left or to the right, that is, only within an angle range of 180°. Thus, a phenomenon where a cable connected from the base unit 200 to the head unit 100, for example, a power cable or a signal cable for rotating or controlling the fan motor 420, is twisted can be minimized.

In addition, as illustrated in FIGS. 2A to 2C, it is possible that the portable air-flow guiding apparatus 10 according to the first embodiment of the present disclosure is used at various angles in a rotation range of 180° in various positions.

In the above-described implementation example, the discharging fan 410 and the fan motor 420 of the portable air-flow guiding apparatus 10 according to the first embodiment of the present disclosure are described above as being arranged in the upward-downward direction over the columnar unit 300.

Figure 23:
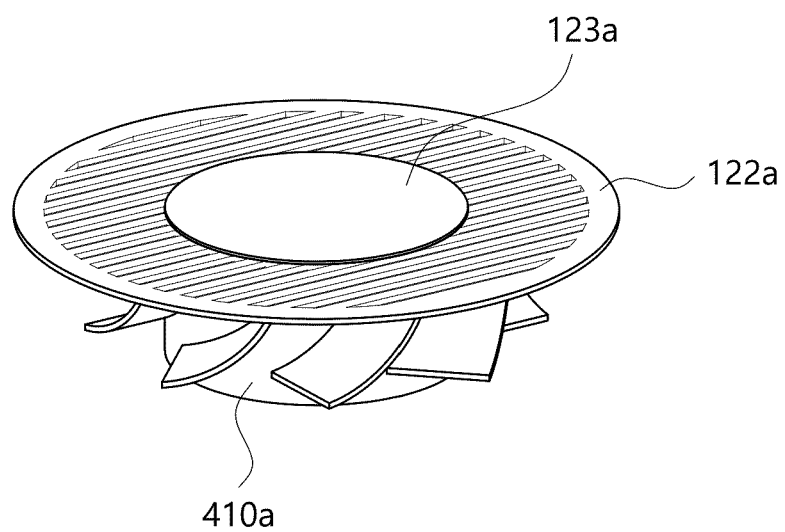
FIGS. 23 to 25 are views each illustrating a configuration of an integrated discharging fan and fan motor according to the first embodiment of the present disclosure.
Figure 24:
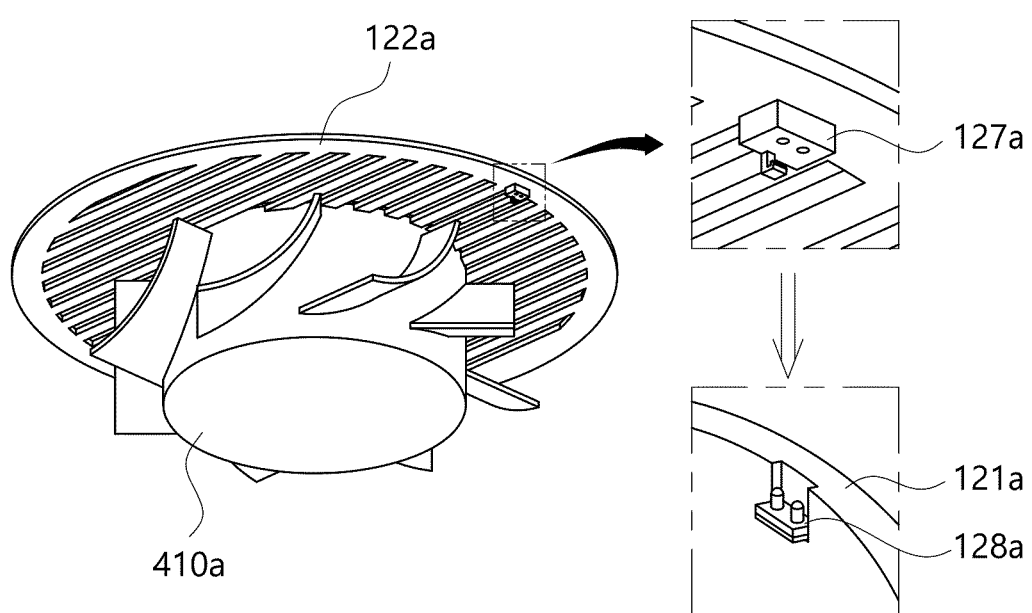
Figure 25:
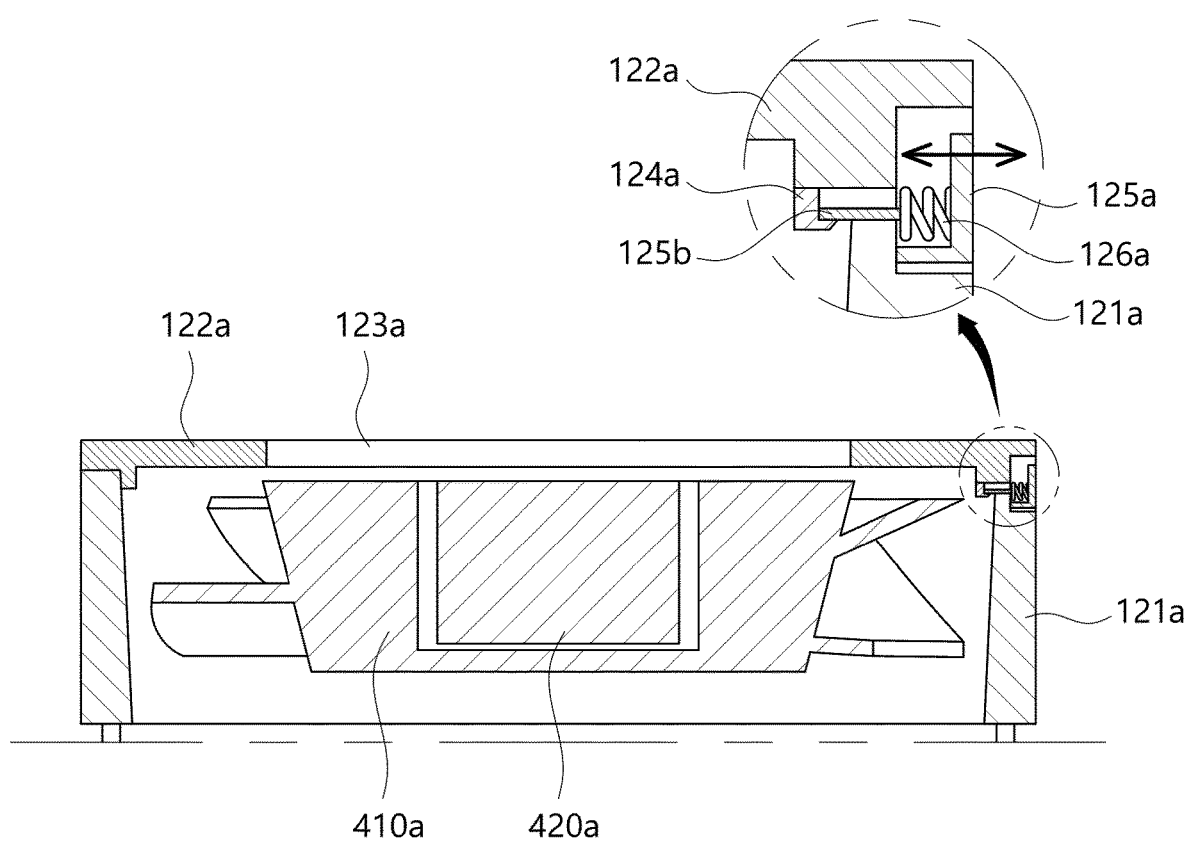

As another implementation example, the discharging fan 410 and the fan motor 420 according to the first embodiment of the present disclosure may be integrated into one piece and may be mounted over the columnar unit 300. FIGS. 23 to 25 are views each illustrating a configuration of the integrated discharging fan 410 and fan motor 420 according to the first embodiment of the present disclosure.

With reference to FIGS. 23 to 25, the discharging fan 410 may be mounted inside the discharging unit 120, for example, inside the fan housing 121. The fan motor 420 may be mounted inside the discharging fan 410 and may rotate the discharging fan 410.

In addition, the discharging unit 120 according to the first embodiment of the present disclosure may be configured to further include a shaft connection member 123a. The shaft connection member 123a may connect a rotation shaft of the discharging fan 410 and the discharging grill 122 to each other in such a manner that the discharging fan 410 is rotatable inside the fan housing 121.

Accordingly, when the discharging grill 122 is removed from the fan housing 121, with the shaft connection member 123a, it is possible to remove the discharging fan 410 and the fan motor 420 together.

With the above-described configuration, the discharging fan 410 and the fan motor 420 that are integrated into one piece are accommodated inside the fan housing 121. As described above, the center of gravity of the portable air-flow guiding apparatus 10 according to the first embodiment of the present disclosure may be positioned in the columnar unit 300 side of the portable air-flow guiding apparatus 10. Thus, the portable air-flow guiding apparatus 10 can be prevented from falling down.

In this case, in order to connect the power cable to the fan motor 420 mounted inside the discharging fan 410, the portable air-flow guiding apparatus 10 according to the first embodiment of the present disclosure may be configured to further include a first connector 127a and a second connector 128a.

The first connector 127a may be mounted on the discharging grill 122 and may be electrically connected to the fan motor 420. The second connector 128a may be mounted, at a position corresponding to a position of the first connector 127a, in the fan housing 121. In this case, when the discharging grill 122 is mounted in the fan housing 121, the second connector 128a is connected to the first connector 127a and supplies electric power to the fan motor 420. In this case, the second connector 128a may be electrically connected to a printed circuit board mounted in the base unit 200 through the columnar unit 300. When the first connector 127a and the second connector 128a are connected to each other, the second connector 128a may supply electric power to the fan motor 420.

The discharging unit 120 according to the first embodiment of the present disclosure, as illustrated in FIG. 25, may include a blocking jaw 124a, a blocking lever 125a or 125b, and an elastic member 126a.

The blocking jaw 124a according to the first embodiment of the present disclosure may be mounted on the discharging grill 122. When the discharging grill 122 is mounted in the fan housing 121, the blocking jaw 124a may be inserted into the fan housing 121.

The blocking lever 125a or 125b according to the first embodiment of the present disclosure may be mounted in the fan housing 121 in such a manner that movement thereof is blocked by and released from the blocking jaw 124a. Accordingly, in a state where movement of the blocking lever 125a or 125b is blocked by the blocking jaw 124a, the discharging grill 122 is fixed to the fan housing 121 in a state of being combined therewith. In a case where the movement of the blocking lever 125a or 125b is released from the blocking jaw 124a, it is possible to separate the discharging grill 122.

The elastic member 126a according to the first embodiment of the present disclosure elastically presses the blocking lever 125a or 125b in a direction in which the movement of the blocking lever 125a or 125b is blocked by the blocking jaw 124a. According to the first embodiment of the present disclosure, as an implementation example, the blocking lever 125a or 125b is configured to include a lever portion 125a and a blocking portion 125b. The lever portion 125a is positioned outside the fan housing 121 and may be pulled with the user's hand. The blocking portion 125b extends from the lever portion 125a toward the inside of the fan housing 121. The movement of blocking portion 125b is blocked by and released from the blocking jaw 124a. As an implementation example, the elastic member 126a has the shape of a tension spring and is configured in such a manner that, when the lever portion 125a is pulled in a blocking direction, a state where the movement of the blocking portion 125b is blocked by the blocking jaw 124a is maintained.

With the above-described configuration, when the user pulls the lever portion 125a, an elastic force of the tension spring is overcome. Thus, the blocking portion 125b moves back from the blocking jaw 124a, thereby releasing the movement thereof. It is possible to separate the discharging grill 122.

Figure 26:
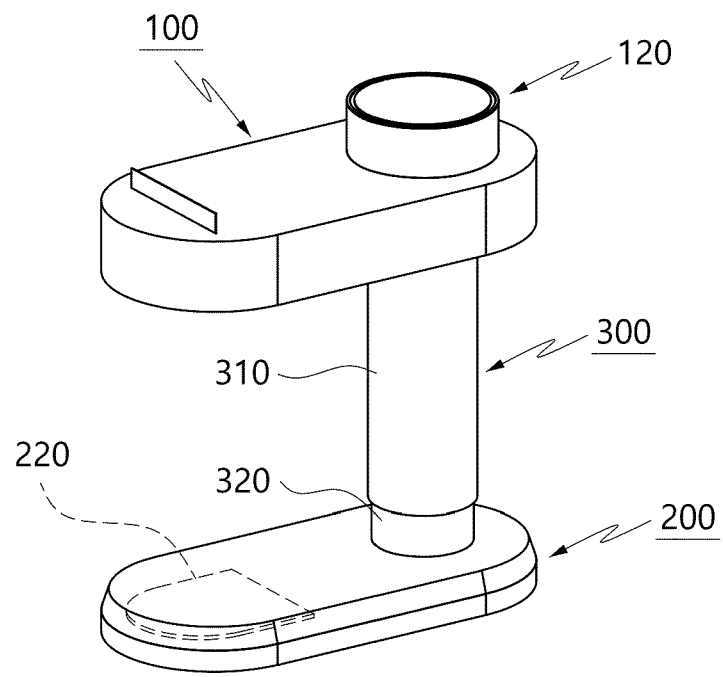
FIG. 26 is a perspective view illustrating a portable air-flow guiding apparatus, in which a weight plate is mounted, according to a second embodiment of the present disclosure.

The base unit 200 according to a second embodiment of the present disclosure, as described in FIG. 26, may be configured to further include a weight plate 220. In this case, the weight plate 220 according to the second embodiment of the present disclosure may be formed of a metal material and may be mounted inside the base unit 200. Thus, the columnar unit 300 and the head unit 100 can be prevented from falling down.

As described above, the head unit 100 and the base unit 200 according to the second embodiment of the present disclosure are combined with each other in such a manner as to be horizontally spaced apart from the columnar unit 300. Furthermore, the head unit 100 is rotatably mounted in the leftward-rightward direction. For this reason, the weight plate 220 formed of a metal material that weighs relatively heavily is built into the base unit 200. Accordingly, the center of gravity is positioned below. The portable air-flow guiding apparatus 10 according to the second embodiment of the present disclosure can be prevented from falling down.

The portable air-flow guiding apparatus 10 according to the second embodiment of the present disclosure may be configured to further include a battery module 800. The power cable (not illustrated) for supplying electric power in everyday use may be provided to the portable air-flow guiding apparatus 10 according to the second embodiment of the present disclosure. The battery module 800 may be built into the portable air-flow guiding apparatus 10 in order to increase the portability. Thus, electric power necessary to drive the fan motor 420 and the like can be supplied.

Figure 27A:
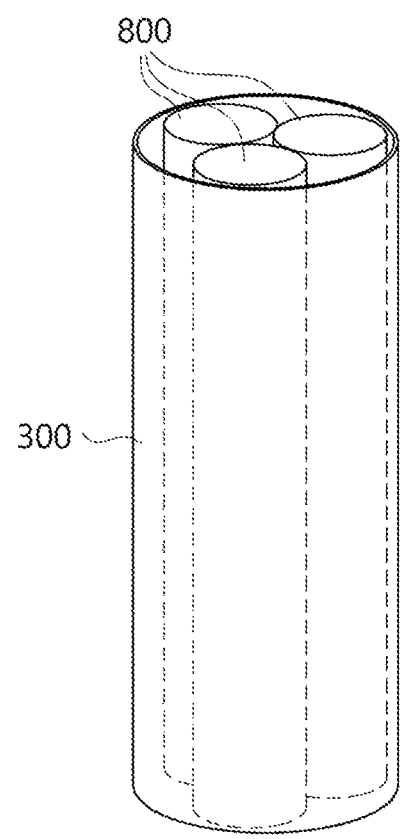
FIGS. 27A and 27B are views each illustrating an implementation example of a battery module of the portable air-flow guiding apparatus according to the second embodiment of the present disclosure.
Figure 27B:
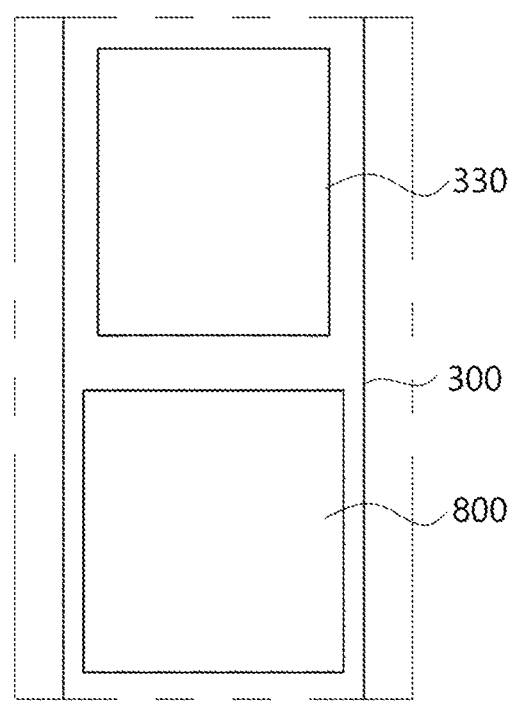

According to the second embodiment of the present disclosure, as an implementation example, the battery module 800, as illustrated in FIGS. 27A and 27B, is built into the columnar unit 300. Accordingly, primary components are arranged in the columnar unit 300 side of the portable air-flow guiding apparatus 10. Accordingly, the center of gravity is positioned in the columnar unit 300 side of the portable air-flow guiding apparatus 10. Thus, the portable air-flow guiding apparatus 10 can be prevented from falling down.

In this case, as an implementation example, the battery module 800 is positioned in a lower part of the inside of the columnar unit 300. In a case where the above-described height adjustment unit 330 is mounted in the columnar unit 300, as illustrated in FIG. 27B, the height adjustment unit 330 is positioned in an upper portion of the columnar unit 300, and the battery module 800 is positioned in a lower portion of the columnar unit 300.

Accordingly, the height of the columnar unit 300 is adjustable, and due to the built-in battery module 800 the portable air-flow guiding apparatus 10 according to the second embodiment of the present disclosure can be prevented more effectively from falling down.

In addition, in a case where a plurality of battery modules 800 is mounted, as illustrated in FIG. 27A, the plurality of battery modules 800 may be arranged in parallel in the horizontal direction inside the columnar unit 300. Accordingly, the portable air-flow guiding apparatus 10 according to the second embodiment of the present disclosure may be kept more stably in the upright position. Thus, the portable air-flow guiding apparatus 10 can be prevented from falling down.

Figure 28:
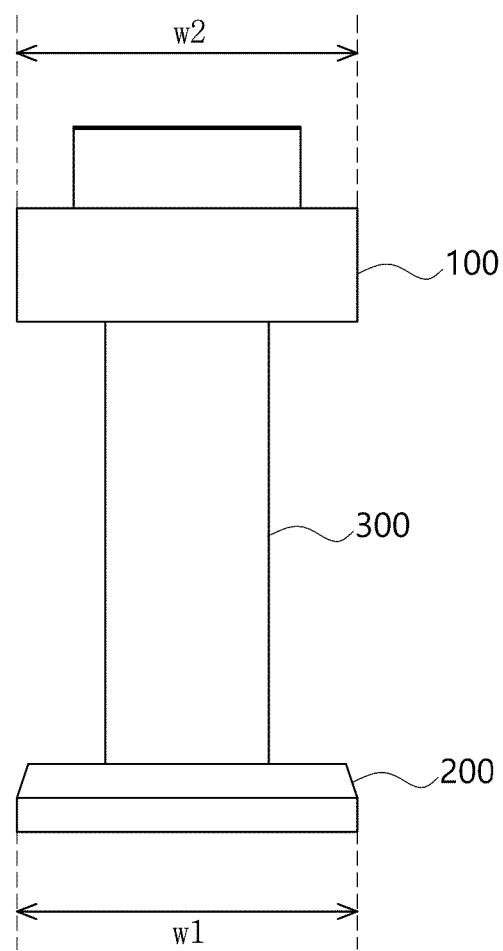
FIG. 28 is a front view illustrating the portable air-flow guiding apparatus according to the second embodiment of the present disclosure.

In addition, according to the second embodiment of the present disclosure the portable air-flow guiding apparatus 10, as illustrated in FIG. 28, the base unit 200 and the head unit 100 are formed in such a manner that a width w1 of the base unit 200 in a direction intersecting a direction in which the sucking unit 110 and the discharging unit 120 are spaced apart from each other is the same as or greater than a width w2 of the head unit 100.

Accordingly, it is ensured that the portable air-flow guiding apparatus 10 is kept more stably in the upright position. The portable air-flow guiding apparatus 10 can be effectively prevented from falling down.

In the above-described implementation examples, the head unit 100 according to the second embodiment of the present disclosure is rotatably provided in the leftward-rightward direction in such a manner that the height thereof is adjustable.

Figure 29:
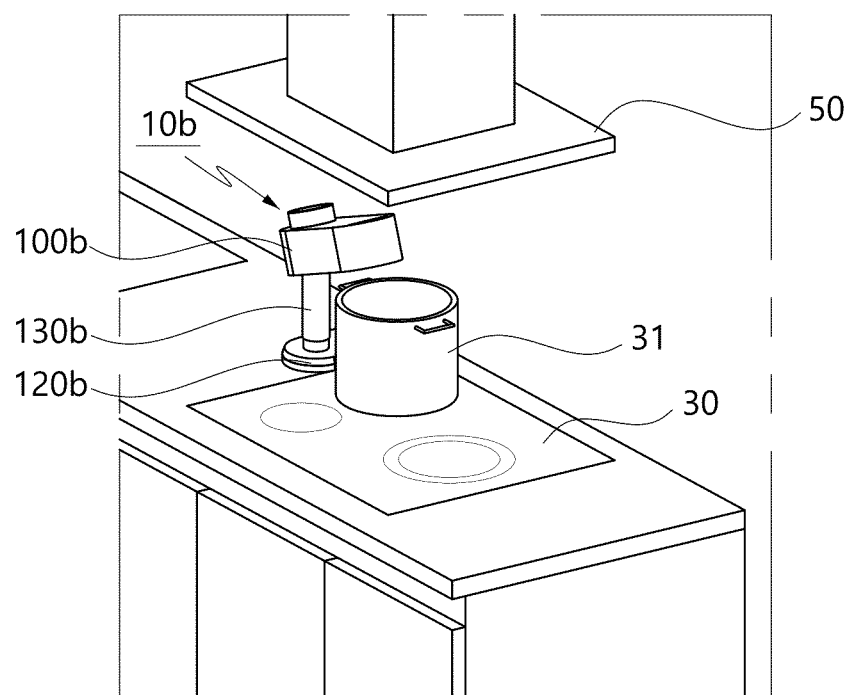
FIG. 29 is a view illustrating a state where the portable air-flow guiding apparatus according to the second embodiment of the present disclosure.

As another implementation example, as illustrated in FIG. 29, the head unit 100 according to the second embodiment of the present disclosure may be combined with the columnar unit 300 in such a manner that an angle at which the head unit 100 is inclined in the upward-downward direction with respect to the columnar unit 300 is adjustable. Accordingly, in addition to the height of the head unit 100, an angle at which air is sucked is adjustable. In addition, the head unit 100 may be effectively used for a cooking utensil which of a height falls out of a range where the height of the head unit 100 is adjustable.

In the above-described implementation example, the filter unit 500 mounted in the sucking unit 110 side of the head unit 100 includes the deodorizing filter 512, the oil mist filter 513, and the free filter 514. In the above-described implementation example, the deodorizing filter 512, the oil mist filter 513, and the free filter 514 are formed of non-woven cloth, a corrugated activated carbon material, and an aluminum mesh material, respectively. Accordingly, in the above-described implementation example, these materials are suitable for the portable air-flow guiding apparatus 10 in terms of removing oil mist and the like occurring during food cooking.

As another implementation example, the portable air-flow guiding apparatus 10 according to the second embodiment of the present disclosure may be configured in such a manner as to function as the air purifier. As described above, it is possible to replace the deodorizing filter 512 through the sucking inlet 171 in the casing main body 140, and it is possible to replace the oil mist filter 513 by replacing the filter roll 610. Likewise, the free filter 514 may also be detachably mounted in the lower casing 160.

In this case, in order to operate the portable air-flow guiding apparatus 10 as the air purifier, the user can use a filter suitable for air purification instead of the deodorizing filter 512, the oil mist filter 513, or the free filter 514 in the above-described implementation example. Thus, a range where the portable air-flow guiding apparatus 10 according to the second embodiment of the present disclosure is used can be expanded.

For example, the free filter 514 may be replaced with a mesh filter of a plastic material suitable for the air purifier. In addition, a HEPA filter and a deodorizing filter may be sequentially mounted at a position where the above-described deodorizing filter 512 is mounted. In this case, the portable air-flow guiding apparatus 10 may be used with the oil mist filter 513 being left mounted or being removed.

A method of controlling a portable air-flow guiding apparatus 10 according to a third embodiment of the present disclosure will be described in detail below with reference to FIGS. 30A to 40. In the third embodiment described below, as an implementation example, the portable air-flow guiding apparatus 10, as described above, finds application as the portable hood.

Figure 30A:
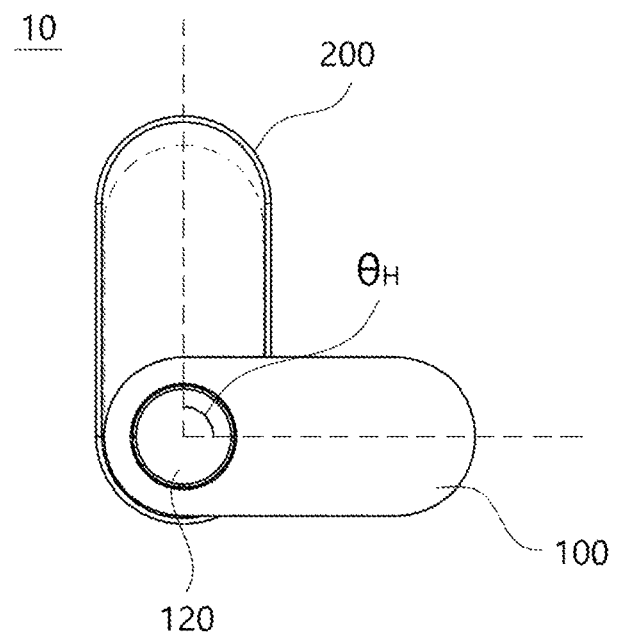
FIGS. 30A and 30B are views each illustrating an implementation example of rotation in a horizontal direction of a portable air-flow guiding apparatus according to a third embodiment of the present disclosure.
Figure 30B:
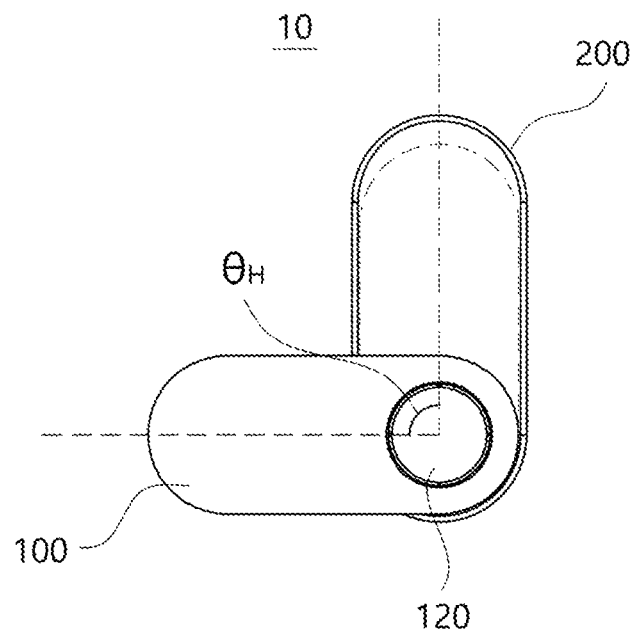

With reference to FIGS. 30A and 30B, as described above, when the head unit 100 rotates in the horizontal direction about the columnar unit 300, the sucking unit 110 formed to the opposite side of the columnar unit 300 may rotate in the leftward-rightward direction. Thus, an angle θH in the horizontal direction may be adjusted. In the third embodiment of the present disclosure, as an implementation example, as described above, the head unit 100 is provided in a manner that is rotatable by up to 90° to the left and by up to 90° to the right in the horizontal direction as illustrated in FIGS. 30A and 30B.

Figure 31A:
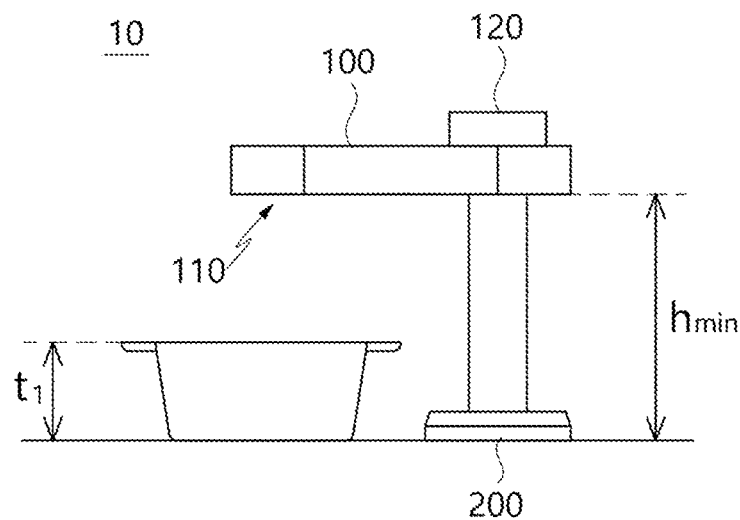
FIGS. 31A and 31B are views each illustrating an implementation example of adjustment of a height of the portable air-flow guiding apparatus according to the third embodiment of the present invention.
Figure 31B:
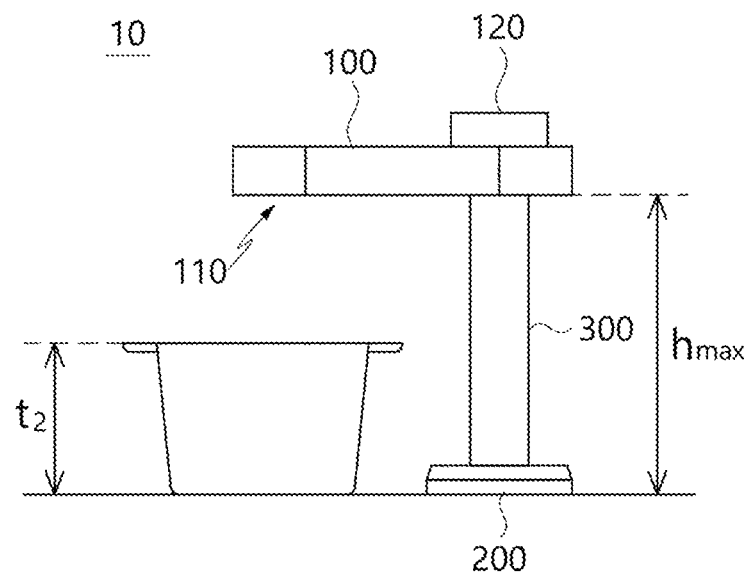

FIGS. 31A and 31B are views each illustrating an implementation example of adjustment of a height of the portable air-flow guiding apparatus 10 according to the third embodiment of the present invention.

As illustrated in FIG. 31A, in a case where a height t1 of the cooking utensil 31 is relatively small, the head unit 100 may be enabled to descend in such a manner that the height thereof corresponds to the height t1 of the cooking utensil 31. Thus, the sucking unit 110 may be positioned vertically adjacent to the cooking utensil 31.

In contrast, as illustrated in FIG. 31B, in a case where a height t2 of the cooking utensil 31 is relatively great, the head unit 100 may be enabled to ascend in such a manner that the height thereof corresponds to the height t2 of the cooking utensil 31. Thus, a position of the head unit 100 may be adjusted.

In the third embodiment of the present disclosure, for description, a minimum height of the head unit 100 is defined as hmin, and a maximum height of the head unit 100 is defined as hmax.

Figure 32:
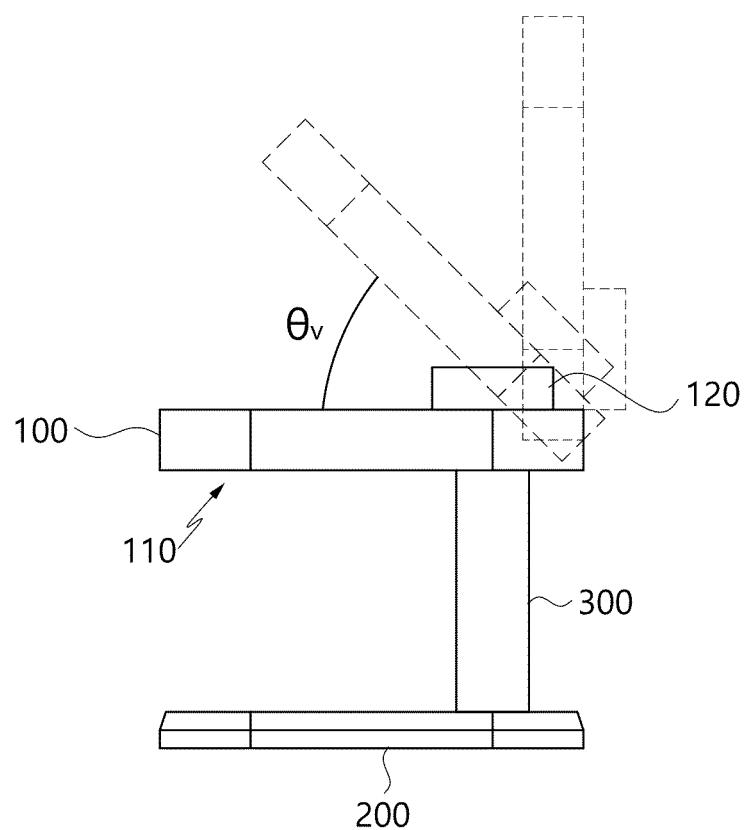
FIG. 32 is a view illustrating an implementation example of adjustment of an angle in a vertical direction of the portable air-flow guiding apparatus according to the third embodiment of the present invention.

As an implementation example, the head unit 100 of the portable air-flow guiding apparatus 10 according to the third embodiment of the present disclosure, as illustrated in FIG. 32, is provided in such a manner that an angle θV in the vertical direction is adjustable. As one implementation example, the head unit 100 may rotate vertically with respect to the columnar unit 300 in a state where the head unit 100 is combined by the hinge mechanism with the columnar unit 300. In this case, a structure where the head unit 100 and the columnar unit 300 are combined by the hinge mechanism with each other may be realized in various forms. The technical idea of the present disclosure is not limited to the various forms of the structure.

Figure 33:
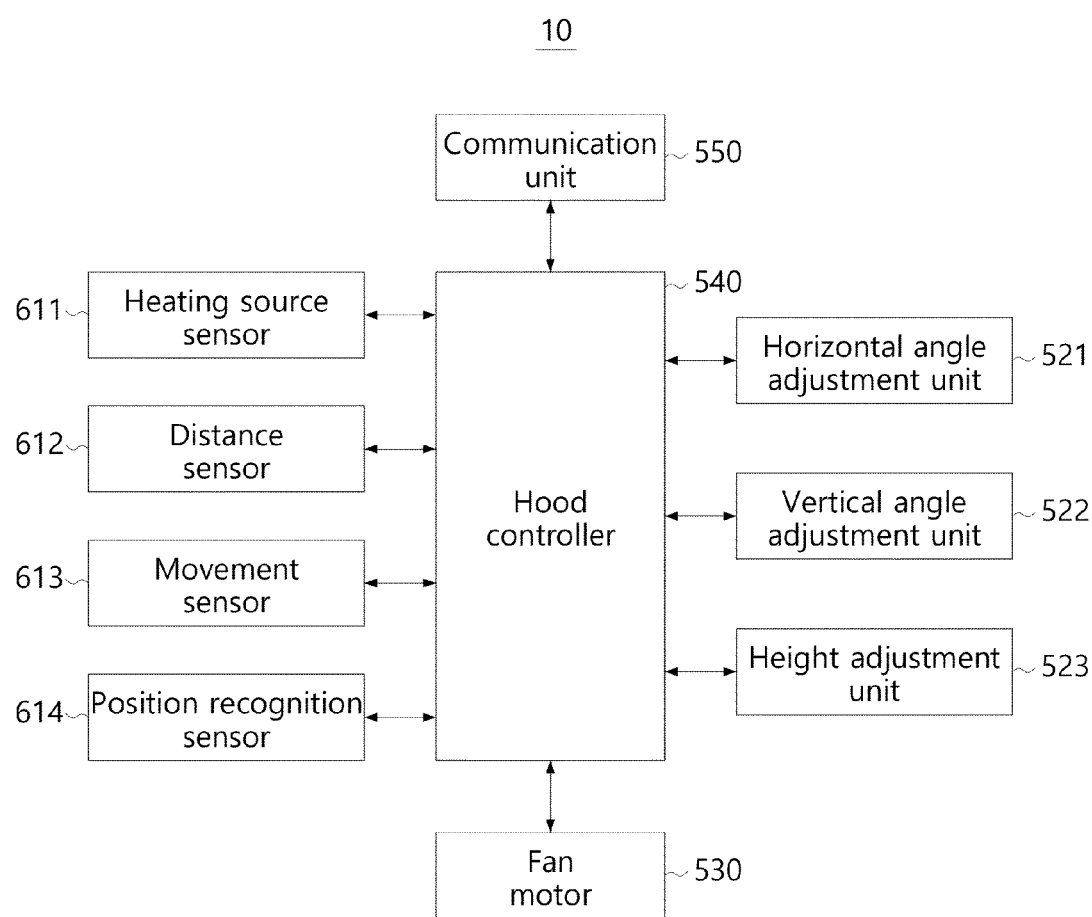
FIG. 33 is a block diagram for controlling the portable air-flow guiding apparatus according to the third embodiment of the present disclosure.

FIG. 33 is a block diagram for controlling the portable air-flow guiding apparatus 10 according to the third embodiment of the present disclosure. With reference to FIG. 33, the portable air-flow guiding apparatus 10 according to the third embodiment may include a horizontal angle adjustment unit 521.

The horizontal angle adjustment unit 521 according to the third embodiment of the present invention may adjust an angle in the horizontal direction of the head unit 100 under the control of a hood controller 540. As one implementation example, according to rotation of an actuator, such as a motor, the angle in the horizontal direction of the head unit 100 may be automatically adjusted to the left and to the right.

The portable air-flow guiding apparatus 10 according to the third embodiment of the present disclosure may be configured to include a height adjustment unit 523.

Under the control of the hood controller 540, the height adjustment unit 523 according to the third embodiment may enable the head unit 100 to ascend or descend and thus may adjust the height of the head unit 100. As described above, in a case where an ascending and descending unit includes a rack gear and a pinion gear, driving of the motor may rotate the pinion gear and thus may enable the first columnar member 310 to ascend or descend.

The portable air-flow guiding apparatus 10 according to the third embodiment of the present disclosure may be configured to further include a vertical angle adjustment unit 522.

Under the control of the hood controller 540, the vertical angle adjustment unit 522 according to the third embodiment of the present disclosure may adjust the angle in the vertical direction of the head unit 100. As one implementation example, the angle in the vertical direction of the head unit 100 may be automatically according to the rotation of the actuator, such as a motor.

The portable air-flow guiding apparatus 10 according to the third embodiment of the present disclosure may be configured to include a plurality of sensor units 511, 512, 513, and 514. The sensor units according to the third embodiment of the present disclosure may collect various pieces of information. The hood controller 540 may control the horizontal angle adjustment unit 521, the height adjustment unit 523, the vertical angle adjustment unit 522, a fan motor 530, and the like on the basis of the various pieces of information.

The sensor units 511, 512, 513, and 514 according to the third embodiment of the present disclosure may include a heating source sensor 611. The heating source sensor 611 according to the third embodiment of the present disclosure may measure a position of a heating source by detecting heat of each of a plurality of the cooktops of the cooking heating equipment 30 or by detecting heat of the cooking utensil 31 in use for actual cooking. As one implementation example, a non-contact type infrared-ray sensor may find application as the heating source sensor 611.

The sensor units 511, 512, 513, and 514 according to the third embodiment of the present disclosure may include a distance sensor 612. The distance sensor 612 according to the third embodiment of the present disclosure may measure a distance between the head unit 100 and the cooking utensil 31 and may measure the height of the cooking utensil 31. As one implementation example, a supersonic-wave type sensor, an infrared-ray type sensor, or the like may find application as the distance sensor 612.

The sensor units 511, 512, 513, and 514 according to the third embodiment of the present disclosure may be configured to further include a movement sensor 613. The movement sensor 613 according to the third embodiment of the present disclosure may detect a movement below the head unit 100, that is, a movement between the cooking utensil 31 and the head unit 100. As one implementation example, an infrared-ray type sensor, a supersonic-wave type sensor, or the like may find application as the movement sensor 613.

The hood controller 540 according to the third embodiment of the present disclosure may control the horizontal angle adjustment unit 521, the vertical angle adjustment unit 522, the height adjustment unit 523, and the fan motor 530 on the basis of the various pieces of information detected by the sensor units 511, 512, 513, and 514.

As one implementation example, when the position of the heating source is measured by the heating source sensor 611 and the height of the cooking utensil 31 is measured by the distance sensor 612, the hood controller 540 may control the horizontal angle adjustment unit 521 and the height adjustment unit 523 according to the position of the heating source and the height of the cooking utensil 31 in such a manner as to adjust at least one of the angle in the horizontal direction of the head unit 100 and the height of the head unit 100.

Accordingly, the sucking unit 110 of the head unit 100 automatically moves to over the position of the heating source, that is, over the cooktop or the cooking utensil 31 in use for cooking. Then, the sucking unit 110, positioned over the cooking utensil 31, may suck oil mist.

The method in which the hood controller 540 controls the portable air-flow guiding apparatus 10 configured as described above according to the third embodiment of the present disclosure will be described in detail below with reference to FIG. 34.

First, a start command for operating the portable air-flow guiding apparatus 10 may be input (S70). As one implementation example, the start command may be input by operating an operation button provided outside the portable air-flow guiding apparatus 10 according to the third embodiment of the present disclosure.

As another implementation example, the start command may be input from the outside. For example, the start command may be transmitted from the cooking heating equipment 30 or the stationary hood 50 for being input. More specifically, as illustrated in FIG. 33, the portable air-flow guiding apparatus 10 according to the third embodiment of the present disclosure may further include a communication unit 550.

The communication unit 550 according to the third embodiment of the present disclosure may perform wireless communication with the cooking heating equipment 30 or the stationary hood 50. As one implementation example, the communication unit 550 may communicate with the cooking heating equipment 30 or the stationary hood 50 through a short-distance wireless communication standard, such as Wi-Fi or Bluetooth.

In this case, the cooking heating equipment 30 or the stationary hood 50 may make a connection to the portable air-flow guiding apparatus 10 according to the third embodiment of the present disclosure through the communication unit 550 and may operate in conjunction with the portable air-flow guiding apparatus 10. As one implementation example, when the user turns on the cooktop of the cooking heating equipment 30, the cooking heating equipment 30 may transmit the start command to the portable air-flow guiding apparatus 10 through the wireless communication. Likewise, when the user turns on the stationary hood 50, the stationary hood 50 may transmit the start command to the portable air-flow guiding apparatus 10.

When the start command is input, the hood controller 540 may perform a step of initializing positioning (S71). In the step of initializing the positioning according to the third embodiment of the present disclosure, as an implementation example, positioning of the head unit 100 is adjusted to initial positioning according to the start command. As one implementation example, the initial positioning may refer to a state where a height h of the head unit 100 is increased to the maximum height hmax.

Accordingly, in a state where a current position of the heating source or the height of the cooking utensil 31 is not measured, a situation where the head unit 100 collides with the cooking utensil 31 may be prevented during a subsequent step of measuring the position of the heating source.

As described above, when the step of initializing the positioning of the head unit 100 is performed, the step of measuring the position of the heating source may be performed.

According to the third embodiment of the present disclosure, as an implementation example, a step of detecting a heating source is performed in one of a conjunctional-operation detection mode and a single-operation detection mode. As described above, the portable air-flow guiding apparatus 10 according to the third embodiment of the present disclosure may operate in conjunction with the cooking heating equipment 30. Accordingly, in a case where the portable air-flow guiding apparatus 10 according to the third embodiment of the present disclosure operates in conjunction with the cooking heating equipment 30 (S72), the conjunctional-operation detection mode for performing the step of detecting the heating source may be executed (S73).

Figure 35:
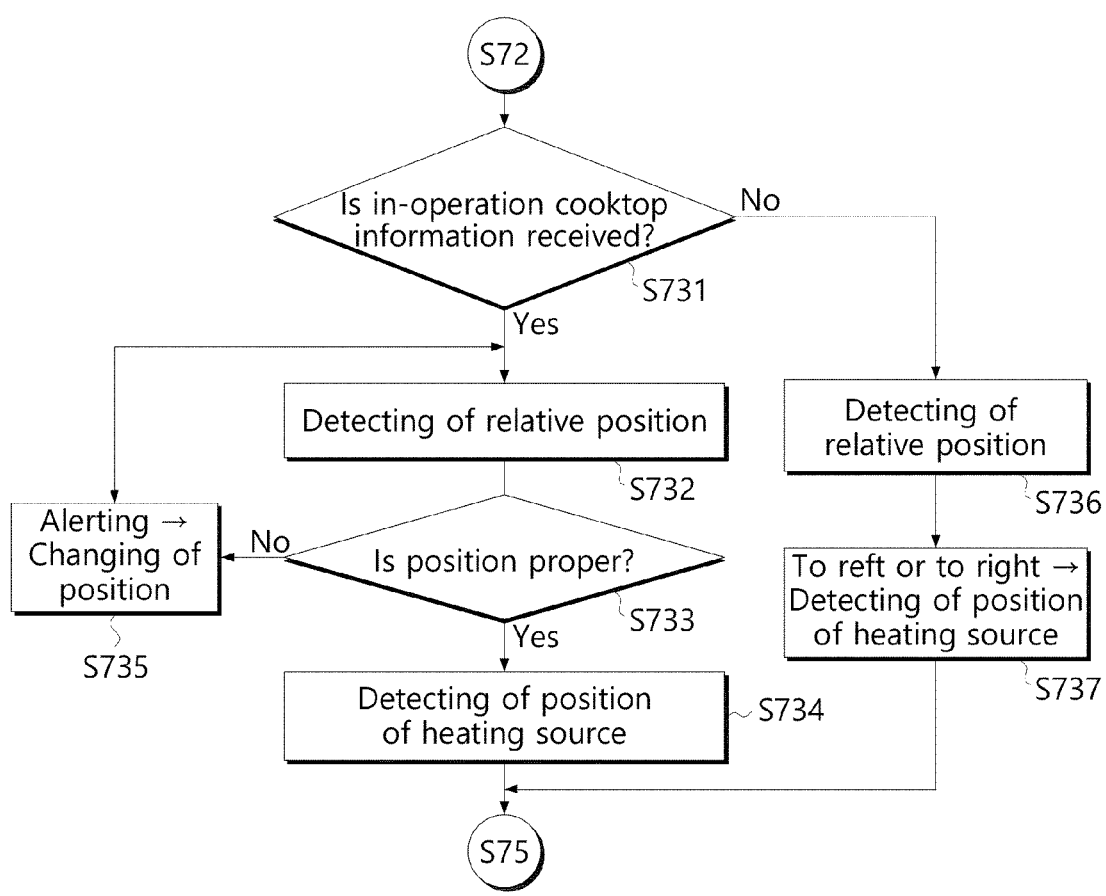
FIG. 35 is a flowchart for control through a conjunctional-operation detection mode in a method of controlling the portable air-flow guiding apparatus according to the third embodiment of the present disclosure.

FIG. 35 is a flowchart for control through the conjunctional-operation detection mode in the method of controlling the portable air-flow guiding apparatus 10 according to the third embodiment of the present disclosure.

With reference to FIG. 35, the method of controlling the portable air-flow guiding apparatus 10 according to the third embodiment of the present disclosure may include steps S732 and S736 of measuring a relative position. A relative position here of the portable air-flow guiding apparatus 10 means a relative position with respect to the cooking heating equipment 30. As illustrated in FIGS. 2B and 2C, the portable air-flow guiding apparatus 10 according to the third embodiment of the present disclosure, for example, may be arranged to the left or the right of the cooking heating equipment 30, and the relative position of the portable air-flow guiding apparatus 10 with respect to the cooking heating equipment 30 may be measured.

To this end, the portable air-flow guiding apparatus 10 according to the third embodiment of the present disclosure, as illustrated in FIG. 33, may be configured to include a position recognition sensor 614 as one of the sensor units 511, 512, 513, and 514.

Figure 36A:
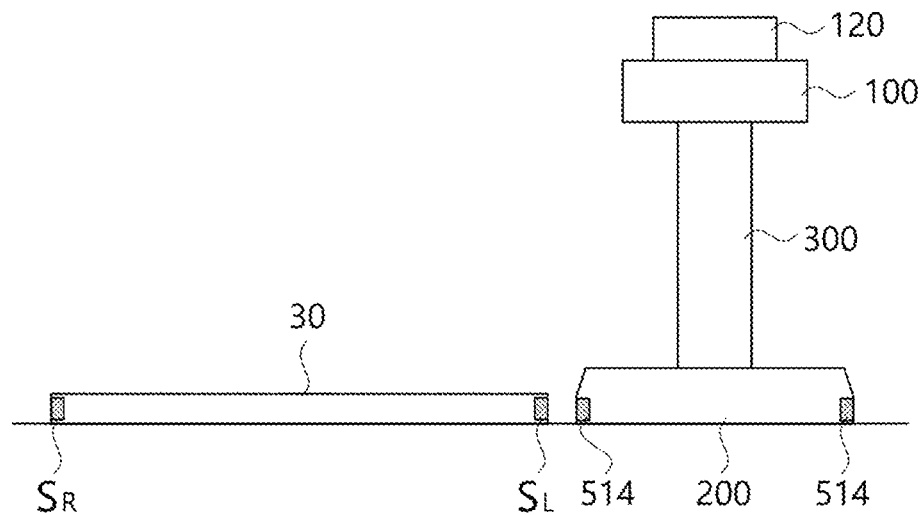
FIGS. 36A and 36B are views each illustrating an implementation example of measuring a relative position in the method of controlling the portable air-flow guiding apparatus according to the third embodiment of the present disclosure.

The position recognition sensor 614 according to the third embodiment of the present disclosure may recognize the relative position of the portable air-flow guiding apparatus 10 with respect to the cooking heating equipment 30. FIG. 36A is a view illustrating an implementation example of a method in which the position recognition sensor 614 recognizes the relative position of the portable air-flow guiding apparatus 10.

As illustrated in FIG. 36A, position recognition modules SR and SL that are recognizable by the position recognition sensor 614 may be mounted on left and right edge portions, respectively, of the cooking heating equipment 30 that operates in conjunction with the portable air-flow guiding apparatus 10 according to the third embodiment of the present disclosure. The position recognition modules SR and SL here that are mounted on left and right edge portions, respectively, may be provided in a form that is distinguishable.

For example, the position recognition modules SR and SL may be provided in a form that is distinguishable with the size of a magnet, the magnitude of a magnetic field, a number of magnets, or the like. The position recognition sensor 614 may be provided in the form of a Hall sensor capable of detecting a magnetic field. As another implementation example, the position recognition modules SR and SL may be provided in the form of an RF or NFC tag, and the position recognition sensor 614 may be provided in the form of an RF or NFC reader that correspond to the RF or NF tag, respectively. The position recognition sensor 614 and the position recognition modules SR and SL, if capable of measuring left and right relative positions, may also be configured in such a manner as to have other forms.

In the method of controlling the portable air-flow guiding apparatus 10 according to the third embodiment of the present disclosure, before performing the step of measuring the relative position, it may be check whether or not in-operation cooktop information is received (S731). As described above, when the portable air-flow guiding apparatus 10 and the cooking heating equipment 30 operate in conjunction with each other and the start command is transmitted from the cooking heating equipment 30, the cooking heating equipment 30 may transmit in-operation cooktop information on a cooktop that is turned on among a plurality of cooktops F1, F2, and F3 that are illustrated in FIG. 36B.

In this case, in the third embodiment of the present disclosure, in a case where the in-operation cooktop information is received, as described above, the step of measuring the relative position is performed (S732), and then it may be determined whether or not the relative position of the portable air-flow guiding apparatus 10 is proper (S733).

Figure 36B:
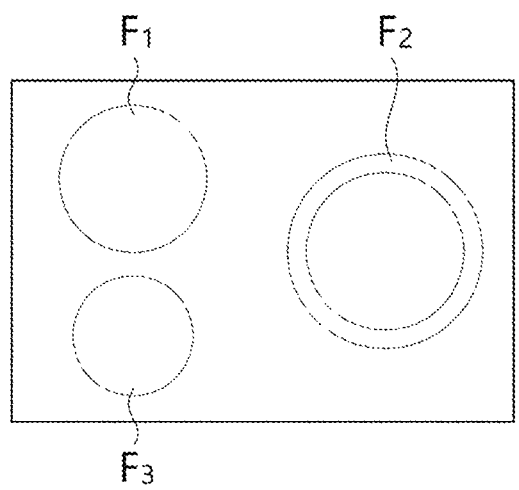

For example, in a state where, according to the in-operation cooktop information, the cooktop F1 is recognized as being turned on among the cooktops F1, F2, and F3 that are illustrated in FIG. 36B, when the result of performing the step of measuring the relative position is that the portable air-flow guiding apparatus 10 is arranged to the right, it may be determined that the relative position of the portable air-flow guiding apparatus 10 is not proper. At this point, the hood controller 540 may alert the user that the relative position of the portable air-flow guiding apparatus 10 needs to be changed, through sound produced by a speaker or through a visual expression displayed on a screen (S735).

In contrast, in a case where it is determined that the relative position of the portable air-flow guiding apparatus 10 is proper, a step of measuring the position of the heating source is performed (S734). At this point, in a case where the in-operation cooktop information is received and where the relative position is proper, the cooktop in operation is in a state where the position thereof is measured. Therefore, the position of the cooktop in operation may be automatically measured as the position of the heating source.

As another implementation example, as illustrated in FIGS. 36B, an angle by which the head unit 100 is rotated may vary according to a position in the upward and downward direction with reference to FIG. 36B. Therefore, the position of the heating source may be detected more precisely while rotating the head unit 100.

At this point, in the step S734 of measuring the position of the heating source, by measuring the relative position, a state is attained where it is recognized whether the cooking heating equipment 30 is positioned to the left of the portable air-flow guiding apparatus 10 or to the right thereof. Therefore, the position of the heating source may be measured while the head unit 100 is correspondingly moved to the left or to the right.

In a case where in Step S731, the in-operation cooktop information is not received, as described above, the step of measuring the relative position of the portable air-flow guiding apparatus 10 may be performed (S736). Then, when the relative position of the portable air-flow guiding apparatus 10 is measured, the step of measuring the position of the heating source may be performed (S737).

At this point, in the Step S737 of measuring the position of the heating source, by measuring the relative position, a state is also attained where the position of the cooking heating equipment 30 is measured. Therefore, the position of the heating source is measured by rotating the head unit 100 to the left or to the right.

With reference back to FIG. 34, in a case where in Step S72, the conjunctional-operation detection mode is not in execution, for example, in a case where the relative position of the portable air-flow guiding apparatus 10 according to the third embodiment of the present disclosure is not measured, the head unit 100 measures the position of the heating source while rotated to the left or to the right in the horizontal direction (S74).

Accordingly, although the portable air-flow guiding apparatus 10 according to the present disclosure is arranged to the left of the cooking heating equipment 30 or to the right thereof, the position of the heating source may be determined precisely.

Through the steps described above, when the position of the heating source is measured, the angle in the horizontal direction of the head unit 100 may be adjusted in such a manner that the sucking unit 110 of the head unit 100 is positioned over the heating source or most adjacent to the heating source (S75). At this point, as an implementation example, the controller 540 drives the horizontal angle adjustment unit 521 to adjust the angle in the horizontal direction of the head unit 100.

In the third embodiment of the present disclosure, as an implementation example, the angle in the horizontal direction of the head unit 100 is adjusted, and then a step of adjusting the height of the head unit 100 is performed. As one implementation example, in a case where the distance sensor 612 is mounted on a lower surface of the head unit 100, in order to increase the precision of measurement of the height of the cooking utensil 31, it is desirable that a distance to the cooking utensil 31 is measured in a state where the head unit 100 is positioned over the cooking utensil 31.

As described above, in Step S71 of initializing the positioning, the head unit 100 ascends to the maximum height, and the angle in the horizontal direction thereof is adjusted.

Therefore, the head unit 100 is in a state of ascending to the maximum height in Step S76 of measuring the height of the cooking utensil 31.

In this manner, when the height of the cooking utensil 31 is measured, the height of the head unit 100 may be adjusted (S77). In the third embodiment of the present disclosure, as an implementation example, the height of the head unit 100 is adjusted on the basis of the height of the cooking utensil 31 in such a manner that the head unit 100 is spaced by a preset optimal preset distance in the upward direction away from the cooking utensil 31.

Figure 37:
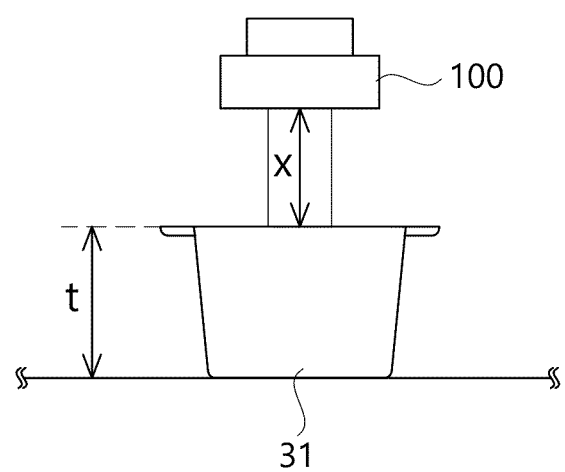
FIG. 37 is a view necessary to describe how to adjust a height of the head unit in the method of controlling the portable air-flow guiding apparatus according to the third embodiment of the present disclosure.

With reference to FIG. 37, for more detailed description, the height of the cooking utensil 31 that is measured in the step of measuring the height is defined as t and the optimal distance is defined as x. At this point, as described above, the minimum height of the head unit 100 is hmin, and the maximum height thereof is hmax.

In the third embodiment of the present disclosure, in a case where the height of the detected cooking utensil 31 is greater than the maximum height minus the optimal distance, the height of the head unit 100 may be adjusted to the maximum height. In addition, in a case where the height of the detected cooking utensil 31 is equal to or smaller than the maximum height minus the optimal distance, the height of the head unit 100 may be adjusted to the minimum height. In other cases, as described above, the height of head unit 100 may be adjusted in such a manner that a distance between the head unit 100 and the cooking utensil 31 is the optimal distance.

This relationship among the height of the cooking utensil 31, the optimal distance, the maximum height and the minimum height may be expressed in Equation 1.

$$h = h\min, \text{ if } t \leq h\min - x$$

$$h = t + x, \text{ if } h\min - x < t \leq h\max - x$$

$$h = h\max, \text{ if } h\max - x < t \quad \text{Equation 1}$$

With the configuration as described above, the height of the head unit 100 may be maintained to a height that is optimal for sucking the oil mist and the like. The height of the head unit 100 is possibly adjusted to the minimum height or the maximum height according to the height of the sucking utensil 31.

When the angle in the horizontal direction of the head unit 100 and the height of the head unit 100 are completely adjusted as described above, the hood controller 540 rotates the fan motor 530. Thus, the oil mist and the like are sucked through the sucking unit 110 and then are discharged through the discharging unit 120. Consequently, the oil mist and the like that occur during food cooking are removed.

Figure 38:
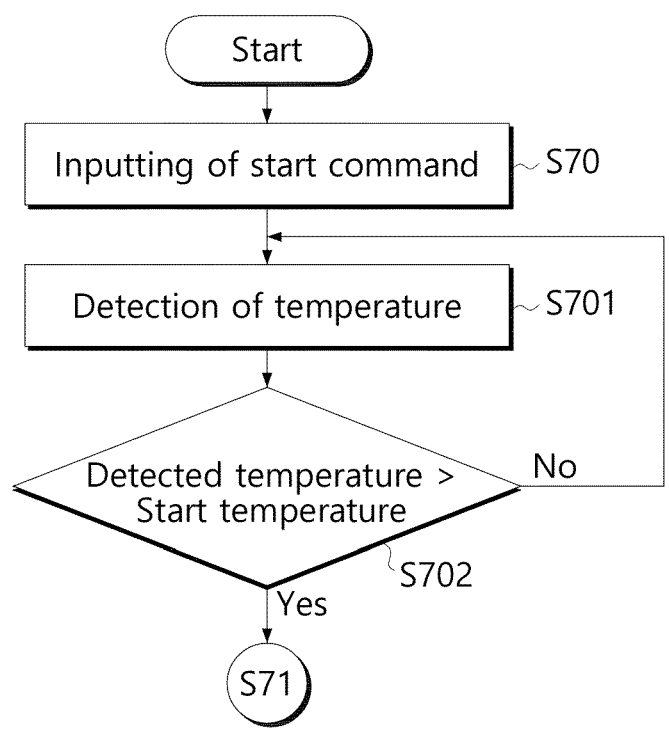
FIG. 38 is a flowchart for controlling a portable air-flow guiding apparatus according to a fourth embodiment of the present disclosure.

FIG. 38 is a flowchart for controlling a portable air-flow guiding apparatus 10 according to a fourth embodiment of the present disclosure.

A method illustrated in FIG. 38 of controlling the portable air-flow guiding apparatus 10 according to the fourth embodiment of the present disclosure may be configured to further include a step of measuring temperature. More specifically, as an implementation example, as described above, when the start command is input (S70), Step S701 of measuring the temperature is first performed.

In the step of measuring the temperature according to the fourth embodiment of the present disclosure, temperature of the cooking utensil 31 side may be measured. Then, in the fourth embodiment of the present disclosure, as an implementation example, in a case where the temperature of the cooking utensil 31 side exceeds a preset start temperature (S702), a step subsequent to the step S71 of initializing the positioning is performed.

When temperature of food that is being cooked rises to a predetermined temperature or higher, the oil mist and the like occur after cooking. For this reason, although cooking starts and the start command is input, according to the fourth embodiment of the present disclosure, the portable air-flow guiding apparatus 10 is enabled to operate when temperature of food that is being cooked rises to the start temperature or higher. Thus, unnecessary operation of the portable air-flow guiding apparatus 10 may be prevented.

In addition, usually, the user adds a food material, a condiment, and the like into the cooking utensil 31 early in the cooking process. The portable air-flow guiding apparatus 10 is not enabled to operate early in the cooking process in order not to interfere with the addition of the food material, the condiment, and the like. Thus, user convenience can be achieved.

Figure 34:
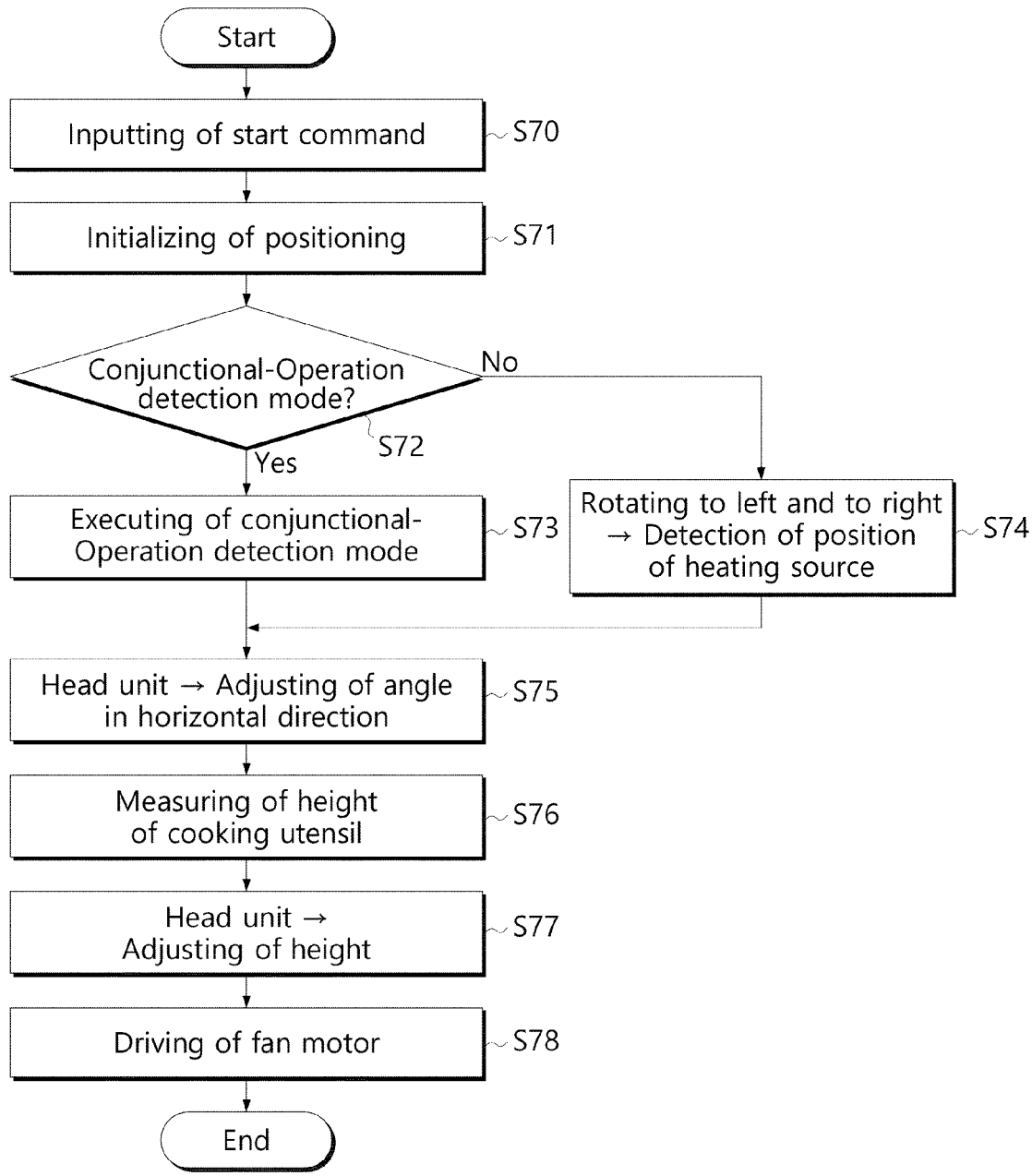
FIG. 34 is a flowchart for controlling the portable air-flow guiding apparatus according to the third embodiment of the present disclosure.

Steps subsequent to Step S702 in FIG. 38 are the same as those illustrated in FIG. 34, and thus detailed descriptions thereof are omitted.

Figure 39:
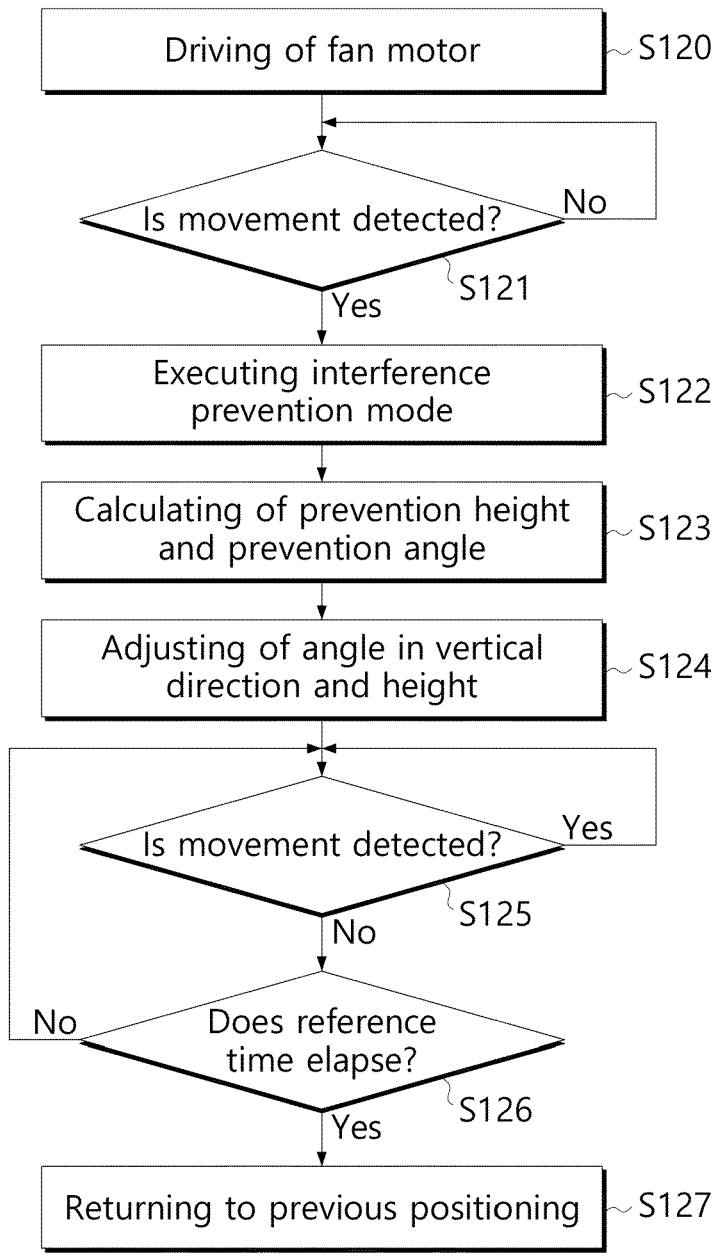
FIG. 39 is a flowchart for control through an interference prevention mode in a method of controlling the portable air-flow guiding apparatus according to the fourth embodiment of the present disclosure.

The method of controlling the portable air-flow guiding apparatus 10 according to the fourth embodiment of the present disclosure may be performed in an interference prevention mode. FIG. 39 is a flowchart for control through the interference prevention mode in the method of controlling the portable air-flow guiding apparatus 10 according to the fourth embodiment of the present disclosure.

More specifically, with reference to FIG. 3, in the method of controlling the portable air-flow guiding apparatus 10 according to the fourth embodiment of the present disclosure, a movement in the direction of the cooking utensil 31 may be detected (S121) in a state where the fan motor 530 is driven (S120). In the fourth embodiment of the present disclosure, as an implementation example, the movement sensor 613 detects the movement in the direction of the cooking utensil 31 as described above.

For example, when, during food cooking, the user performs an operation, such as opening a cover of the cooking utensil 31 to add a new food material or a condiment into the cooking utensil 31 or to taste food to see how it is seasoned, the movement sensor 613 may detect this operation.

When the operation is detected, the interference prevention mode is executed (S122). Thus, according to the fourth embodiment of the present disclosure, the positioning of the head unit 100 may be adjusted in the preset interference prevention mode.

In the fourth embodiment of the present disclosure, in the interference prevention mode, the height of the head unit 100 may be adjusted, or the head unit 100 may be rotated in the vertical direction, thereby adjusting the angle thereof to a predetermined angle. Alternatively, the height of the head unit 100 and the angle in the vertical direction of the head unit 100 may be both adjusted.

According to the fourth embodiment of the present disclosure, as an implementation example, in a step of making an adjustment in the interference prevention mode, at least one of the height of the head unit 100 and the angle in the vertical direction of the head unit 100 is adjusted in such a manner that the distance between the head unit 100 and the cooking utensil 31 is secured in a manner that is the same as a preset interference prevention distance.

In the method of controlling the portable air-flow guiding apparatus 10 according to the fourth embodiment of the present disclosure, as an implementation example, an interference prevention height and an interference prevention angle for operation in the inference prevention mode are calculated as illustrated in FIG. 39 (S123).

Figure 40:
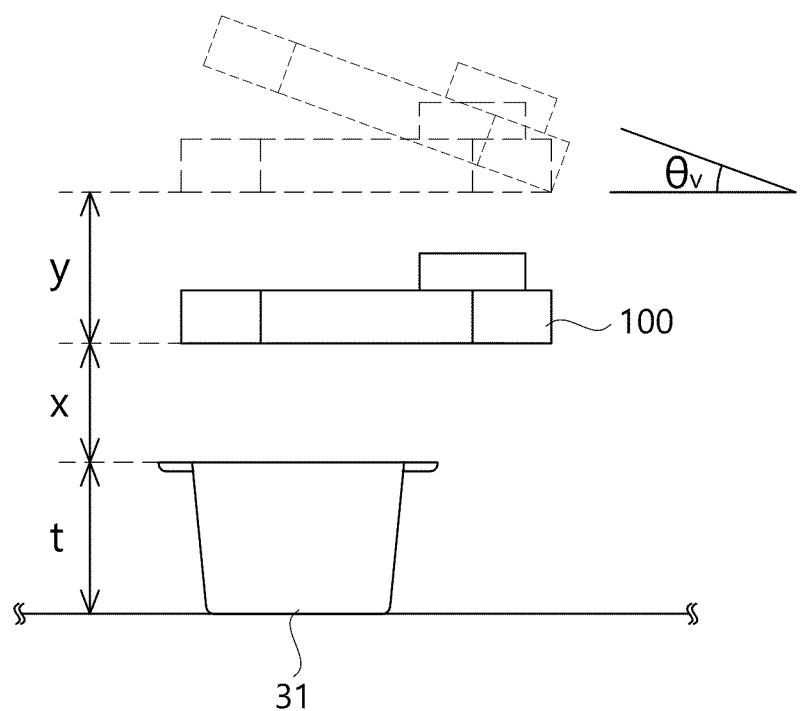
FIG. 40 is a view necessary to describe how to execute the interference prevention mode illustrated in FIG. 39.

FIG. 40 is a view necessary to describe how to execute the interference prevention mode in the method of controlling the portable air-flow guiding apparatus 10 according to the fourth embodiment of the present disclosure.

With reference to FIG. 40, as described above, t is the height of the cooking utensil 31, and x is the optimal distance that is a current distance between the head unit 100 and the cooking utensil 31. Furthermore, hmin is the minimum height, and hmax is the maximum height. y is the interference prevention distance that needs to be secured in order not to interfere with the user's movement.

In the fourth embodiment of the present disclosure, in a case where there is room for the head unit 100 to ascend by the interference prevention distance from a current height thereof, the head unit 100 may be enabled to ascend by the interference prevention distance from the current height thereof. A condition for this ascending of the head unit 100 from the current height thereof may be expressed in Equation 2.

$$t+x \leq h\ max-y \quad \text{Equation 2}$$

In contrast, in a case where a current distance between the head unit 100 and the cooking utensil 31 is smaller than the optimal distance, that is, in a state where the head unit 100 is currently at the maximum height, the angle in the vertical direction of the head unit 100 may be adjusted. A condition for this adjustment of the angle in the vertical direction of the head unit 100 may be expressed in Equation 3.

$$t+x > h\ max \quad \text{Equation 3}$$

In the fourth embodiment of the present disclosure, as an implementation example, when the condition expressed in Equation 3 is satisfied, the angle θV in the vertical direction of the head unit 100 is adjusted as in Equation 4.

$$\theta_v = \sin^{-1} \frac{y}{l} \quad \text{Equation 4}$$

where I is a length of the head unit 100.

In equation 4, as an implementation example, the angle in the vertical direction of the head unit 100 is adjusted according to the length of the head unit 100 and the interference prevention distance.

In a condition other than that as described above, as an implementation example, the height of the head unit 100 and the angle in the vertical direction of the head unit 100 are both adjusted. A condition for this adjustment of the angle in the vertical direction of the head unit 100 may be expressed in Equation 5.

$$h\ max-y < t+x \leq h\ max \quad \text{Equation 5}$$

In the fourth embodiment of the present disclosure, in a case where the condition expressed in Equation 5 is satisfied, the head unit 100 may be enabled to ascend to the maximum height. Then, the angle in the vertical direction of the head unit 100 may be adjusted as in Equation 6.

$$\theta_v = \sin^{-1} \frac{(t+x+y-h_{max})}{l} \quad \text{Equation 6}$$

As described above, when at least one of the interference prevention height and the interference prevention angle is determined, the height of the head unit 100 and the angle in the vertical direction of the head unit 100 may be adjusted (S124).

In the method of controlling the portable air-flow guiding apparatus 10 according to the fourth embodiment of the present disclosure, as one implementation example, the interference prevention height and the interference prevention angle is possibly adjusted in other ways in order to prevent the interference with the movement. As one implementation example, the head unit 100 may be rotated by an angle 90° in the vertical direction, and thus the head unit 100 may be in the upright position in the vertical direction. As another implementation example, the head unit 100 may be enabled to ascend to the maximum height, and the angle in the vertical direction of the head unit 100 may be set to a preset angle, for example, 45°.

After the height and the angle of the head unit 100, as described above, are adjusted in the interference prevention mode, in a case where a movement is not detected for a preset reference time (S125 and S126), the positioning of the head unit 100 may be adjusted (S127) in such a manner that the head unit 100 returns to previous positioning thereof that is established before the interference prevention mode is executed (S127).

In the above-described implementation example, after the start command is executed, the height of the head unit 100 and the angle in the horizontal direction of the head unit 100 are adjusted as illustrated in FIG. 34. As another implementation example, according to the height of the cooking utensil 31 that is measured in Step S76, the angle in the vertical direction of the heat unit 100, along with the height of the head unit 100, may be adjusted.

In the fourth embodiment of the present disclosure, as an implementation exempted, in a step of adjusting the angle or the height of the head unit 100, in a case where a preset condition for vertical-angle adjustment is satisfied, the angle in the vertical direction of the head unit 100 is adjusted on the basis of the height of the cooking utensil 31.

For example, if the height of the cooking utensil 31 is so high that the optimal distance is not secured although the head unit 100 is enabled to ascend to the maximum height, this case is also determined as satisfying the condition for vertical-angle adjustment. Thus, of course, the angle in the horizontal direction of the head unit 100 may be adjusted.

The embodiments of the present disclosure are described above with reference to the accompanying drawings, but the present disclosure is not limited to the embodiments. It would be understandable to a person of ordinary skill in the art to which the present disclosure pertains that the present disclosure can also be practiced in various forms without any modification to the technical idea and the essential feature thereof. Therefore, in every aspect, the embodiments described above should be understood as being exemplary and non-restrictive.

What is claimed is:

1. A method of controlling a portable air-flow guiding apparatus, the method comprising:
   measuring a position of a heating source by a heating source sensor of the portable air-flow guiding apparatus;
   measuring a height of a cooking utensil by a distance sensor of the portable air-flow guiding apparatus; and
   adjusting at least one of an angle in a horizontal direction of a head unit including a sucking unit by a horizontal angle adjustment unit of the portable air-flow guiding apparatus and a height of the head unit by a height adjustment unit of the portable air-flow guiding apparatus according to the position of the heating source and the height of the cooking utensil.

2. In the method of claim 1, wherein the adjusting of the at least one of the angle in the horizontal direction of the head unit and the height of the head unit comprises:
adjusting an angle in a vertical direction of the head unit according to the height of the cooking utensil by a vertical angle adjustment unit of the portable air-flow guiding apparatus.

3. The method of claim 2, further comprising:
inputting a start command for the portable air-flow guiding apparatus by operating an operation button of the portable air-flow guiding apparatus; and
adjusting positioning of the head unit to initial positioning according to the start command by at least one of the horizontal angle adjustment unit, the height adjustment unit and the vertical angle adjustment unit, wherein the measuring of the position of the heating source, the measuring of the height of the cooking utensil, and the adjusting of the at least one of the angle in the horizontal direction of the head unit and the height of the head unit are performed subsequently to the adjusting of the positioning of the head unit.

4. The method of claim 3, wherein the inputting of the start command comprises at least one of the following:
inputting the start command by operating the operation button; and
inputting the start command from outside the portable air-flow guiding apparatus.

5. The method of claim 3, wherein the adjusting of the positioning of the head unit comprises:
adjusting the height of the head unit to a maximum height by the height adjustment unit.

6. The method of claim 3, wherein the measuring of the position of the heating source comprises at least one of the following:
measuring temperature of cooking heating equipment by the heating source sensor and thus measuring the position of the heating source; and
measuring the position of the heating source through operation in conjunction with the cooking heating equipment.

7. The method of claim 6, wherein in the measuring of the temperature of the cooling heating equipment, the angle in the horizontal direction of the head unit is adjusted in a leftward-rightward direction by the horizontal angle adjustment unit, and thus the temperature of the cooling heating equipment is measured.

8. The method of claim 6, wherein the measuring of the position of the heating source through the operation in conjunction with the cooking heating equipment comprises:
measuring a relative position of the portable air-flow guiding apparatus with respect to the cooking heating equipment by a position recognition sensor of the portable air-flow guiding apparatus;
rotating the head unit to the left or to the right in the horizontal direction by the horizontal angle adjustment unit on the basis of the relative position of the portable air-flow guiding apparatus; and
measuring the temperature of the cooking heating equipment by the heating source sensor and thus measuring the position of the heating source.

9. The method of claim 6, wherein the measuring of the position of the heating source through the operation in conjunction with the cooking heating equipment comprises:

measuring a relative position of the portable air-flow guiding apparatus with respect to the cooking heating equipment by a position recognition sensor;
receiving in-operation cooktop information on a cooktop that is turned on, from the cooking heating equipment with which the portable air-flow guiding apparatus operates in conjunction; and
detecting the heating source on the basis of the in-operation cooktop information.

10. The method of claim 3, wherein the adjusting of the at least one of the angle in the horizontal direction of the head unit and the height of the head unit comprises at least one of the following:
adjusting the angle in the horizontal direction on the basis of the position of the heating source by the horizontal angle adjustment unit;
adjusting the height of the head unit on the basis of the height of the cooking utensil by the height adjustment unit; and
adjusting the angle in the vertical angle of the head unit by the vertical angle adjustment unit in a case where a preset condition for vertical-angle adjustment is satisfied, on the basis of the height of the cooking utensil.

11. The method of claim 10, wherein the adjusting of the angle in the horizontal direction is performed earlier than the adjusting of the height of the head unit and the adjusting of the angle in the vertical angle.

12. The method of claim 10, wherein in the adjusting of the height of the head unit, the height of the head unit is adjusted on the basis of the height of the cooking utensil in such a manner that the head unit is vertically spaced by a preset optimal distance away from the cooking utensil.

13. The method of claim 12, wherein the adjusting of the height of the head unit comprises:
adjusting the height of the head unit to a maximum height in a case where the height of the cooking utensil is greater than the maximum height minus the preset optimal distance; and
adjusting the height of the head unit to a minimum height in a case where the height of the cooking utensil is equal to or smaller than the maximum height minus the optimal distance.

14. The method of claim 10, wherein the preset condition for vertical-angle adjustment includes a condition that a distance between the head unit and the cooling utensil is smaller at the maximum height of the head unit than the optimal distance.

15. The method of claim 13, further comprising:
detecting a movement in a direction of the cooking utensil among movements of the portable air-flow guiding apparatus by a movement sensor of the portable air-flow guiding apparatus; and
adjusting the positioning of the head unit by at least one of the height adjustment unit and the vertical angle adjustment unit in a preset interference prevention mode in a case where the movement is detected.

16. The method of claim 15, wherein the adjusting of the positioning of the head unit in the preset interference prevention mode comprises at least one of the following:
adjusting the height of the head unit to a preset interference prevention height by the height adjustment unit; and
rotating the head unit in the vertical direction and thus adjusting an angle of the head unit to a preset angle by the vertical angle adjustment unit.

17. The method of claim 16, wherein in the adjusting of the positioning of the head unit in the preset interference prevention mode, at least one of the height of the head unit and the angle in the vertical direction of the head unit is adjusted in such a manner that a distance between the head unit and the cooking utensil is secured in a manner that is the same as a preset interference prevention distance.

18. The method of claim 15, further comprising:
adjusting the positioning of the head unit to previous positioning thereof by at least one of the horizontal angle adjustment unit, the height adjustment unit and the vertical angle adjustment unit that is established before the interference prevention mode is executed, in a case where the movement is not detected for a preset reference time after the interference prevention mode is executed.

19. The method of claim 3, further comprising:
detecting temperature of the cooking utensil side by the heating source sensor after the start command is input, wherein the measuring of the position of the heating source, the measuring of the height of the cooking utensil, and the adjusting of the at least one of the angle in the horizontal direction of the head unit and the height of the head unit are performed subsequently to the adjusting of the positioning of the head unit, in a case where the temperature of the cooking utensil side exceeds a preset start temperature.

\* \* \* \* \*